United States Patent [19]

Aro et al.

[11] Patent Number: 4,504,942
[45] Date of Patent: Mar. 12, 1985

[54] LINE SWITCH HAVING DISTRIBUTED PROCESSING

[75] Inventors: Enn Aro, Delaware; Robert J. DeHilster, Worthington; Leonard E. Bogan, Columbus, all of Ohio

[73] Assignee: International Telephone and Telegraph Corporation, New York, N.Y.

[21] Appl. No.: 371,053

[22] Filed: Apr. 22, 1982

[51] Int. Cl.³ .......................... H04Q 11/04; H04J 3/02
[52] U.S. Cl. ...................................................... 370/58
[58] Field of Search ........................... 370/58, 84, 100

[56] References Cited

U.S. PATENT DOCUMENTS 4,313,198 1/1982 Mazzocchi ........................ 370/100
4,356,563 10/1982 Viale ..................................... 370/58

OTHER PUBLICATIONS

J. Smith, "The Subscriber Line Card in a Distributed Control Switching System", 1981, ICC, Jun. 14–18, 1981, pp. 1.1.1–4.
R. Leppenan et al., "Signalling and Control or the Facility Integrated Digital Switching System", ITE&S, Sep. 14–18, 1981, pp. 51–55.

Primary Examiner—Douglas W. Olms
Assistant Examiner—Wellington Chin
Attorney, Agent, or Firm—John T. O'Halloran; Jeffrey P. Morris; Alfred C. Hill

[57] ABSTRACT

A line switch for a digital telephone switching system utilizes distributed processing. The line switch comprises one or more switch modules. Each switch module is coupled to a central office switching system via one or more PCM lines which utilize common channel signaling. Each switch module comprises groups of line circuits, each line circuit being coupled to a subscriber line. Three separate distributed processor functions are provided in each line switch module. A first processor is utilized to communicate with the central office switching system and to coordinate the operations within the line switch module. A second processor is provided to control clock generation and rate conversion circuits. Each group of line circuits includes a third processor to control the operations of the line circuits and to gather information from the line circuit. A busing arrangement is provided within the line switch such that both control information and PCM voice data are routed throughout the line switch.

29 Claims, 74 Drawing Figures

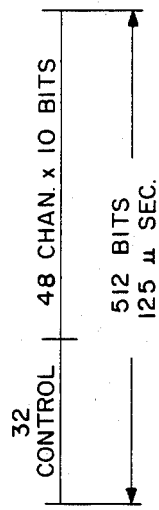
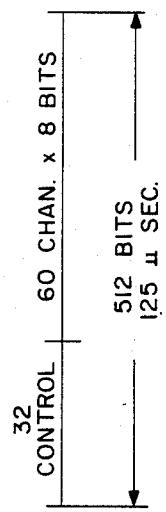
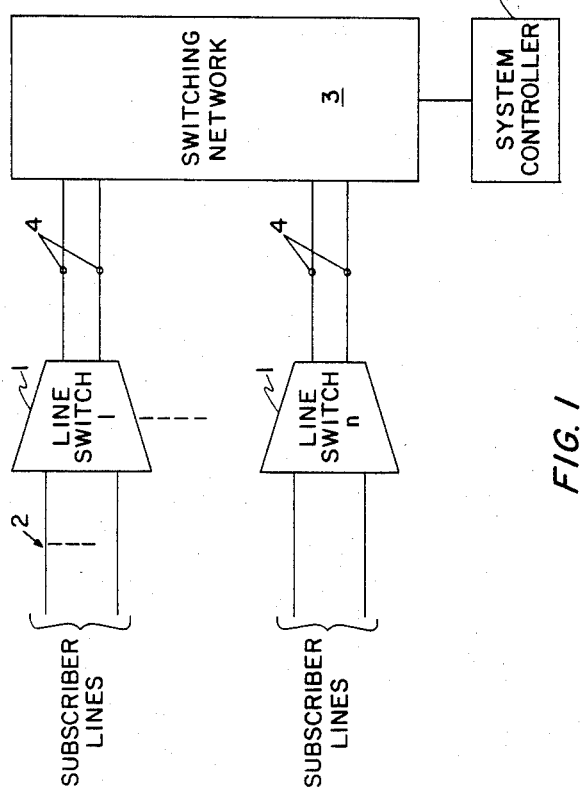
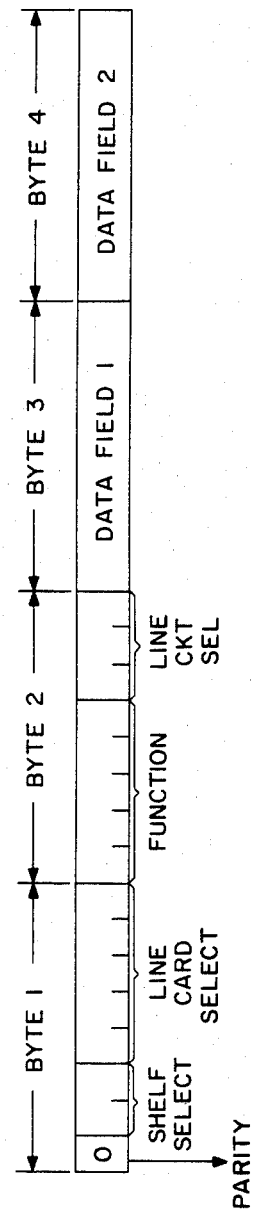

| LINE SWITCH CONFIGURATION | TRAFFIC | |
|---|---|---|
| | 24 CHANNEL | 32 CHANNEL |
| 160 SUBSCRIBER LINES — MODULE 1a / MODULE 1b — PCMA, PCMA<br>160 SUBSCRIBER LINES | 32.2E TOTAL<br>.1E./LINE | 42.3E TOTAL<br>.132 E/LINE |
| 160 SUBSCRIBER LINES — MODULE 1a / MODULE 1b — PCMA, PCMB, PCMA<br>160 SUBSCRIBER LINES | 52.7E TOTAL<br>.164 E./LINE | 68.6E TOTAL<br>.214 E./LINE |
| 160 SUBSCRIBER LINES — MODULE 1a / MODULE 1b — PCMA, PCMB, PCMA, PCMB<br>160 SUBSCRIBER LINES | 73.9E TOTAL<br>.23 E./LINE | 95.5E TOTAL<br>.298E./LINE |

FIG. 3

| LINE SWITCH CONFIGURATION | TRAFFIC | |
|---|---|---|
| | 24 CHANNEL | 32 CHANNEL |
| 160 SUBSCRIBER LINES / 192 SUBSCRIBER LINES — MODULE 1a, MODULE 1c, MODULE 1b — PCMA, PCMA — 160 SUBSCRIBER LINES | 32.2E TOTAL .063E/LINE | 42.3E TOTAL 0.83E/LINE |
| 160 SUBSCRIBER LINES / 192 SUBSCRIBER LINES — MODULE 1a, MODULE 1c, MODULE 1b — PCMA, PCMB, PCMA — 160 SUBSCRIBER LINES | 52.7E TOTAL .103E/LINE | 68.6E TOTAL |
| 160 SUBSCRIBER LINES / 192 SUBSCRIBER LINES — MODULE 1a, MODULE 1c, MODULE 1b — PCMA, PCMB, PCMA, PCMB — 160 SUBSCRIBER LINES | 73.9E TOTAL .144E/LINE | 95.5E TOTAL .186E/LINE |

FIG. 3A

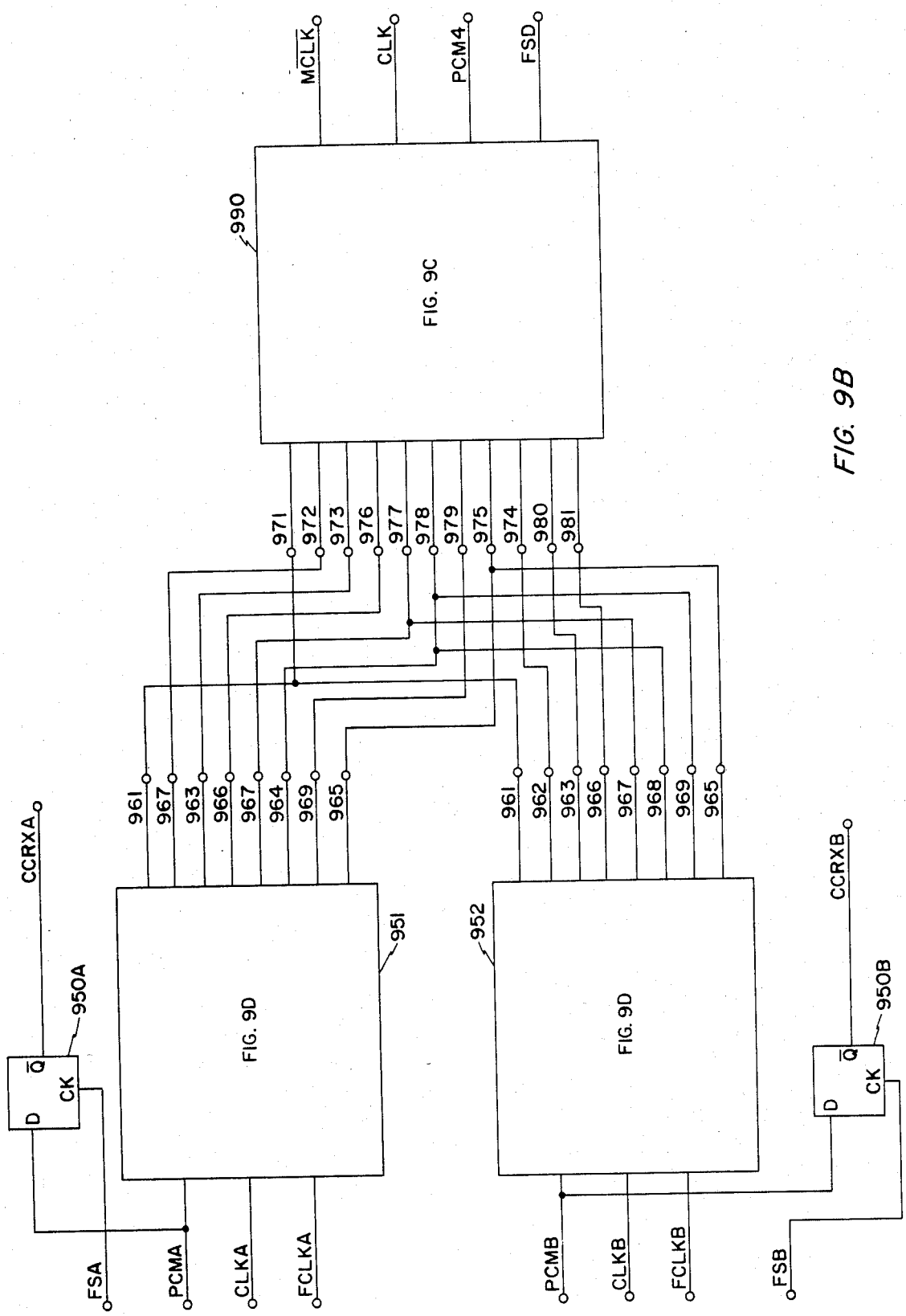

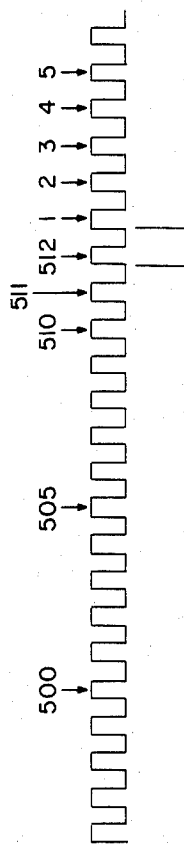
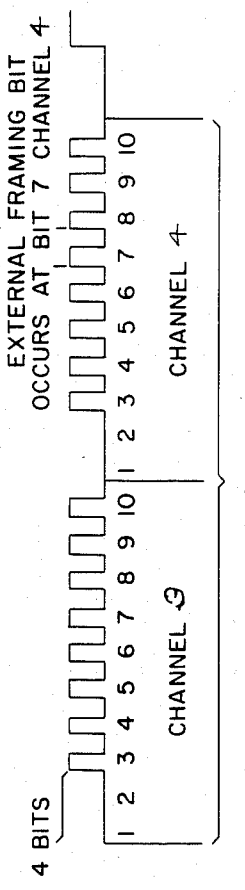
FIG. 24
FIG. 24A
FIG. 24B
FIG. 24B

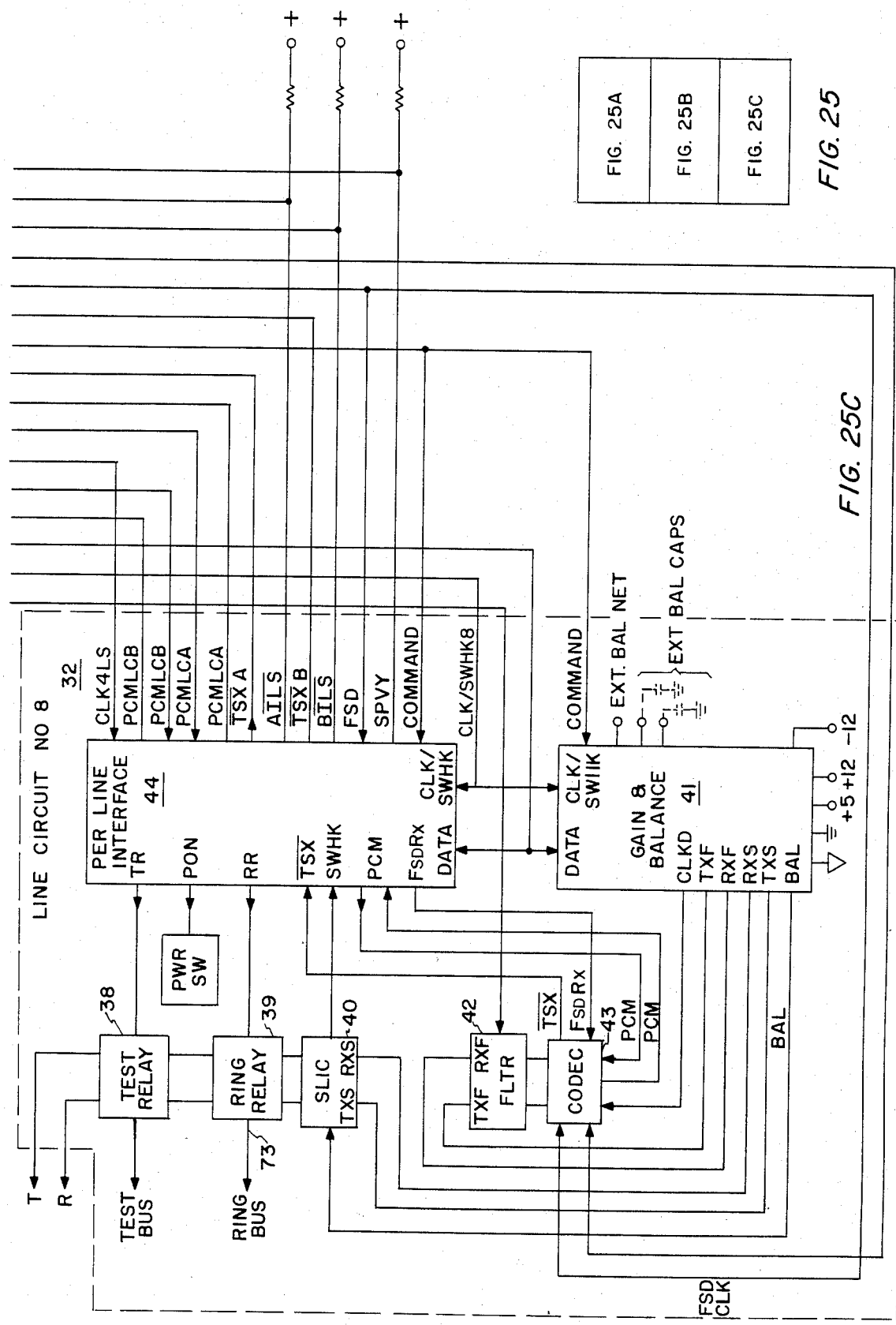

PER-LINE INTERFACE CONTROL FORMAT

| BIT 0 | 1 | 2 | 3 | 4 | 5 | 6 | 7 | 8 | 9 | 10 | 11 |
|---|---|---|---|---|---|---|---|---|---|---|---|
| R/W | ADDRESS | | | N/A | EURO. SEL. | POWER | TR | RR | LC ENA. | ILS | Ā/B SEL. |

(12 BITS)

FIG. 26

GAIN-BALANCE CONTROL FORMAT

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 |
|---|---|---|---|---|---|---|---|---|---|---|---|---|---|---|---|---|---|---|---|---|---|---|---|---|---|---|---|
| R/W | ADDRESS | | | CLK +/- | ☒ | ☒ | ☒ | LINE BALANCE | | | | Rx GAIN SETTING | | | | | | | | Tx GAIN SETTING | | | | | | | |

←4 BITS→  ←——8 BITS——→  ←——8 BITS——→

FIG. 28

CODEC CONTROL FORMAT

| 0 | 1 | 2 | 3 | 4 | 5 | 6 | 7 | 8 | 9 | 10 | 11 |
|---|---|---|---|---|---|---|---|---|---|---|---|
| R/W | ADDRESS | | | | CODEC MODE | CHANNEL ASSIGNMENT | | | | | |

| BIT 1 | 2 | MODE |
|---|---|---|
| 0 | 0 | Tx & Rx CHANNEL |
| 0 | 1 | Tx CHANNEL |
| 1 | 0 | Rx CHANNEL |
| 1 | 1 | STANDBY |

FIG. 29

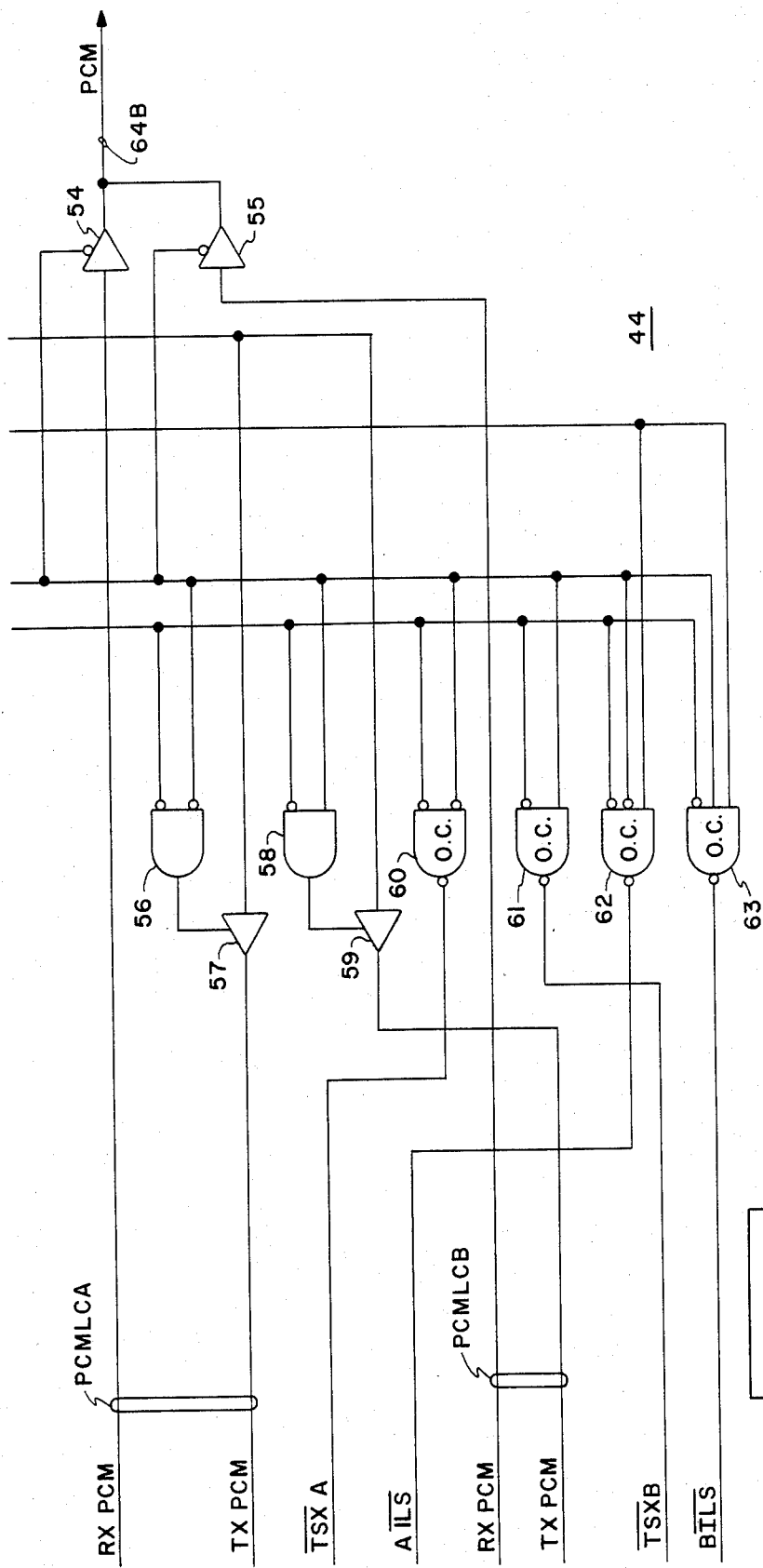

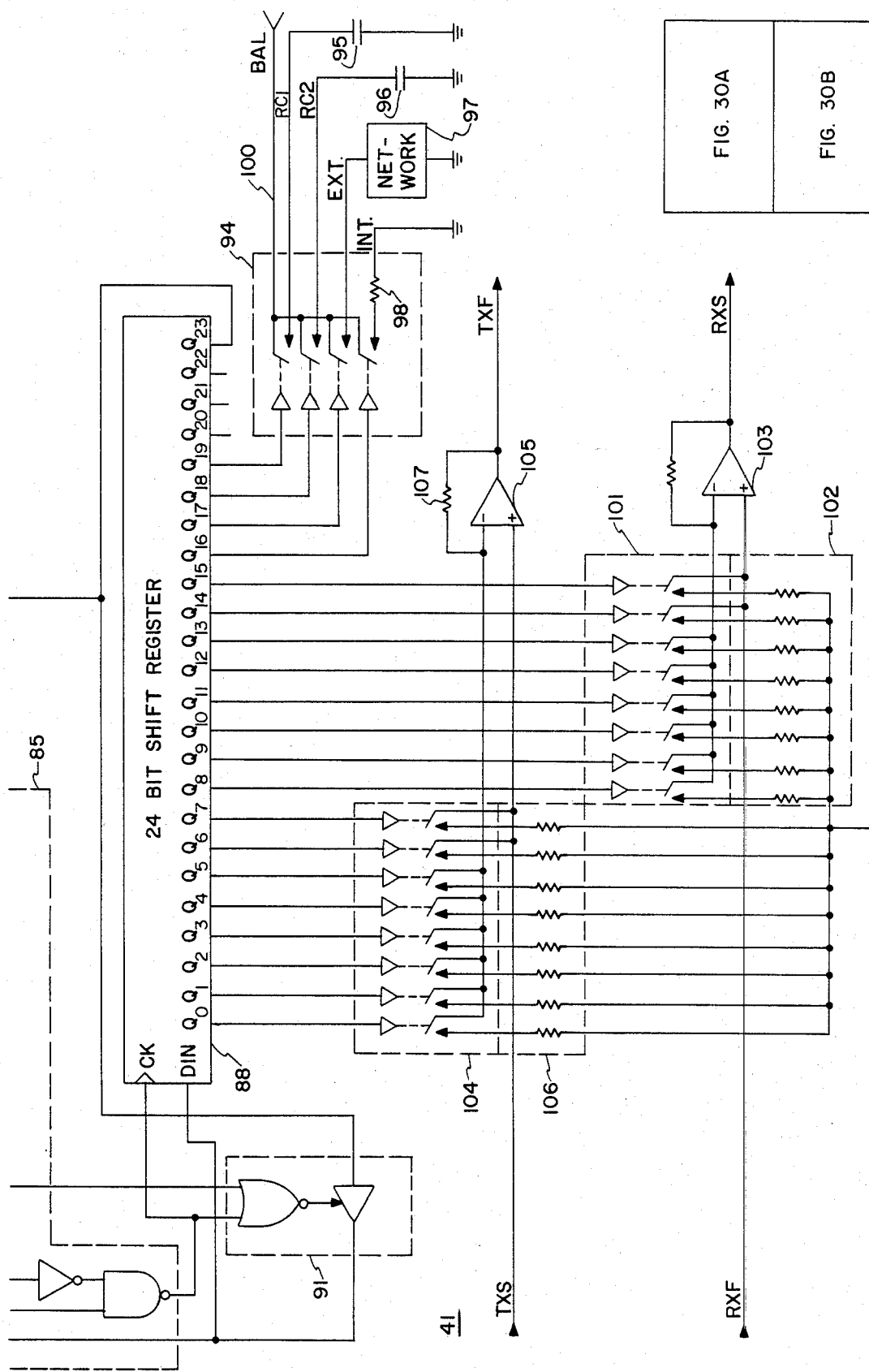

| FRAMES AFTER START OF TEST | 'A' CONTROL WORD REGISTER CONTENTS (HEX) | | | | 'B' CONTROL WORD REGISTER CONTENTS (HEX) | | | |
|---|---|---|---|---|---|---|---|---|
| | BYTE 1 | BYTE 2 | BYTE 3 | BYTE 4 | BYTE 1 | BYTE 2 | BYTE 3 | BYTE 4 |
| 0 | 63 | C1 | F8 | 0F | XX | XX | XX | XX |
| 1 | 07 | E0 | 3D | 8F | 07 | E0 | 3D | 8F |
| 2 | 80 | F6 | 3C | 1F | 80 | F6 | 3C | 1F |
| 3 | D8 | F0 | 7E | 03 | D8 | F0 | 7E | 03 |
| 4 | C1 | F8 | 0F | 63 | C1 | F8 | 0F | 63 |
| 5 | E0 | 3D | 8F | 07 | E0 | 3D | 8F | 07 |
| 6 | F6 | 3C | 1F | 80 | F6 | 3C | 1F | 80 |
| 7 | F0 | 7E | 03 | D8 | F0 | 7E | 03 | D8 |
| 8 (FINAL DATA) | F8 | 0F | 63 | C1 | F8 | 0F | 63 | C1 |

MATCHES DATA LOADED INTO FIXED ADDRESS REGISTER AT START OF TEST

FIG. 33

```
VERIFIES SHIFT OPERATION OF 'A' & 'B' CONTROL WORD REGISTERS
USING THE TEST DATA FEEDBACK FEATURE OF THE PIC.

INITIALIZE MODE REGISTER (PIC INTERNAL REG. LOCATION 0DH)
         MOV    R0,#0DH
         MOV    R,#8BH
         MOVX   CR0,A      ; WRITE 8BH INTO MODE REG.

LOAD 'A' CONTROL WORD REG. WITH TEST DATA
         MOV    R0,#0EH
         CLR    A
         MOVX   CR0,A      ; WRITE 0 INTO PIC CONTROL REG. POINTER (CRP)
         INC    R0         ; R0 POINTS TO CCRP (PIC INTERNAL REG. LOCATION 0FH)
         MOV    R5,#63H    ; C/R TEST DATA BYTE 1 (R5)
         MOV    R4,#0C1H   ; C/R TEST DATA BYTE 2 (R4)
         MOV    R3,#0F8H   ; C/R TEST DATA BYTE 3 (R3)
         MOV    R2,#0FH    ; C/R TEST DATA BYTE 4 (R2)

MOV    R1,#5      ; INITIALIZE TEST DATA BYTE POINTER (R1)
         MOV    R7,#4      ; INITIALIZE TEST DATA BYTE COUNTER (R7)

LOOP 1: MOV  A,CR1      ; FETCH NEXT BYTE OF TEST DATA
         MOVX   CR0,A      ;   AND WRITE IT INTO NEXT BYTE OF 'A' C/R
         DEC    R1         ; ADJUST TEST DATA POINTER
         DJNZ   R7,LOOP1   ; REPEAT LOOP 1 FOR ALL 4 TEST DATA BYTES

LOAD FIXED ADDRESS REGISTER WITH C/R BYTE 3 TEST DATA
         MOV    R0,#08H    ; PIC FIXED ADDRESS REG. INTERNAL ADDR.
         MOV    A,R3
         MOVX   CR0,A

INITIALIZE FRAME COUNTER AND START DYNAMIC TEST
         STOP   TCNT
         MOV    A,0F6H     ; -10 IN 2'S COMPLEMENT
         MOV    T,A
         JTF    $+2        ; RESET TIMER FLAG
         STRT   CNT

LOOP 2: MOV  A,T
         ADD    A,#8
         JNZ    LOOP 2     ; REPEAT LOOP 2 UNTIL FRAME COUNT REACHES 0F8H (-8)

MOV    R0,#0DH
         MOV    A,#8FH     ; WRITE 8FH INTO MODE REGISTER (SET CONTROL SHIFT ENR)
         MOVX   CR0,A      ; ENABLE SELF-TEST CONTROL SHIFTING
```

FIG. 34

```
WAIT FOR 8 FRAMES TO PASS (TF=1), I.E. LET C/R CYCLE THRU 8 TIMES
                                        42 CLOCK PULSES PER FRAME
LOOP 3:  JTF    $+4       ; SKIP NEXT INSTRUCTION WHEN TIMER FLAG (TF) = 1
         JMP    LOOP 3

DISABLE CONTROL REGISTER SHIFTING
         CLR    A
         MOVX   CR0,A     ; WRITE 0 INTO MODE REGISTER

VERIFY THAT BOTH 'A' & 'B' CARD ADDRESS COMPARATORS INDICATE
   AN ADDRESS MATCH OCCURRED AFTER 8 FRAMES
         MOV    R0,#0CH   ; PIC INTERNAL REG. ADDRESS OF STATUS REGISTER
         MOV    A,CR0     ; FETCH STATUS BYTE
         CPL    A
         JB0    CFAIL     ; JUMP TO ERROR ROUTINE (CFAIL) IF ADDRESS MATCH
         JB1    CFAIL     ;   IS NOT INDICATED BY EITHER CARD ADDRESS COMPARATOR

VERIFY CONTENTS OF 'A' & 'B' CONTROL WORD REGS. MATCH EXPECTED CONTENTS
         MOV    A,R5
         XCH    A,R3      ; 63H EXPECTED IN C/R BYTE 3 (R3)
         XCH    A,R5      ; F8H EXPECTED IN C/R BYTE 1 (R5)
         MOV    A,R4
         XCH    A,R2      ; C1H EXPECTED IN C/R BYTE 4 (R2)
         XCH    A,R4      ; 0FH EXPECTED IN C/R BYTE 2 (R4)

MOV    R0,#0FH   ; PIC INTERNAL ADDR. OF CCRP

MOV    R6,#2
LOOP 4:  MOV    R1,#5     ; INITIALIZE TEST DATA BYTE POINTER
         MOV    R7,#4     ; INITIALIZE TEST DATA BYTE COUNTER

LOOP 5:  MOVX   A,CR0     ; FETCH NEXT C/R DATA BYTE
         XRL    A,CR1     ;   & COMPARE WITH EXPECTED DATA
         JNZ    CFAIL     ; JUMP TO ERROR ROUTINE (CFAIL) IF ANY DATA MIS-MATCH
                          ;   IS DETECTED
         DEC    R1        ; ADJUST TEST DATA POINTER
         DJNZ   R7,LOOP5  ; REPEAT LOOP 5 FOR ALL 4 BYTES OF C/R

DJNZ   R6,LOOP4  ; REPEAT LOOP 4 FOR BOTH 'B' & 'A' C/R'S

END OF PIC DYNAMIC OPERATION TEST
```

*FIG. 35*

LINE SWITCH HAVING DISTRIBUTED PROCESSING

BACKGROUND OF THE INVENTION

This invention pertains to telephone switching systems in general, and to interface circuits for interfacing processors to a common bus in distributed conrol digital telephone switching systems in particular.

The ITT 1210 is an advanced digital switching system manufactured in the United States by International Telephone and Telegraph Corporation. The ITT 1210, which was priorly identified as DSS-1, is described by C. G. Svala, "DSS-1, A Digital Local Switching System With Remote Line Switches", National Telecommunications Conference, 1977, pp. 39: 5-1 to 39: 5-7. As described by C. G. Svala, the ITT 1210 comprises three basic elements, i.e., line switches, a switching network, and a system control. A line switch interfaces with subscriber lines and to one or more PCM (pulse code modulation) lines. A line switch may be co-located with the switching network or may be located remoted therefrom. The switching network coupled to the line switches by the PCM lines comprises a number of digital switching modules called switch groups each of which includes a time-space-time network. The system control includes a pair of processors with associated program and data memories. The system control directs the operation of the switching network and the line switches. Communication of control information between the system control and a line switch is via a common channel superimposed on each PCM line. This common channel approach is described in U.S. Pat. No. 4,125,743, issued Nov. 14, 1978 to R. E. Steidl and assigned to a common assignee.

A large percentage of the equipment costs in a digital switching system is attributable to the line switches. Also the line switch design determines the transmission performance per subscriber line, traffic handling and line signaling functions of the switching system.

It is therefore desirable to provide an improved line switch having a low cost per subscriber line and improved transmission performance.

SUMMARY OF THE INVENTION

In accordance with the principles of the invention, a line switch is provided which has a low cost per subscriber line and improved transmission performance.

In an embodiment of the invention, a line switch comprises one or more line switch modules. Each module can terminate one or more PCM lines and each module interlaces PCM data from the PCM lines onto an internal PCM bus structure that operates at a higher data rate and has a greater number of channels per frame. Each line circuit of a module has access to all the channels of the internal PCM bus structure. Further, in accordance with the invention, a distributed processing control arrangement is provided wherein subscriber lines are arranged in groups and the line circuits associated with a group are controlled by a line group controller. A line switch processor contained in each line switch module is provided for communicating with the system control and for directing the operation of the line group controllers.

In accordance with one aspect of the invention, the internal PCM bus structure serves the dual functions of distributing time multiplexed PCM voice channels data and control data throughout the line switch. All control data exchanged between the line switch controller and the line group controller or any other circuit module is transmitted over the internal PCM bus structure. Thus, expansion of a module is easily accomplished by adding additional line circuit groups or other circuit modules and extending the PCM bus thereto.

Further, in accordance with the invention each line switch controller and line group controller incudes a multifunctional interface circuit which provides an interface between a microcomputer and the internal PCM bus structure.

An illustrative embodiment of the invention is a line switch having one or more line switch modules each terminating one of more PCM lines which are connected to the system network. Each line switch module includes a line switch controller which communicates with the system controller via a common channel signaling arrangement over the PCM lines. The line switch controller directs the operation of the various circuits within the line switch module. Each PCM line carries frame organized PCM voice channels with "X" channels per frame. The internal PCM bus structure is arranged such that 2X channels are provided per frame. A rate converter circuit is provided for interlacing PCM channels from two lines onto the PCM bus structure and for demultiplexing PCM channels on the PCM bus structure to the PCM lines.

More specifically, a receive rate converter comprises memory into which PCM data from the PCM lines are stored at the PCM line rate. The memory is read at the PCM bus structure rate in such a fashion tht PCM voice channels data from the two PCM lines is alternately applied to the PCM bus Structure, i.e. first the PCM data for one channel from one PCM line is read and then the PCM data for one channel of the other PCM lines is read. A transmit rate converter likewise comprises memory into which PCM voice channel data from the internal PCM bus structure is stored at the PCM bus structure rate. The stored PCM voice channel data is read from the memory at the rate of the PCM line such that the stored PCM voice channels are read and alternately applied to the two PCM lines.

Additionally, the rate converter includes clock generator and phase-locked loop circuitry. The phase-locked loop permits clock signals which are generated in a line switch module to be in phase-locked synchronization with either of the PCM lines. When two or more lines switch modules are connected together to form a line switch, the phase-locked loop circuits of each module will utilize the same PCM line for phase-locking.

Buffer and distributor circuits are interposed in the PCM bus structure. One function the buffer and distributor circuits provide is that of connecting the PCM bus structure of the various line switch modules in a line switch. The buffer and distributor circuits include gates which permit intra-line switch calls to be connected within the line switch without utilizing the system switching network.

Further, in accordance with the principles of this invention, an arrangement is provided for automatic setting of the line circuits gain.

A further aspect of the invention is the provision of another interface circuit for interfacing each line circuit to its respective line group controller and to the PCM buses.

BRIEF DESCRIPTION OF THE DRAWINGS

Above-mentioned and other features and objects of this invention will become more apparent by reference to the following description taken in conjunction with the accompanying drawing, in which:

FIG. 1 illustrates in block diagram form a digital switching system in accordance with the principles of the present invention;

FIGS. 3 and 3A illustrate the traffic handling capability of the line switch of FIGS. 2 and 2A, respectively;

FIG. 4 illustrates the format of PCM frames that can be employed in the system of FIG. 1;

FIG. 5 illustrates an alternate PCM frame format that can be employed in the system of FIG. 1;

FIGS. 9B, 9C and 9D illustrate in block diagram form the RX rate converter 20 of FIG. 8;

FIGS. 9F–9N are flow charts illustrating the operation of the line switch controller 7 of FIG. 9E;

FIGS. 24A and 24B when arranged as shown in FIG. 24 are timing diagrams in the buffer and distributor 9 of FIG. 22;

FIGS. 25A, 25B and 25C when arranged as shown in FIG. 25 illustrate in block diagram form a line circuit group in accordance with the principles of the present invention;

FIG. 26 illustrates a command word format;

FIGS. 27A and 27B when arrnged as shown in FIG. 27 illustrate in block diagram form the per line control interface 44 of FIG. 25;

FIG. 28 illustrates the format of a control word directed to the per line control interface 44;

FIG. 29 illustrates the format of a control word directed to a CODEC 43 of FIG. 25;

FIGS. 30A and 30B when arranged as shown in FIG. 30 show in block diagram form the gain/balance circuit 41 of FIG. 25B;

FIG. 31 illustrates the format of a control word transmitted over buses PCMLCA, PCMLCB;

FIG. 33 illustrates the register status of interface 23 during a self-test operation FIGS. 34 and 35 are flow charts of the self-test operation of interface 33;

DETAILED DESCRIPTION

Figure 2:
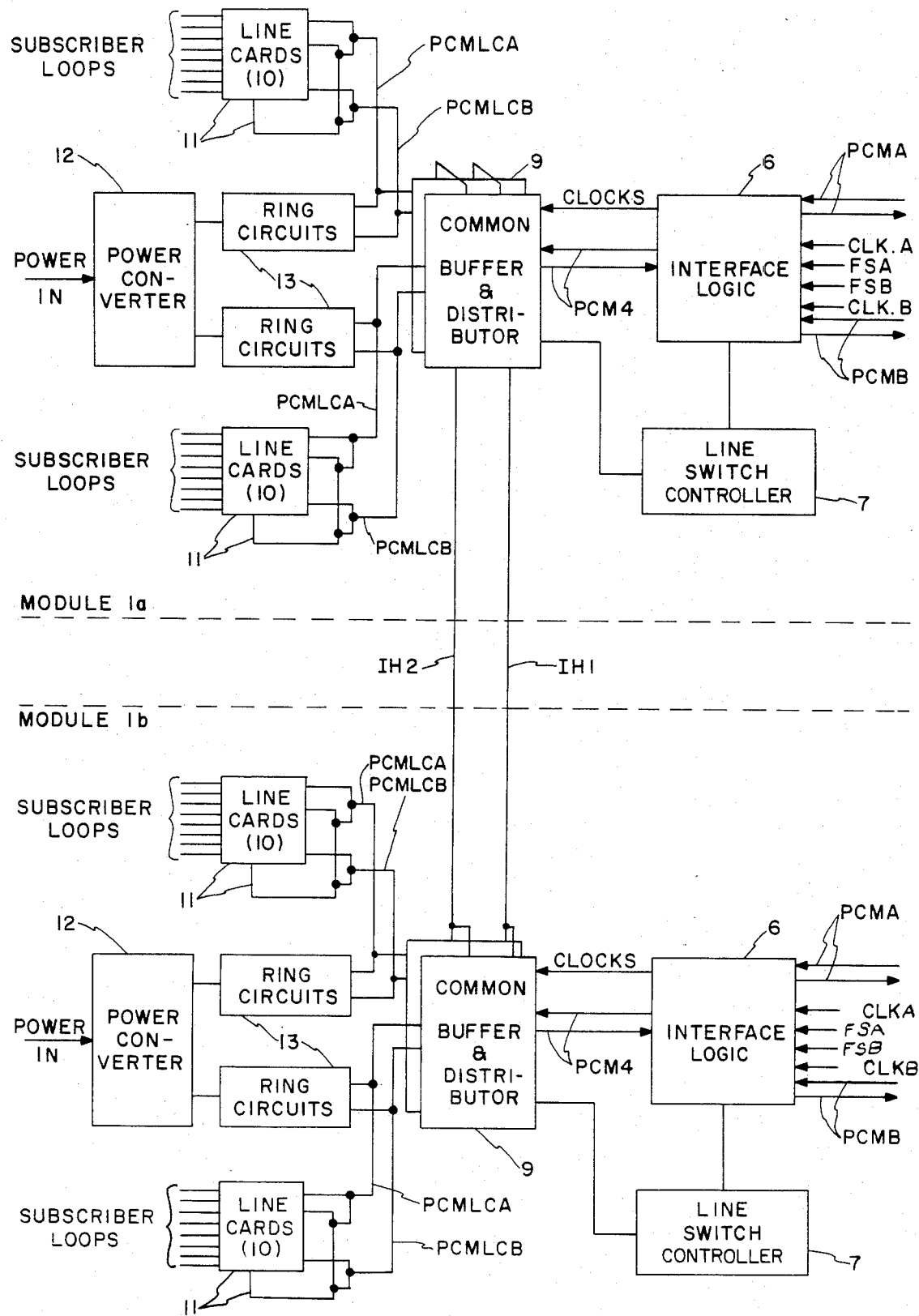
FIGS. 2 and 2A illustrate in block diagram form two embodiments of a line switch comprising two line modules that can be employed in the system of FIG. 1.
Figure 2A:
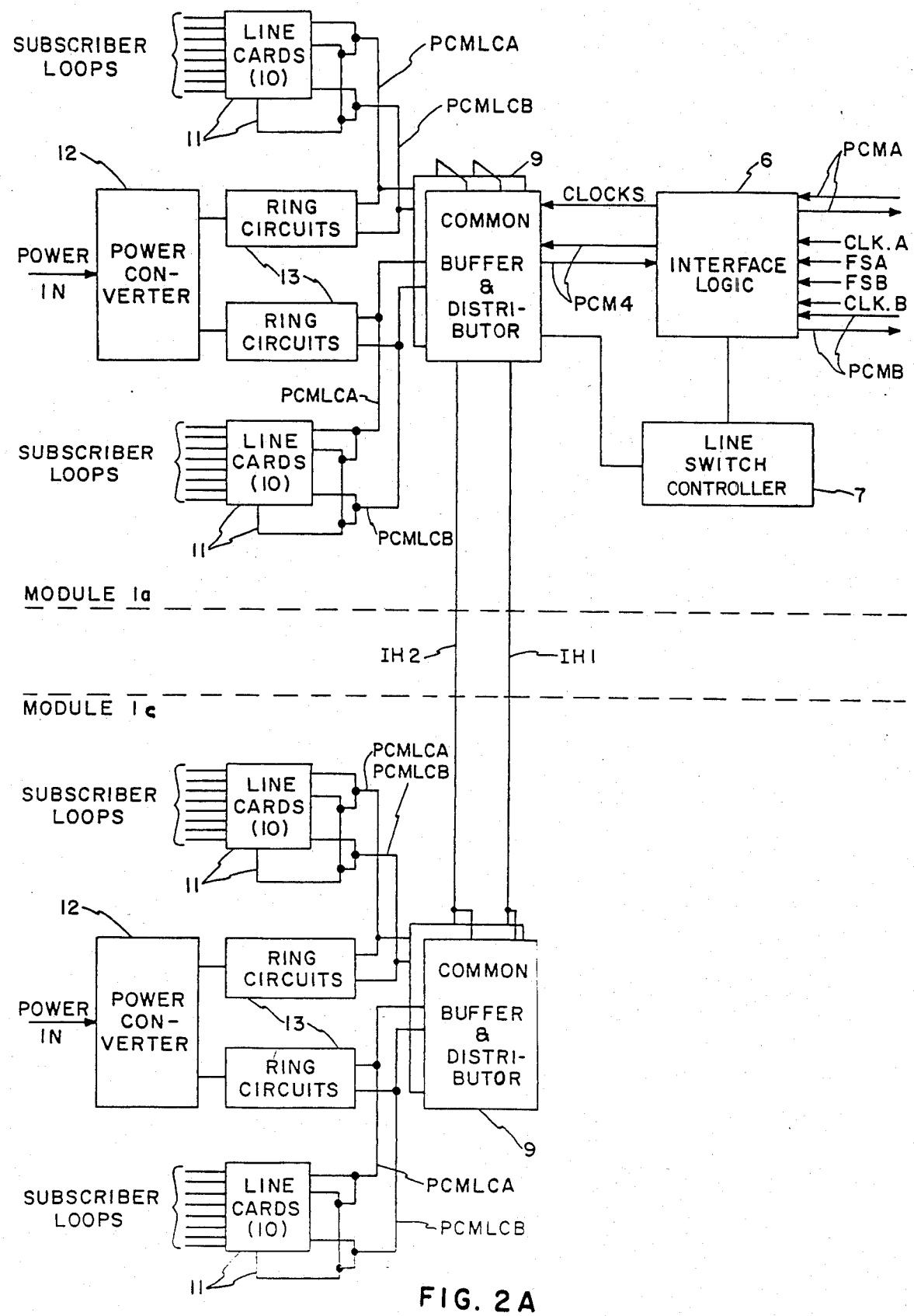

1. GENERAL (FIGS. 1 and 2)

The stored program controlled switching system of FIG. 1 is a PCM-TDM digital switching system which includes a switching network 3 controlled by a system controller 5. A more detailed description of the system controller 5 and the switching network 3 is provided in the aforementioned C. G. Svala reference. The system further includes "n" line switches 1 each serving a number of subscriber lines 2. Each line switch is coupled to the switching network 3 via one or more PCM lines 4. PCM transmission between the line switches 1 and the switching network 3 takes place over the PCM lines 4. Each PCM line 4 includes, as is well understood, a path for PCM transmission from the switching network 3 to a line switch 1 and a second path for PCM transmission fom a line switch 1 to the switching network 3. Each PCM line 4 carries frame-organized data or speech at any conventional rate. Operation of the line switches 1 are controlled by the system controller 5. In one illustrative embodiment of the invention, a common channel signaling arrangement such as that taught in U.S. Pat. No. 4,125,743 issued Nov. 14, 1978 to R. E. Steidl is utilized such that control information between th system controller 5 and the lines switches 1 is transmitted over the PCM lines 4. Typical information is sent by a line switch to the system controller 5 including the following:

1. Report of line seizures which the line switch has detected; and
2. Report of a fault detected in the line switch.

Typical commands sent by the system control 5 to a line switch include the following:

1. Request for assignment of subscriber line to a channel or release of a line from a channel;
2. Request for ringing to a line;
3. Request for maintenance functions to be performed; and
4. Request for party test to identify the party on the line.

FIG. 2 illustrates one of the line switches in greater detail.

Reliability of operation and flexibility in expansion is provided by organizing the circuits of each line switch in clusters or "security blocks" of circuits that function as a unit. For any single fault, only the group of circuits within the security block containing the fault may be lost to service. Thus, a single fault will not cause a loss of service to the entire line switch. As will be evident to those skilled in the art, the various circuits in the illustrative line switch described herein may be organized without the security block arrangement shown or the size of the various security blocks may be changed.

In accordance with the security block organization of the line switch, the illustrative line switch is organized as two identical line switch modules. Each line switch module is self contained to the extent that it can operate as a line switch for a number of subscriber lines.

A further aspect of the novel line switch is that distributed processing is advantageously utilized. Three separate distributed processor functions are provided in each line switch module. First, one processor is utilized to communicate with the system controller 5 of FIG. 1 and to coordinate the operations within the line switch module. A second processor is provided within a line switch module to control clock generation and rate conversion circuits. A third processor is provided for a group of line circuits to control the operations of the line circuits and to gather information from the line circuits.

A further aspect of the line switch architecture is that an internal busing arrangement is provided wherein both conrol and PCM data are routed throughout the line switch. With this arrangement, a standardized interface between each processor and the PCM bus may be provided.

In addition to having the capability for establishing connections between subscriber lines connected to the line switch and the switching network 3, the present line switch has the capability of establishing intra-line switch connections without the switching network 3.

In accordance with the aforementioned security block organization the line switch 1 is organized as two identical line switch modules 1a, 1b. Each of the line switch modules 1a, 1b is self-contained to the extent that it can operate as a line switch and is connectable to up to 160 suscriber lines or loops. The 160 lines associated with a module are arranged as two clusters of lines. Each cluster is in turn divided into 10 groups of lines, each group includes 8 lines and in the illustrative embodiment each group of 8 lines has its associated line circuits arranged on one circuit card. It should be noted, that in other embodiments, a group may contain more or less lines and the lines may be arranged in one or more clusters.

Each line switch module 1a, 1b is coupled to the switching network 3 of FIG. 1 via two PCM lines PCMA, PCMB; bit clock lines CLKA, CLKB; and frame clock lines FSA, FSB. The PCM lines PCMA, PCMB operate at a 1.544 mbs. rate carrying 24 voice channels in a frame in the North American network or at a 2.048 mbs. rate carrying 30 voice channels in a frame in European and many foreign networks. Although two PCM lines are shown, the line switch module may be connectd to only one PCM line.

The frame clock lines FSA, FSB each provide a 4 KHz signal from the switching network 3 of FIG. 1 and each is used to identify which incoming bit is a common channel signaling bit. The common channel signaling bits occur in the 193rd bit position of every other frame. The intermediate 193rd bits are synchronization bits and are used to determine the A and B signaling frames.

The bit clock lines CLKA, CLKB each provide a 1.544 mHz clock.

The interface logic 6 operates to derive various clocking signals for use in the line switch module. More significantly, interface logic 6 multiplexes and interlaces the PCM channels from the two PCM lines PCMA, PCMB onto bus PCM4 and demultiplexes and separates PCM channels from bus PCM4 to the PCM lines PCMA, PCMB. More specifically, the bus PCM4 operates at a 4.096 mbs. rate. Data transmitted over bus PCM4 is arranged in frames of 512 bits, 480 of which are used for PCM. If the lines PCMA, PCMB operate at a 1.544 mbs. rate with 24 channels per frame, the channels on the lines PCMA, PCMB will be interlaced and rate converted to provide 48 channels each 10 bits wide at a 4.096 mbs rate on bus PCM4. If the lines PCMA, PCMB operate at a 2.048 mbs rate with 30 channels per frame, they will be interlaced and rate converted to provide 60 channels each 8 bits wide at a 4.096 mbs. rate on bus PCM4. The remaining thirty two bits of each 512 bit frame on PCM4 are used for internal control of the line switch module.

The line switch controller 7 receives common channel commands from the system controller 5 of FIG. 1 over the PCM lines PCMA, PCMB and via the interface logic 6. The line switch controller 7 communicates with and controls the various circuits of the line switch module via bus PCM4 by utilizing the aforementioned 32 bits.

Buffer and distributor circuits 9 are connected to the bus PCM4 and serve to buffer PCM signals between the bus PCM4 and the line cards 11, ring circuits 13, and other circuits. Two buffer and distributor circuits 9 in each line switch module are provided to partition the PCM buses into segments, i.e., security blocks, which are isolated from each other to prevent propagation of faults in the line switch and the impact of faults in a group of lines upon all other lines in the line switch. Both buffer and distributor circuits in a line switch module contain identical circuitry for buffering and distributing PCM signals and each is connected to one of two clusters of line circuits. Additionally, the buffer and distributor circuits 9 provide buffering to the PCM buses in the other line switch module of the line switch. Thus, each line switch controller 7 has access to all the line ciruits in both line switch modules of a line switch and PCM signals may be coupled to all circuits in a line switch. The buffer and distributor circuits 9 includes gating circuits which provide for intra-line switch calls between any two line circuits within the line switch without the need to route the calls through the switching network 3 of FIG. 1. Additionally, one of the buffer and distributors 9 of a line switch module includes circuitry for deriving various clocking signals from the various clock lines CLKA, CLKB, FSA and FSB.

Each buffer and distributor 9 is coupled to all th line and other circuits in a cluster by two PCM buses PCMLCA, PCMLCB each of which runs at a 4.096 mHz rate. One of the PCM buses, e.g. PCMLCA of line switch module 1a, is derived directly from the bus PCM4 in the same line switch module. The other of the PCM buses, e.g. PCMLCB of line switch module 1b, is derived from the bus PCM4 of the other module. In the North American Network each bus PCMLCA, PCMLCB will have 48 PCM channels at a 4.096 mHz rate. Thus each line circuit will have access to 96 PCM channels in the line switch.

As pointed out hereinabove, each group of 8 line circuits is arranged on a single circuit card. Each of group circuits is controlled by a microprocessor which is in turn controlled by the line switch controller 7 via the 32 control bits available during each frame. By providing a microprocessor on each line card the work load on the line switch controller 7 is reduced, flexibility of application is obtained, and maintenance functions may be more easily provided.

Ring cards or circuits 13 are provided in the line modules. The ring cards 13 also include microprocessors which reside on the ring cards. The ring cards contain their own ring frequency generator and a ring card is controlled by the line switch controller 7 via the 32 control bits available during each frame. Timing of the ringing is done via the microprocessors which reside on each line card and on each ring card.

Each line module also includes a power converter 12.

2.0 TRAFFIC HANDLING CAPACITY (FIG. 3)

The line switch shown in FIG. 2 can as noted above be configured such that each line switch module 1a, 1b is connected to the switching network 3 of FIG. 1 by one or more PCM lines PCMA, PCMB. Also, the line switch may be operated as either a 24 or 32 channel system. FIG. 3 illustrates the traffic handling capability of the line switch of FIG. 2 for different numbers of PCM lines in 24 or 34 channel systems.

3.0 PCM BUSES (FIGS. 4, 5, 6 and 7)

Each of the PCM buses PCMLCA, PCMLCB and PCM4 in the line switch of FIG. 2 carries information in frames of 125 microsec. in duration. One frame comprises 512 bits. Two alternate arrangements for formatting the 512 bit frame are shown in FIGS. 4 and 5 which may be found on the same sheet as FIG. 1. If the line switch is to be used in a 24 channel system, the frames will be arranged as shown in FIG. 4. Forty-eight channels of 10 bits each and 32 additional bits which are utilized as control bits for control of internal line switch functions are provided. By providing 10 bit channels, the line switch may be readily utilized in integrated digital switches proposed for the future wherein each channel will be arranged as shown in FIG. 5. FIG. 5 shows each frame arranged as sixty 8-bit channels and 32 control bits. Other formats may easily be utilized for use in other systems.

Figure 6:
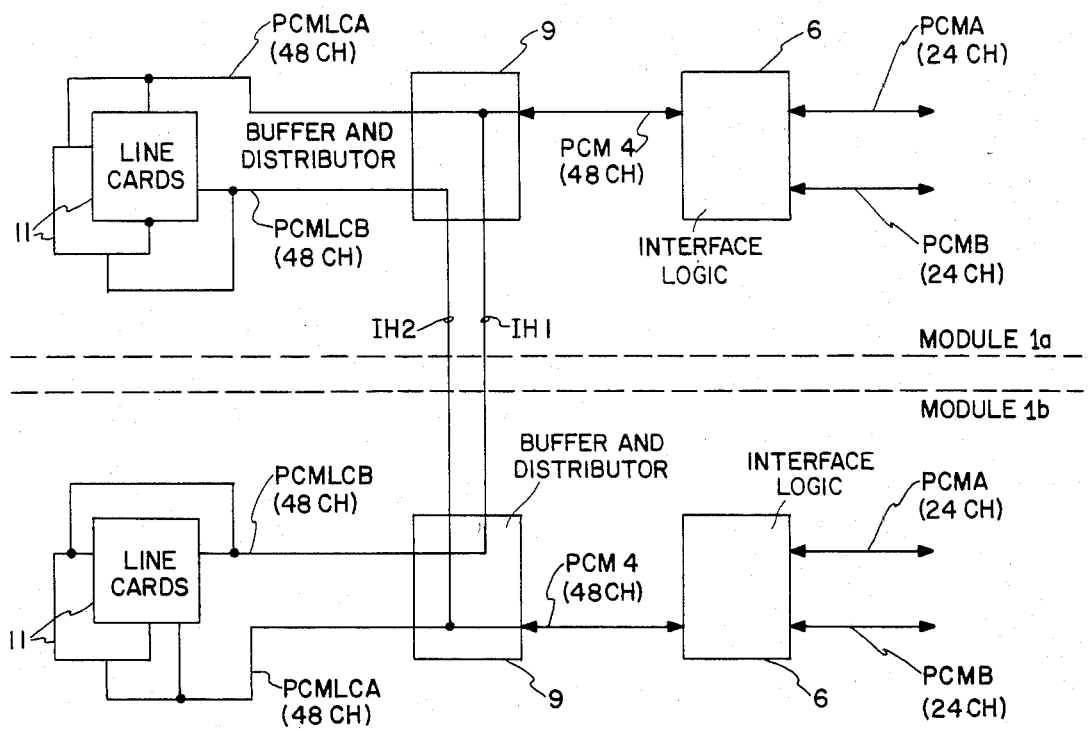
FIG. 6 illustrates in a general form the distribution of PCM channels within the two line modules of FIGS. 2 and 2A.

FIG. 6 illustrates the distribution of PCM channels in the line switch of FIG. 2 when used in a 24 channel system. To further simplify an understanding of the PCM channel distribution, only one cluster of line groups 11 and only one buffer and distributor 9 is shown for each line switch module 1a, 1b. The format of FIG. 4 is utilized. In each line switch module 1a, 1b two 24 channel, 1.544 mHz PCM lines PCMA, PCMB are connected to the interface logic 6. The interface logic 6 provides rate conversion and interlacing between th PCM lines PCMA, PCMB and the 48 channel, 4.096 mHz bus PCM4. The buffer and distributor 9 of each line module connects bus PCM4 to a 48 channel 4.096 mHz bus PCMLCA within the same module and via an inter highway bus 1H1 or 1H2 to a 48 channel, 4.096 mHz bus PCMLCB in the other module.

Therefore, each line circuit has access to a total of ninety-six 10 bit channels since PCMLCA and PCMLCB are each 48 channel buses. Further, with this configuration each line circuit has acces to the two 24 channel PCM lines PCMA, PCMB in the same module and also to the two 24 channel PCM lines PCMA, PCMB in the other module.

Figure 7:
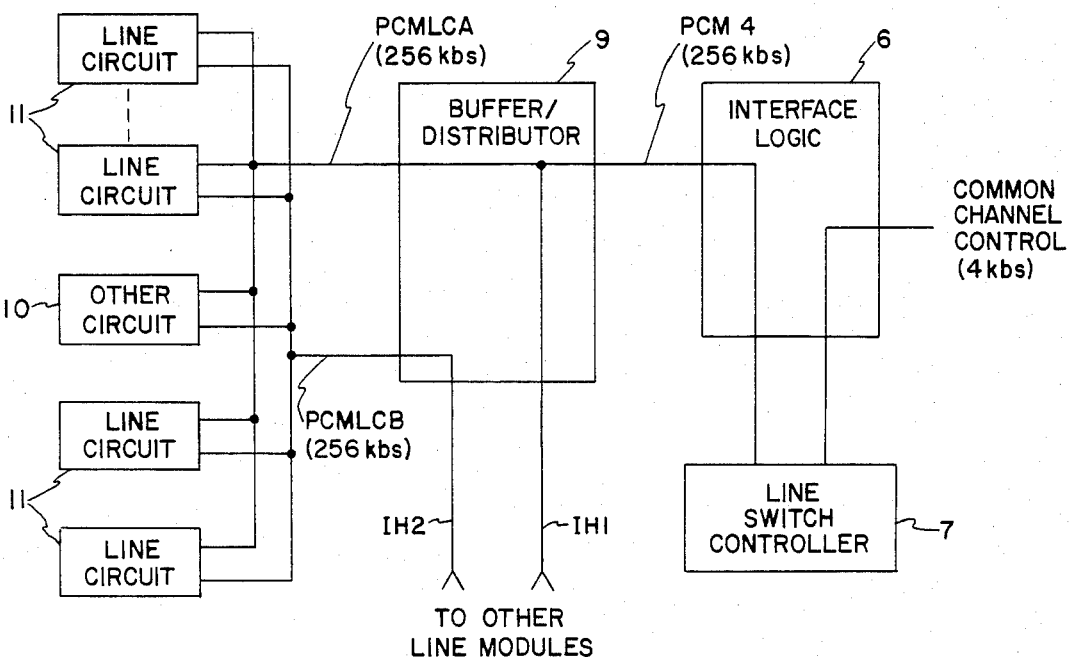
FIG. 7 illustrates in a general form the control communication paths within the line switch of FIG. 2.

As pointed out hereinabove, th line switches 1 are controlled by the system controller 5 of FIG. 1. The line switch controller 6, in turn control the operation of the line circuits 11 and other circuits within a line switch. Turning now to FIG. 7, the line switch controller 7 communicates with the system controller 5 via a common channel signaling arrangement over the PCM lines PCMA, PCMB as described in the aforementioned R. E. Steidl patent. If it is assumed that the PCM lines operate at a 1.544 mHz rate and one common channel signaling bit is provided in every other frame, then the common signaling channel operates at a 4 kbs rate, i.e. 1 bit/2 frames×8000 frame/sec=4 kbs. The buses PCM4, PCMLCA, PCMLCB are used to transmit 32 bits of control data per frame, each frame being 125 microsec. in duration. The buses PCM4, PCMLCA, PCMLCB operate as 256 kbs control data channels, i.e., 32 bits/frame × 8000 frames/sec=256 kbs. A line switch controller 7 thus provides a common 256 kbs control channel to each line circuit 11 or other circuit (which may be the ring circuit 13 or power converter circuit 12 of FIG. 2) via buses PCM4 and PCMLCA in a line switch module and additionally provides via bus 1H1 or 1H2 the same 256 kbs control data channel to other line switch modules in a line switch. Furthermore, bus 1H2 or 1H1 via bus PCMLCB provides a 256 kbs control channel from the other line switch modules in a line switch to the line circuits of the line switch module shown in FIG. 7.

4.0 INTERFACE LOGIC 6 (FIG. 8)

4.1 General

Figure 8:
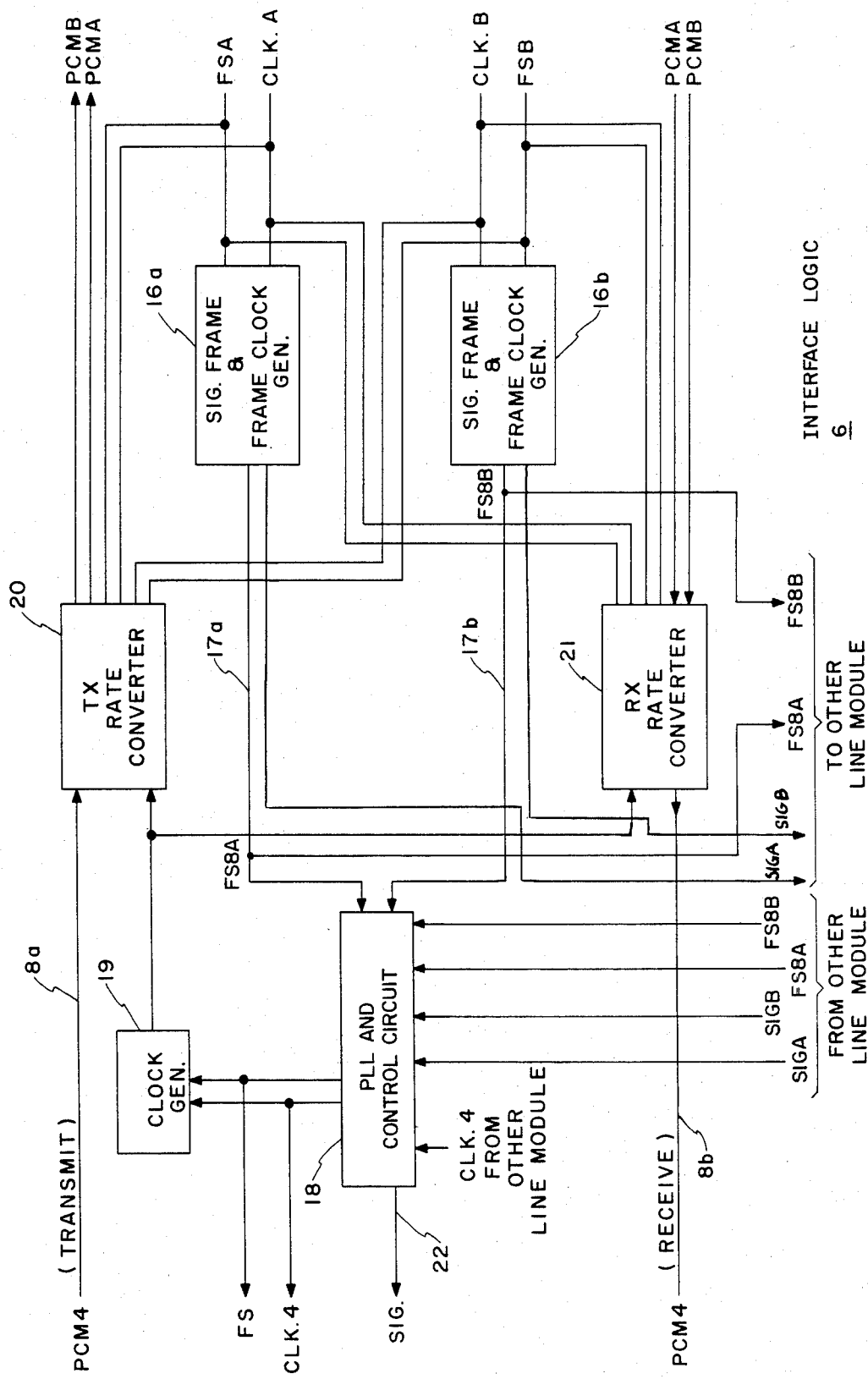
FIG. 8 illustrates in block diagram form the interface logic 6 of FIG. 2.

The interface logic 6 shown in block diagram form of FIG. 8 provides rate conversion and interlacing/demultiplexing of data between the two PCM lines PCMA, PCMB and the bus PCM4. Bus PCM4 and other PCM buses in the line switch are clocked at a 4.096 mHz bit rate. These buses must interface to the PCM lines PCMA, PCMB which clock PCM at a 1.544 mHz bit rate (or a 2.048 mHz bit rate in other applications). The interface logic 6 provides for the line switch internal clocks to be synchronized to the PCM line clocks CLKA, CLKB at frame boundaries such that no PCM bits are lost during rate conversion. This is accomplished by phase locking the internal clock to a PCM line clock by means of phase-locked loop (PLL) circuitry.

The rate converter portion of interface logic 6 includes memory elements for the PCM bit streams. The PCM data from bus PCM4 are written into a memory in the rate converter as the data for PCM lines PCMA, PCMB are read from the memory. Likewise, PCM data from lines PCMA, PCMB are written into a memory as the data for bus PCM4 is read from the memory.

Each of the two PCM lines PCMA, PCMB is connected to one of two corresponding identical signaling frame and frame clock generator circuits 16a, 16b. Each geneator 16a, 16b derives an 8 khz clock signal on leads 17a, 17b, respectively, from the bit clock signal received via the respective bit clock leads CLKA and CLKB and determines the presence of a signaling frame, and generates a signaling frame signal. The 8 kHz clock is applied to a phase-locked loop and control circuit 18 and is supplied to a corresponding phase-locked loop and control circuit 18 in another interface logic 6 via leads FS8A or FS8B. The phase-locked loop and control circuit 18 generates a 4.096 mHz clock which is phase-locked to a selected 8 kHz clock on leads 17a, 17b or on the leads FS8A, FS8B which come from an interface logic circuit 6 of another line switch module. Thus, the phase-locked loop 18 of a line switch module may be locked to any one of four 8 kHz clocks. The 4.096 mHz clock is provided on lead CLK4 and also to a clock generator circuit 19. The generator 19 provides a framing signal at an 8 kHz rate and clock signals at a 4.096 mHz rate for the transmit (TX) and receive (RX) rate converter circuits 20 and 21 respectively.

The PLL and Control Circuit 18 selects which one of the four 8 kHz clocks on lead 17a, 17b, FS8A and FS8B is to be used as a master clock of the line switch. The phase-locked loop and control circuit 18 contains failure detection circuitry for all the 8 kHz clocks. When the absence of a clock pulse occurs the failure detector will insert a pulse to maintain the oscillation frequency of PLL, and another one of the remaining working 8 kHz clocks will be selected as a master.

Additionally, there is cooperation between the PLL and control circuits 18 in the modules of a line switch such that all will operate to select the same 8 kHz derived clock as a master. This assures that the PLL's of all line switch modules are synchronized to the same clock source.

Each PLL further includes self-check circuitry such that, if a PLL fails, the PLL will automatically disconnect itself from the 4.096 mHz line CLK4 and connect the line CLK4 to the output of the PLL in the other line switch module.

4.2 RX RATE CONVERTER (FIGS. 8, A-D)

Rate conversion and interlacing/demultiplexing are provided primarily by the TX rate converter 20 and the RX rate converter 21. The bus PCM4 includes a transmit path 8a and a receive path 8b. Likewise, the PCM lines PCMA, PCMB have both transmit and receive paths.

Incoming PCM signals from the switching network 3 over lines PCMA, PCMB are applied to the RX rate converter 21. The RX rate converter 21 operates as a FIFO type memory. Information received over the PCM lines PCMA, PCMB is stored at the rate of the PCM lines, i.e. 1.544 mHz for the North American Network or 2.048 mHz for the other systems. More specifically for the North American Network data from PCM line PCMA is clocked into RX rate converter 21 at a 1.544 mbs rate as determined by the 1.544 mHz PCM clock line CLKA of PCM line PCMA. Likewise, data from PCM line PCMB is clocked into the RX rate converter 21 as determined by CLKB. The data stored in the RX rate converter 21 is read at a 4.096 mbs rate as determined by the 4.096 mHz output of clock generator 19. The 1.544 mHz clocks signals received over CLKA, CLKB are not necessarily synchronized. However, the 4.096 mHz clock signals are phase locked to the clock signals of one of the PCM lines connected to a line switch.

Data from the two PCM lines PCMA, PCMB is alternately read from the RX rate converter and applied to the receive portion of bus PCM4, i.e., path 8b. FIG. 9A illustrates the interleaving of channels from the PCM lines PCMA, PCMB onto the bus PCM4.

Figure 9C:
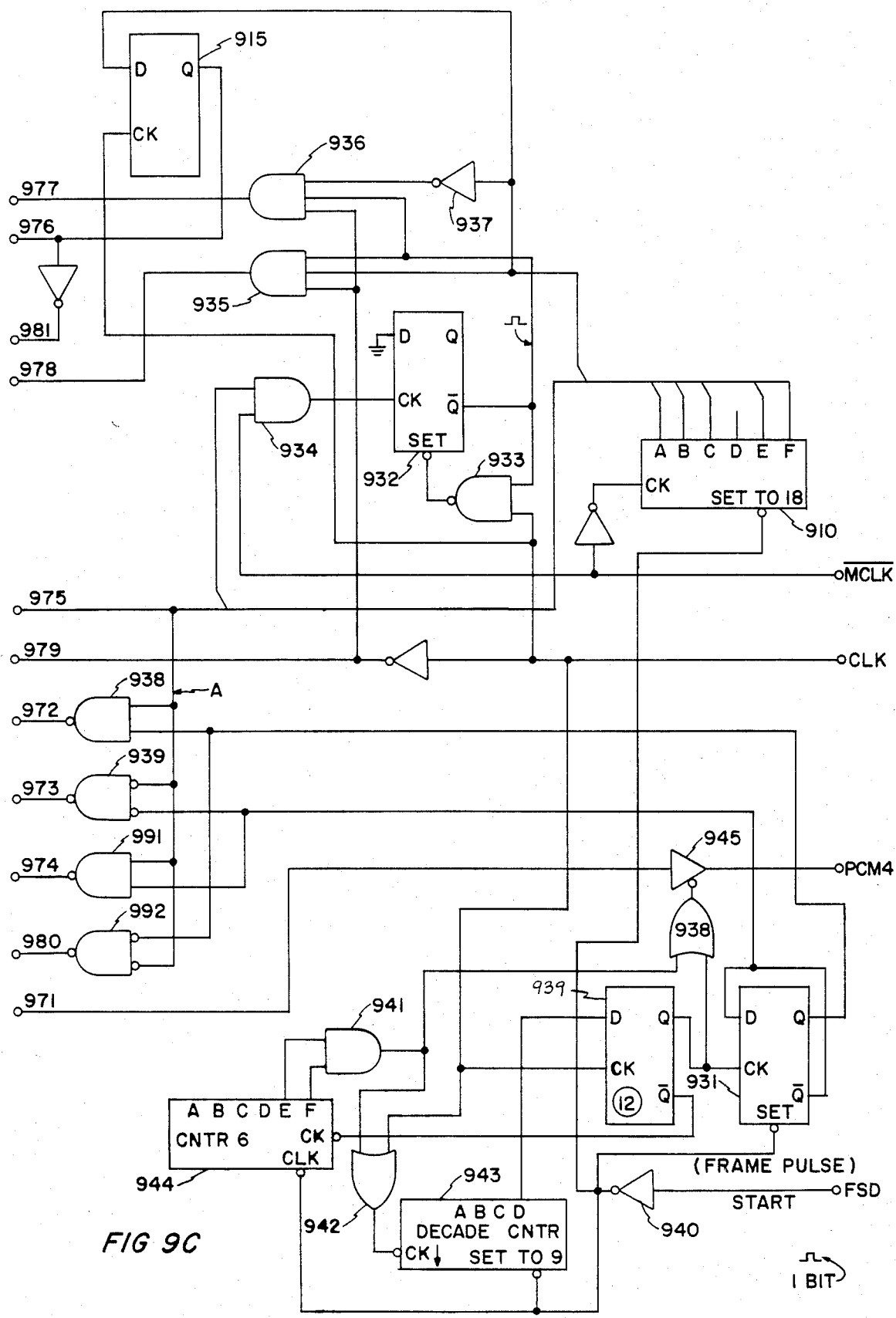
Figure 9D:
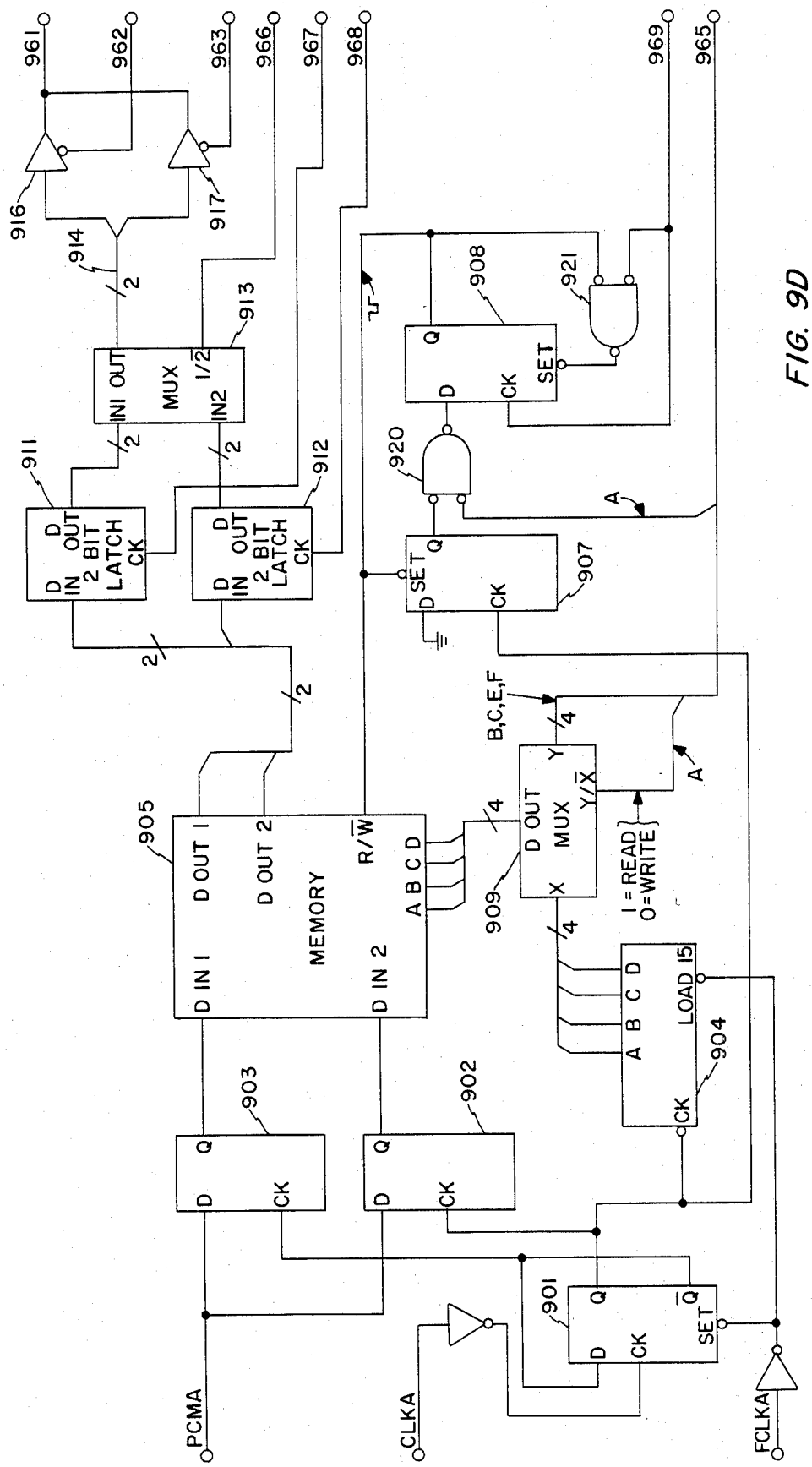

The RX rate converter 20 is shown in greater detail in FIGS. 9B, 9C and 9D. FIG. 9B illustrates the interconnection of the ciruicts of FIGS. 9C and 9D. The circuitry of box 951 for PCM line PCMA is duplicated in box 952 for PCM line PCMB and is shown in detail in FIG. 9D. FIG. 9C shows box 990 in detail. Turning now to FIGS. 9C and 9D, serial PCM data is received from PCM line PCMA. Alternately received bits are stored in buffer flip-flops 902 and 903 by flip-flop 901. After every other bit is stored in the flip-flops 902, 903, the write address counter 904 is advanced by one count and the two bits stored in flip-flops 902, 903 are stored in the memory 905. The flip flops 902, 903 act as a two bit serial to parallel converter and thus form two bit words for storing in the memory 905. Memory 905 is organized as sixteen 2 bit words and is a random access memory. Memory 905 includes four address bit inputs and read/write input. A read write control circuit comprising flip-flops 907, 908 and gates 920, 921 determines whether a read or write operation is to occur. An address selector 909 is used to select either a write address from counter 904 or a read address from counter 910.

When the data stored in flip-flops 902, 903 is to be stored in memory 905, the selector 909 selects the counter 904 as the source for the memory address and flip-flop 908 applies a write signal to the memory 905. When data is to be read from memory 905, selector 909 selects counter 910 as the source for the memory address and flip-flop 908 provides a read control signal to the memory 905. Data read from memory 905 is read as two bit words which are alternately stored in the two bit latches 911, 912. The flip flop 932 and gates 933, 934, 935, 936 and 937 control the loading of data read from memory 905 into the latches 911, 912. A selector 913 under control of flip-flop 915 alternately gates the outputs of the latches 911, 912 onto the two bit lines 914. Tri-state buffer gates 916, 917 controlled by gates 938, 939 alternately connect one of the lines 914 to the single line 961. The flip-flop 931 is used to select either the outputs from box 951 or 952 to be applied to the line 961. Flip-flop 931 changes its output state once for each voice channel on PCM4.

In effect, latches 911, 912; selector 913 and gates 916, 917 operate as a parallel to serial converter and flip-flop 931 operates to select either PCMA or PCMB as the source of data on PCM4. The read address counter 910 is driven by signal $\overline{\text{MCLK}}$ which as will be described below defines the format of PCM4. Pulses are provided by $\overline{\text{MCLK}}$ which correspond to the PCM voice bits on the bus PCM4.

The gates 938, 940, 941, 942, flip-flop 939, decade counter 943 and 6 bit counter 944 operate to control the tri-state buffer gate 945. Gate 945 is enabled when PCM data from either PCM line PCMA or PCMB is to be transmitted over PCM4. In accordance with the format for PCM4 shown in FIG. 4, gate 945 is enabled for the 8 PCM sample bit positions of each 10 bit channel and is disabled for the remaining two bits. Also, gate 945 is disabled for the 32 control bit positions in each frame.

Figure 10A:
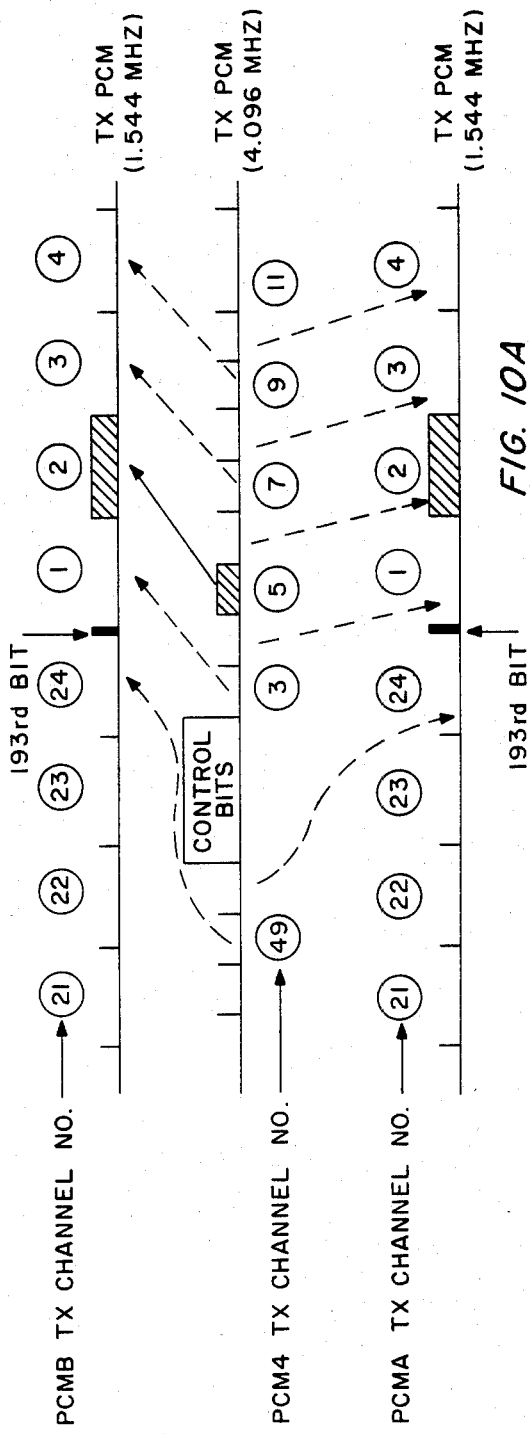
FIG. 10A illustrates the demultiplexing operation of the TX rate converter of FIG. 8.

4.3 TX RATE CONVERTER (FIGS. 8, 10A, B and C)

The TX rate converter 20 of FIG. 8 mirrors the operation of the RX rate converter 21. Specifically, the channels of data on the transmit portion 8a of the bus PCM4 are stored in a FIFO memory of the TX rate converter 20. Information is received at a 4.096 mbs rate and stored under control of the 4.096 mHz clock signals of clock generator 19. Alternate channels of data stored by the TX rate converter are forwarded to the PCM lines PCMA, PCMB at a 1.544 mbs rate as determined by the respective clock signals CLKA, CLKB or the PCM lines. This demultiplexing operation is shown in FIG. A.

Figure 10B:
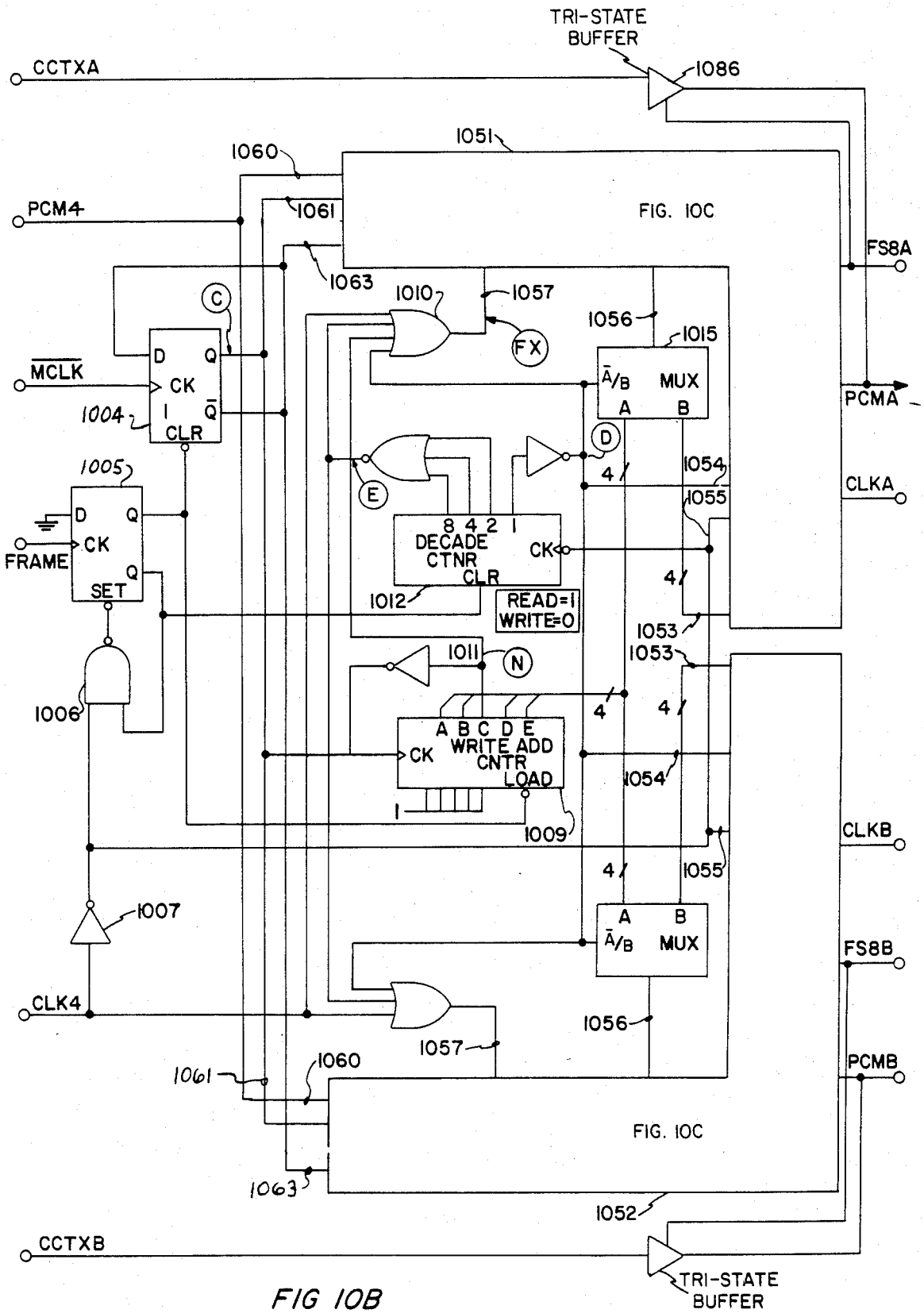
FIGS. 10B and 10C illustrate in block diagram form the TX rate converter 21 of FIG. 8.
Figure 10C:
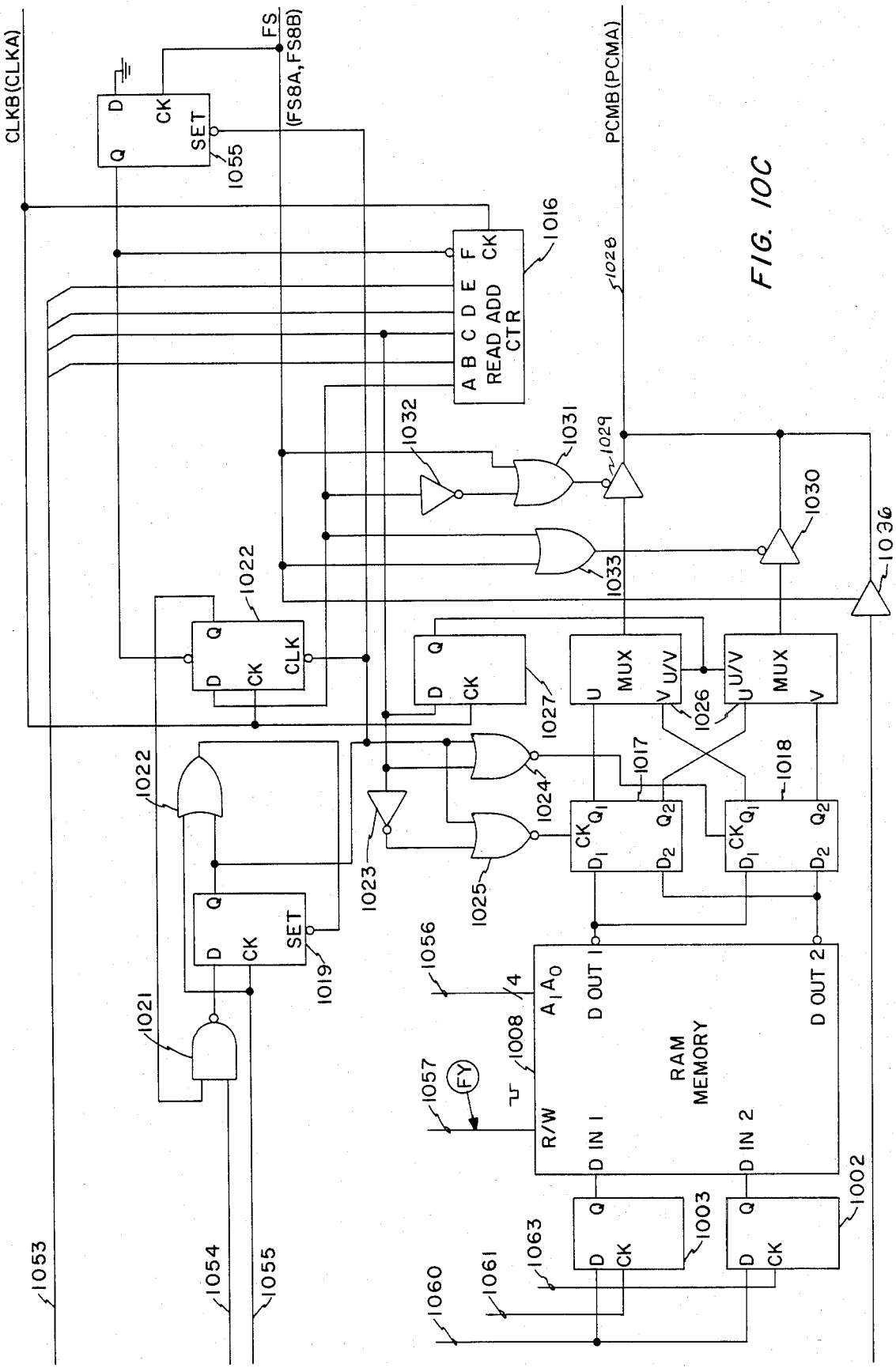

The TX rate converter 21 of FIG. 8 is shown in detail in FIGS. 10B and 10C. The circuitry in box 1051 for PCM line PCMA is duplicated in box 1052 for PCM line PCMB. Boxes 1051 and 1052 are shown in detail in FIG. 10C.

Serial PCM data is received over bus PCM4. Alternately received PCM sample bits are stored in the two buffer flip-flops 1002, 103. Flip-flop 1004 which is clocked by the signal $\overline{MCLK}$ selects which of the flip-flops 1002 or 1003 into which a PCM bit is to be stored. The flip-flop 1005, and gates 1006, 1007 are used to synchronize the operation of flip-flop 1004 each frame. After every other bit is stored in the flip-flops 1002, 1003, the two stored bits are written into memory 1008. Memory 1008 is a random access memory organized as 16 words of two bits each. Memory write addresses are generated by the counter 1009. Counter 1009 is a 5 bits binary counter which is clocked at one half the rate of the MCLK signals by flip-flop 1004. The C output of the counter 1009 is used to control gate 1010 and through an inverter 1011 controls if the corresponding memory on box 1052 is to be written or read. Decode counter 1012 and gates 1013, 1014 control whether data is to be stored in or read from memory 1008 and also counts the number of bits (10) in each channel on bus PCM4.

When counter 1012 contains a count of 0 or 1, a memory write operation is inhibited. Address selector 1015 is used to select the address input to memory 1008. Specifically, the selector 1015 selects output from counter 1009 for memory write address and counter 1016 for a memory read address. Counter 1016 is a 5 bit binary counter and is clocked by the PCM line clock CLKA. When data is read from memory 1008, the two bit words are alternately stored in the two bit latches 1017, 1018. Flip-flops 1019, 1020 and gates 1021, 1022, 1024, 1025 provide control for gating the data into the latches 1017, 1018. Gate 1023 in combination with the "C" output of counter 10106 provides for alternately selecting the latches 1017, 1018 for storing the read data. The selector circuit 1026 under control of flip-flop 1027 alternately gates the contents of latches 1017 and 1018 on line 1028. Tri-state buffer gates 1029 and 1030 controlled by gates 1031, 1032, 1033 are alternately enabled to alternately connect the two outputs of the selector 1026 to PCM line PCMA. Latches 1017, 1018, selector 1026 and gates 1029, 1030 operate as a parallel to serial converter.

The flip-flop 1055 clears the counter 1016 whenever the framing bit position during a frame on the PCM line PCMA occurs.

Tri-state buffer gate 1036 is enabled during the framing bit position to permit common channel signaling or framing information to be gated onto line PCMA.

The above described interlacing and demultiplexing operations are premised upon the use of 24 channel 1.544 mHz PCM lines PCMA, PCMB and the bus PCM4 having the format of FIG. 4. If, however, the PCM lines PCMA, PCMB are 30 channel 2.048 mHz lines then the PCM clock lines CLKA, CLKB would operate at 2.048 mHz and the format of FIG. 5 would be used for bus PCM4.

4.4 PHASE-LOCKED LOOP AND CLOCK CIRCUIT (FIGS. 2,8,11-20)

The rate converters require that the clock frequency of bus PCM4, i.e., be exactly 512/193 times the clock frequency of the PCM lines PCMA, PCMB. The phase difference between the two clocks must be controlled such that it falls within the limits required by the rate converter hardware.

The maximum phase difference between the internal line switch clock and the PCM line clocks that is tolerable to the rate converter is limited only by the amount of memory storage in the rate converter. However, a large tolerance for phase variation requires a larger amount of memory storage and causes a larger nominal delay in the rate converter.

The rate converter inherently causes 20 microseconds of nominal delay interfacing the 4.096 mHz PCM to 1.544 mHz PCM. Additional delay is designed into the rate converter to tolerate the phase variation in the internal line switch clock relative to the PCM line clocks CLKA, CLKB. To design the rate converter for minimum delay requires the phase variance of the clocks be tightly controlled.

The rate converter requires a specific relationship between the two clocks. This relationship is a defined sequence which repeats every frame (125 microseconds). At frame boundaries, (Bit 193 of the PCM line clocks) the rising edges of both clocks are synchronous when they are in phase. Any deviation is considered a phase error of the line switch clock.

In the illustrative embodiment of FIG. 2 two 4.096 mHz buses PCM4 are driven by the same clock, i.e. one bus in each of the line switch modules 1a, 1b. Up to four external PCM lines, PCMA, PCMB in both line switch modules, whose phase relative to one another can vary, will interface to the two buses PCM4. Since the 4.096 mHz clock will be phase-locked to an arbitrarily chosen PCM line, the rate converter must be capable of tolerating the phase difference relative to other PCM lines. Also, the failure of any one PCM line must not affect service on the other PCM lines. An extension of this philosophy requires that any single failure in the PLL circuitry not cause the loss of all four PCM liens. In summary, the PLL must have a phase error whose variance is minimized relative to the PCM lines;

The PLL must be capable of using any one of the PCM lines as a reference so that a failure of any PCM line doesn't affect service on the other PCM lines; and Two PLL circuits must exist that are independently selectable to ensure that a single failure in the PLL does not affect the PCM clock CLK4.

Figure 11:
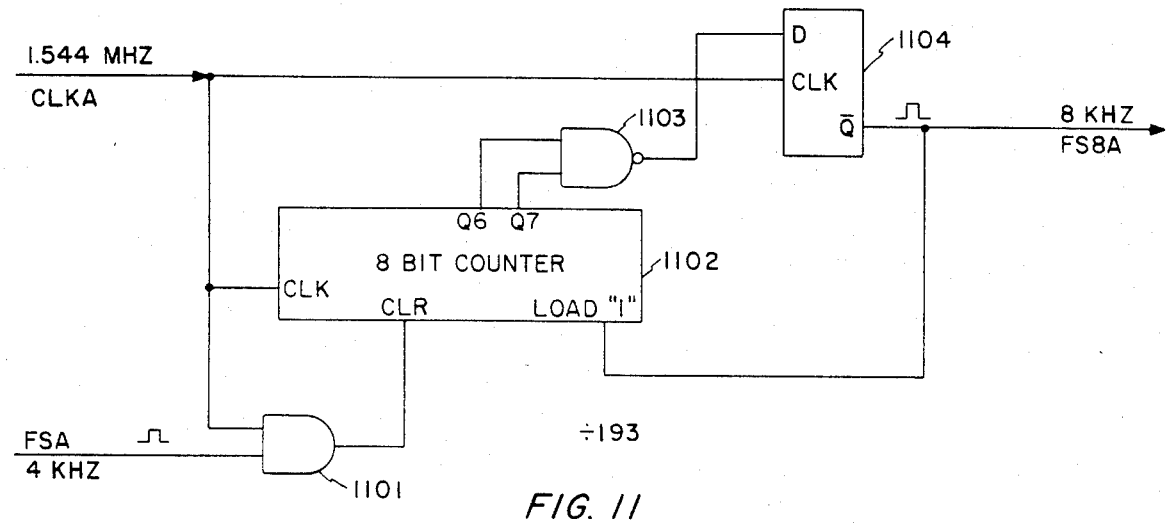
FIG. 11 illustrates in block diagram form a portion of generator 16a of FIG. 8.

The signaling frame and frame clock generators 16a, 16b of FIG. 8 includes a divider circuit to derive an 8 kHz signal from the 1.544 mHz PCM line clock and the signaling frame clock. The divider circuit for generator 16a is shown in detail in FIG. 11. The circuit includes gate 1101 connected to the input of an eight bit counter 1102. Decoder gate 1103 coupled to the eight bit counter provides an output to the "D" input of flip-flop 1104. Flip-flop 1104 has its clock input CLK connected to CLKA and its Q output provides an 8 kHz framing signal FS8A. The outputs FS8A and FS8B of generators 16a, 16b are provided as inputs to the PLLL and control circuit 18 of FIG. 8. Additionally these FS8A and FS8B outputs are provided to the other line switch module in a line switch. Similarly, FS8A and FS8B outputs from the other line switch module are provided as inputs to the PLL and control circuit 18 of FIG. 8. Thus, the PLL and control circuit has clock inputs derived from each of the four PCM lines connected to a line switch, i.e., the signals derived from CLKA and CLKB of line switch module 1a and those derived from CLKA and CLKB of line switch module 1b of FIG. 2. Additionally, each of the circuits 16a, 16b of FIG. 8 generates a signaling frame signal SIGA, SIGB respectively. The signaling frame signals are also supplied to the PLL and control circuit 18 from the circuits 16a, and 16b in both line switch modules.

Figures 12, 12B:
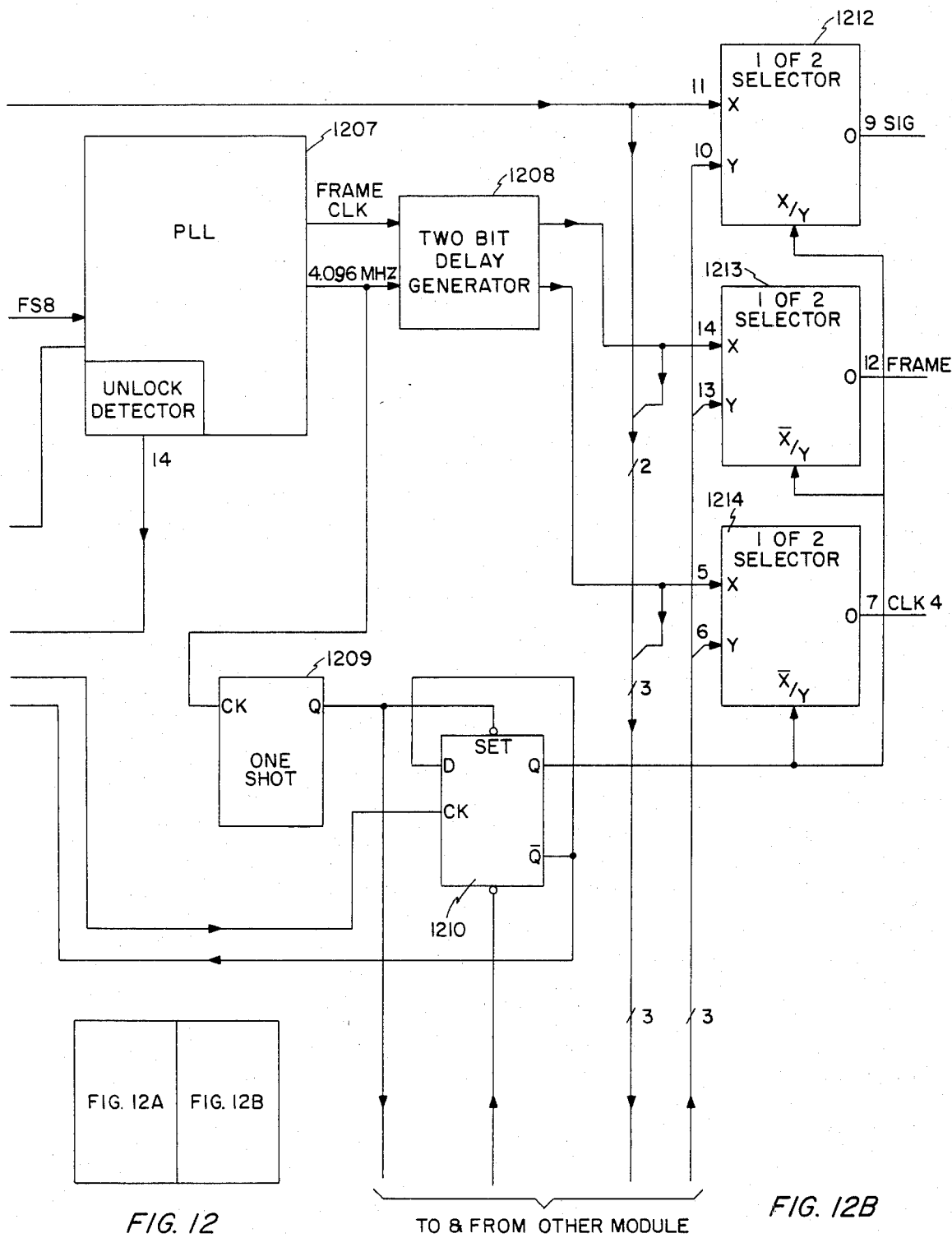
FIGS. 12A and 12B when arranged as shown in FIG. 12 illustrate in block diagram form the PLL and conrol circuit 18 of FIG. 8.
Figure 12A:
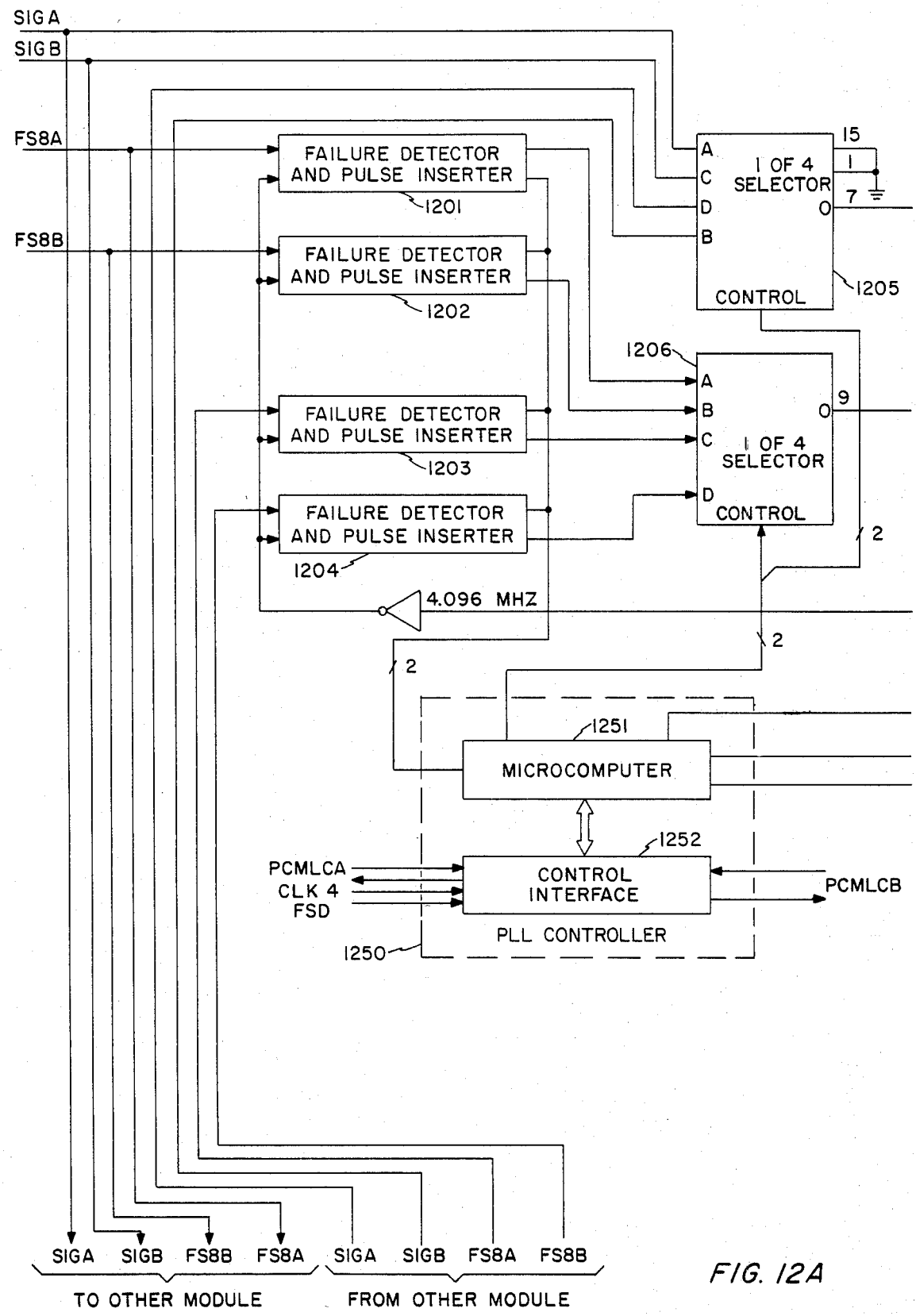
Figure 13:
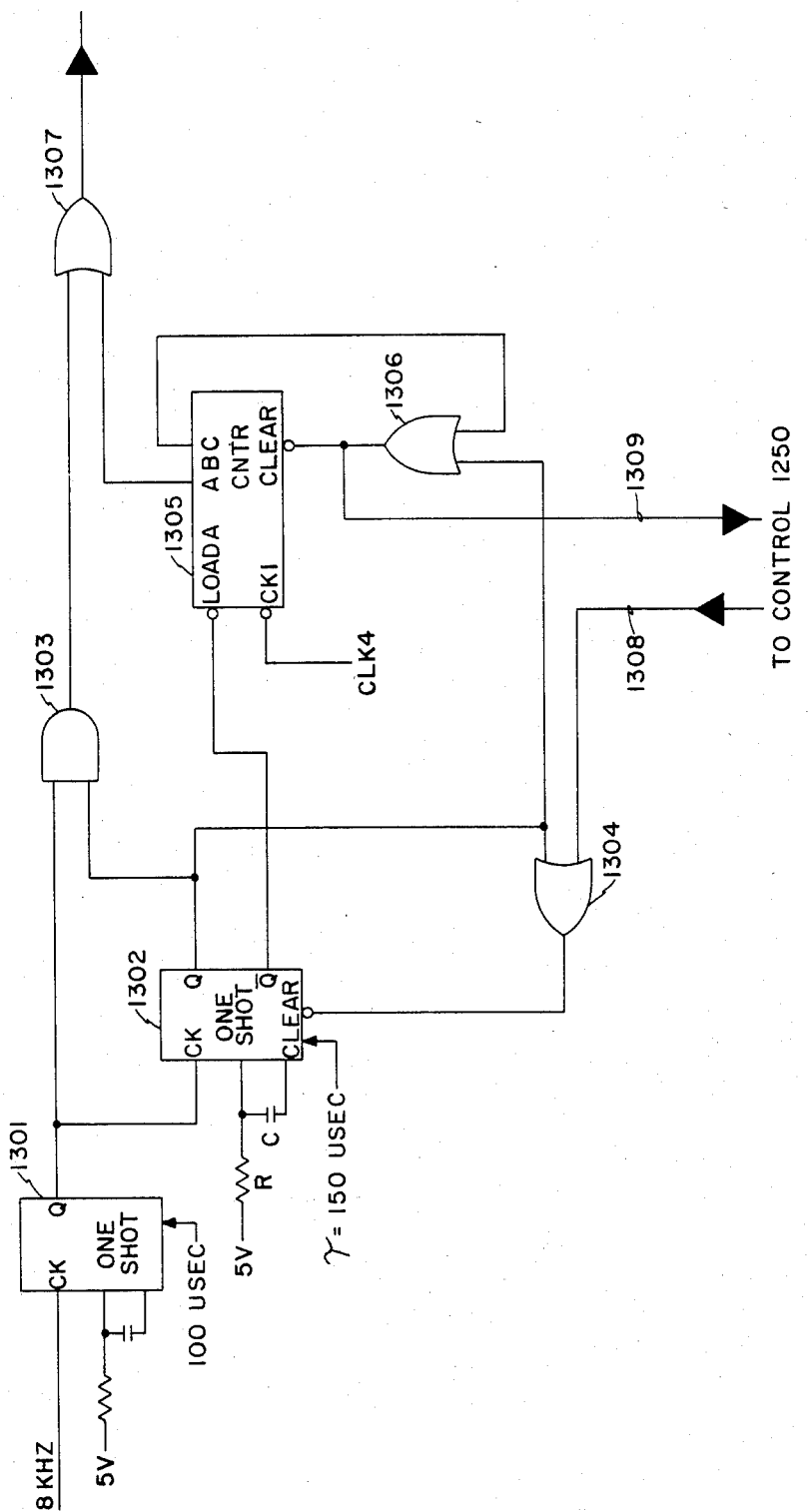
FIG. 13 illustrates in block diagram form failure detector 1201 of FIG. 12A.

Turning now to FIG. 12, the signaling frame signals SIGA and SIGB are coupled to a 1 of 4 selector 1205. Each of the four 8 kHz inputs FS8A, FS8B are individually connected to a failure detector circuit 1201, 1202, 1203, 1204. A 1 of 4 selector 1206 is to select one of the clock outputs from the failure detectors 1201, 1202, 1203, 1204 as the input FS8 to the phase-locked loop 1207. The selector 1206 as well as selector 1205 is controlled by the PLL controller 1250. The PLL 1207 is locked to the selected input. If a failure should occur in the PCM line from which the signal FS8 is derived, service to the other PCM lines would be interrupted if there was no capability of change from the PCM line to which it is phase-locked. The failure detectors 1201, 1202, 1203, 1204 detect failures in the PCM lines. FIG. 13 illustrates in detail the failure detector 1201. Normally, a clock pulse at the 8 kHz rate of FS8A arrives every 125 microsec. If, however, the time between two pulses is less than a predetermined interval, i.e., 100 microsec., the one shot 1301 will prevent the fast pulse from being propagated. If the time interval between pulses is greater than 100 microseconds, (and less than a second predetermined interval as discussed below) the pulse will be transmitted through gates 1303 and 1307. If the time interval between pulses is greater than the second predetermined interval, i.e., 150 microseconds, the one shot 1302 will time out, its Q output will go low inhibiting gate 1303. Additionally, the PLL controller 1250 will maintain a logic low on lead 1308 with the result that the clear input to one shot 1302 is low. With the clear input low, the output Q is maintained low. Thus, the one shot 1302 is "latched" in the low state. When Q is low, $\overline{Q}$ is high. Three bit binary counter 1305 is arranged such that when Q is low, a binary 4 (ABC=001) is loaded and when Q goes high, the counter 1305 may begin counting. Counter 1305 has a clock input coupled to the 4.096 mHz clock CLK4. When the counter reaches binary count 6 (ABC=011) a signal is provided at the output of gate 1307. The output signal will persist through a binary count of 7 (ABC=111) and will terminate at the next binary count (ABC=000) i.e., a binary count of 0. When a binary count 0 is reached, the output signal at gate 1307 is terminated, a low is applied to the clear input of counter 1305 causing counter 1305 to "latch-up".

Additionally, a signal is provided to the PLL controller 1250 on line 1309 indicating that a failure has occurred. Thus, if a pulse is absent for more than 150 microsec. a "phantom" pulse is provided and the PLL controller 1250 is informed of the failure. The PLL controller 1250 will select a different one of the PCM lines to use as a reference for the PLL 1207. The phantom pulse is required to insure that the PLL 1207 does not miss a pulse. If no pulse were to occur, the PLL 1207 would function as though it were an entire frame out of phase and would slow down the 4.096 mHz clock CLK4 to correct for this. This would result in the rate converter losing several frames of PCM before frame resynchronization had occurred. Since the phantom pulse is out of phase with a normal pulse stream, it does cause an aberration in the operation of PLL 1207. However, the PLL 1207 has a narrow loop bandwidth such that its output will be within the limits of the rate converter tolerance. The aberration in the PLL is less than 100 nanosec. of phase change.

Figure 14:
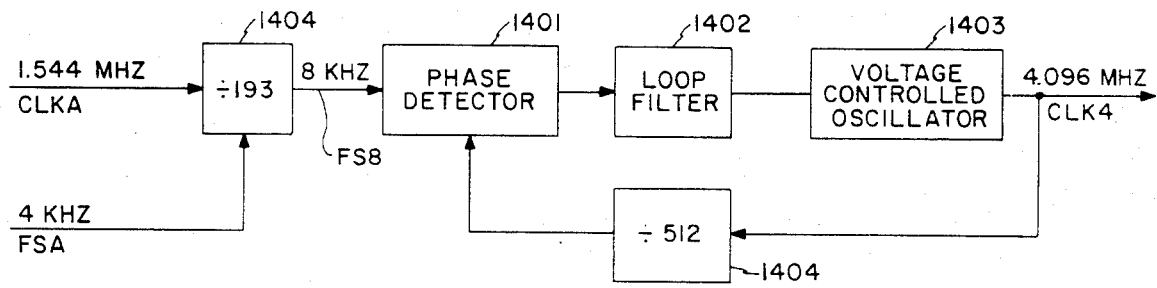
FIG. 14 is a block diagram of PLL 1207 of FIG. 12B.

A block diagram of the PLL 1207 is shown in FIG. 14.

The PLL 1207 comprises a clock input FS8 to which a voltage controlled oscillator (VCO) 1403 is slaved. This is accomplished by dividing both the output of the VCO and the input clock to get a common frequency, i.e. 8 kHz. The signaling frame and frame clock generator 16a of FIG. 8 divides the incoming 1.544 mHz PCM line clock CLKA to obtain an 8 kHz output FS8A which is in this example selected by selector 1206 of FIG. 12 to provide signals on FS8. The divider 1404 of FIG. 14 divides the 4.096 mHz output of VCO 1403 to also generate an 8 kHz signal. The phase detector 1401 generates an error current which is integrated by the loop filter 1402 to control VCO 1403. When CLK4 is phase-locked to FS8, the frequency of VCO 1403 is exactly 512/193 times CLKA.

Figure 15:
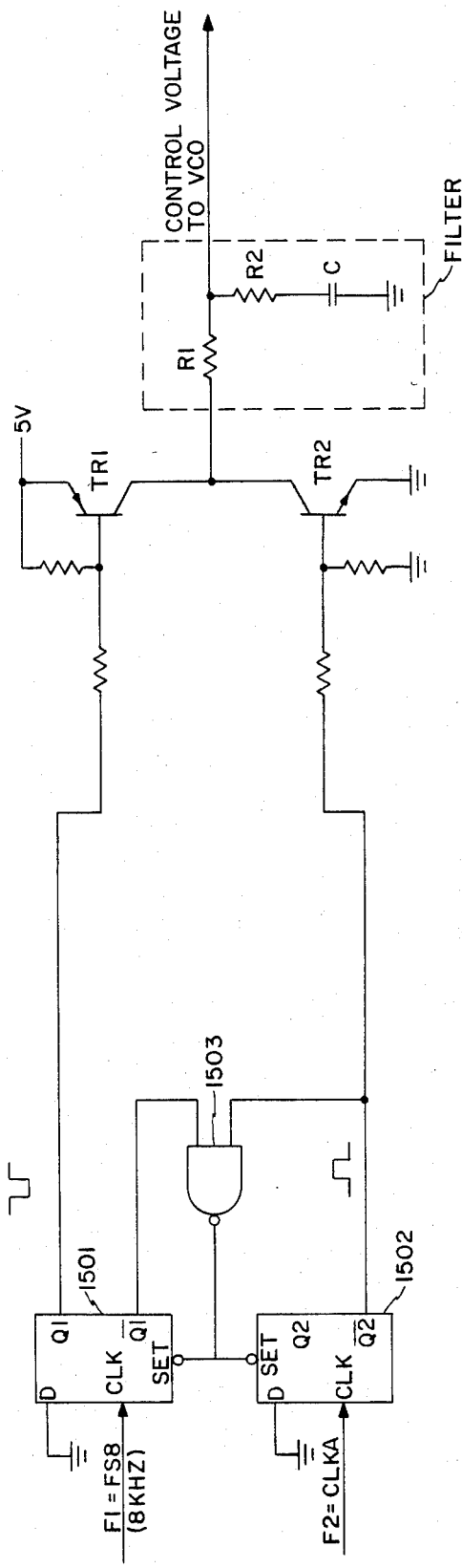
FIG. 15 illustrates in block diagram form the phase detector of FIG. 14.

In order to minimize the phase variance in the PLL 1207, a phase detector is provided that gives a phase error near zero under steady state conditions. A simple phase detector that meets this critical requirement is shown in FIG. 15.

This phase detector requires TTL compatible inputs and unlike a quadrature or an EXCLUSIVE-OR type of phase detector, it is not duty-cycle dependent on the inputs since it is strictly rising-edge sensitive which prevents phase lock from occurring on an integer multiple (harmonic) of the desired VCO frequency. It similarly rejects subharmonic phase lock.

Figure 16:
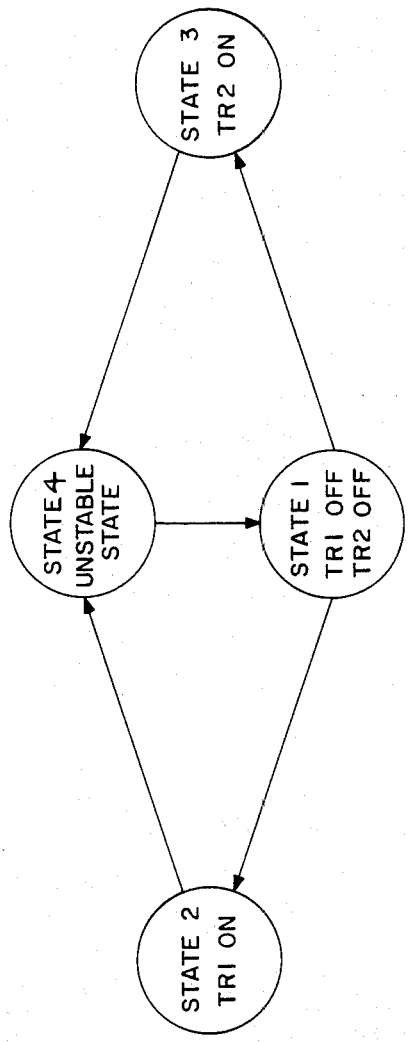
FIG. 16 is a state diagram for the phase detetor of FIG. 14.

The outputs (Q1 and Q2) of flip-flops 1501, 1502 have the following four states:
State 1=Both Q1 and W2 high
State 2=Q1 is low, Q2 is high
State 3=Q1 is high, Q2 is low
State 4=Both Q1 and Q2 low State 4 is an unstable condition since this causes a set pulse which returns the flip-flop pair of State 1. State 1 is the "off" state in that both transistor switches (TR1 and TR2) are turned off in that state. FIG. 16 shows the state diagram of the phase detector.

The phase detector cycles through the state diagram (FIG. 16) starting at State 1 progressing to either State 2 or 3, to State 4, and returns to State 1. It makes this cycle once every 125 microseconds staying in State 1 for a large duration of the cycle. If F2 lags F1 in phase, the detector cycles through State 2; if F2 leads F1, it cycles through State 3. The time it is in State 2 or 3 is equal to the phase difference between F1 and F2. Thus, the phase detector has a +360 degrees of phase error operating range. If the error exceeds 360 degrees in either direction or F2 is not equal to F1, the cycle time is not necessarily 125 microseconds (out of lock condition). However, the phase detector will always cycle through State 2 when F2 is less than F1 and through State 3 when F2 is grater than F1. Therefore, the phase detector will, in all cases, drive the control voltage toward a locked condition.

When in State 2 or 3, TR1 or TR2 is "on" causing current to be pumped into or out of the loop filter capacitor (C). When fed into an infinitely high impedance, the voltage on the capacitor represents the summation (or integral) of all past phase errors. This is extremely important, since different VCO's require different control voltages to oscillate at 4.096 mHz. The phase detector will operate at nearly zero phase error under steady state conditions independent of the DC voltage on the control voltage line. TR1 and TR2 need only to be turned on to correct for changes in PLL operating conditions and to replace the small amount of charge lost in the capacitor due to circuitry leakage during each 125 microsecond period. The phase error is independent of the vast majority of the PLL parameters including loop gain, supply voltage, loop filter values, and all VCO characteristics. In comparison, when using phase detectors in which the control line voltage is directly proportional to the phase error, the phase error is much more difficult to control. With such phase detectors any required change in control voltage (due to part variance or temperature change) causes a proportional phase error change.

Figure 17:
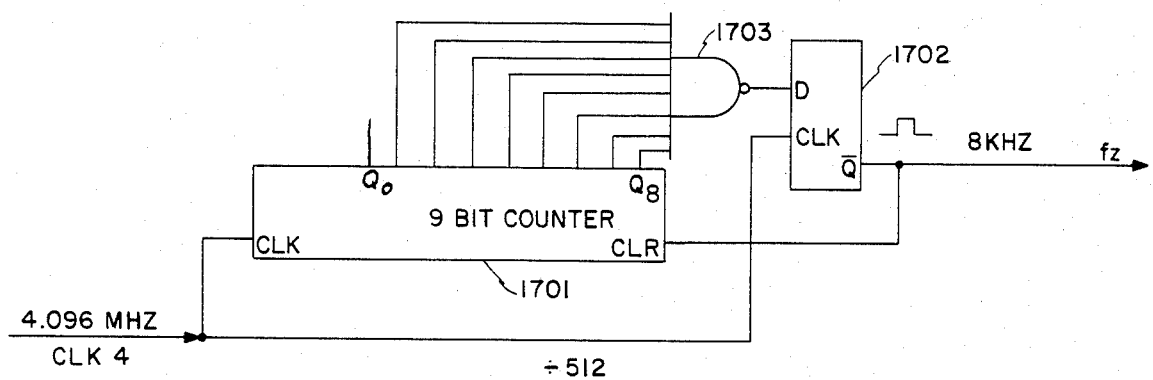
FIG. 17 is a block diagram of divider 1404 of FIG. 14.

Phase error between the VCO and its reference is dependent primarily on the propagation delay through the dividers (512 and 193) and the phase detector. The dividers were both designed with this consideration and have only one flip-flop delay from input to output. The ÷193 counter is that of FIG. 11 and the −512 counter is shown in FIG. 17. The phase detector uses two flip-flops that are inherently closely matched since they are in the same integrated circuit package.

The PLL has a measured nominal phase difference between F1 and F2 at the phase detector of 10 nanoseconds (less than 0.03 degrees). The total phase difference between CLK4 and CLKA or CLKB will be larger since there are additional circuit delay tolerances that affect the total phase difference. These include delay tolerances in the dividers, failure detector circuits, selectors and buffering circuits. The worst case phase difference between CLK4 and CLKA or CLKB is under 200 nanoseconds using LSI-TTL technology.

The phase/frequency discrimination attributes of the phase detector give the PLL a capture and lock range limited only by the frequency range of the VCO. This allows great flexibility in the design of the remaining portions of the PLL.

Figure 18:
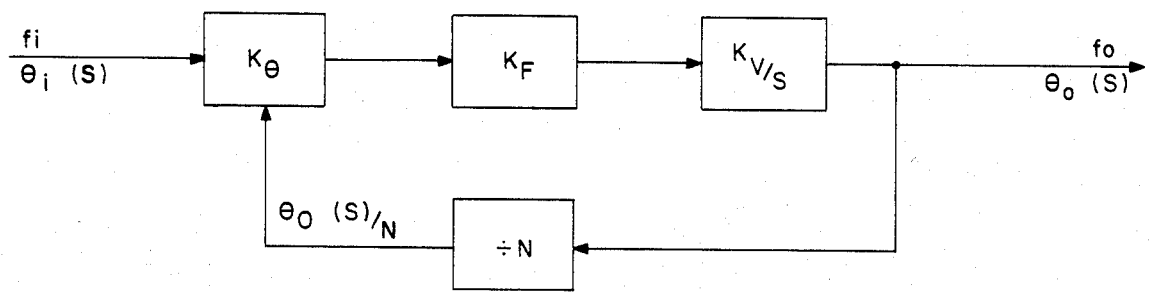
FIG. 18 is a block diagram of loop filter 1402 of FIG. 14.

The design of the loop filter 1402 of FIG. 14 involves several requirements. First, the loop must remain stable under all operating conditions. Secondly, the loop bandwidth must be selected such that the aberration i the 8 kHz reference caused by a PCM line failure, does not cause the VCO to shift in frequency excessively. A damping factor greater than 0.7 is desirable for stability. A damping factor under 0.7 is underdamped with zero being the limit before oscillations result. For stability analysis, the PLL can be modeled as shown in FIG. 18.

Figure 19A:
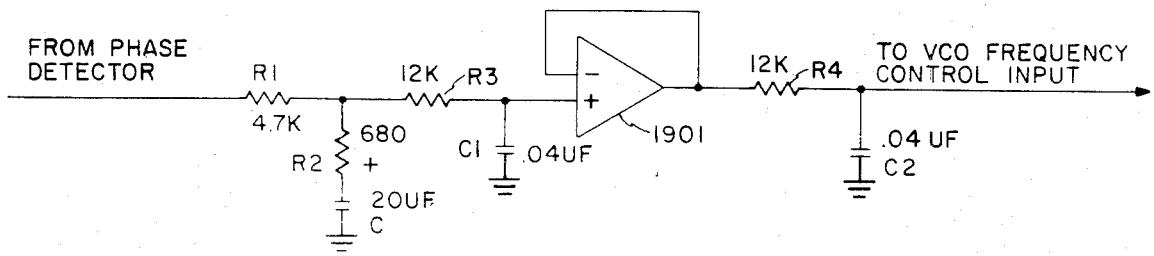
FIG. 19A is one embodiment of loop filter 1402 of FIG. 14.
Figure 19:
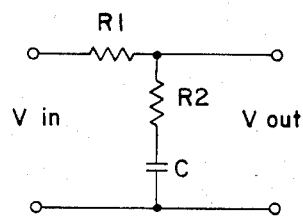
FIG. 19 is a basic loop filter circuit.

Using Laplace Transforms, it is possible to analyze the stability of the PLL. Using servo theory, $$\theta_o(s) = \frac{G(s)}{1 + G(s)H(s)} \theta_i(s)$$

where $\theta_o(s)$ = Output phase
$\theta_i(s)$ = Input phase
G (s) = Forward gain product = $K_O \times K_F \times K_V/s$
H (s) = Feedback gain product = $1/N$ Three of the gain blocks (Ko, Kv, and N) are fixed. The transfer function of the loop filter is selectable. The loop filter of FIG. 19 is chosen for its great flexibility in determining both loop natural frequency ($\omega n$) and damping ($\zeta$).

$$\frac{V_{out}}{V_{in}} = \frac{sR_2C + 1}{s(R_1 + R_2)C + 1} \quad (2)$$

$$K_F = F_{(s)} = \frac{\tau_2 s + 1}{\tau_1 s + 1}$$

where $\tau_2 = R_2 C$
$\tau_1 = (R_1 + R_2) C$

Referencing FIG. 18, forward gain and reverse gain products are entered into Equation 1 and reduced to Equation 4.

$$\frac{\theta_o(s)}{\theta_i(s)} = \frac{K_\theta K_V(\tau_2 s + 1)/\tau_1}{s^2 + 2\zeta\omega_n s + \omega_n^2} \text{ where}$$

$$\omega_n = \sqrt{K_\theta K_V / \tau_1 N} \text{ rad/sec.} = \text{natural frequency of } PLL \text{ and}$$

$$\zeta = \frac{1}{2}\left(\frac{1}{\tau_1 \omega_n} + \omega_n \tau_2\right) = \text{damping factor of } PLL$$

Table 1 lists the values of the PLL parameters used to determine the loop damping factor ($\zeta$) and natural frequency ($\omega_n$).

TABLE 1

| PLL GAIN PARAMETERS |
|---|
| $K_v$ = 550 kHz/volt = 3.46 × $10^6$ rad/volt-sec. |
| $K_O = \frac{5V}{4\pi}$ volts/rad = .398 volts/rad. |
| N = 512 |
| $K_F = \frac{\tau_2 S + 1}{\tau_1 S + 1}$ $\tau_2$ = 13.6 msec; $\tau_1$ = 107.6 msec. |
| These are used in Equation 4 to obtain the following: |
| $w_n$ = 158 rad/sec. (25.1 Hz) |
| $\zeta$ = 1.09 |

This indicates a PLL with a narrow loop bandwidth and is very stable since it is overdamped.

Figure 20:
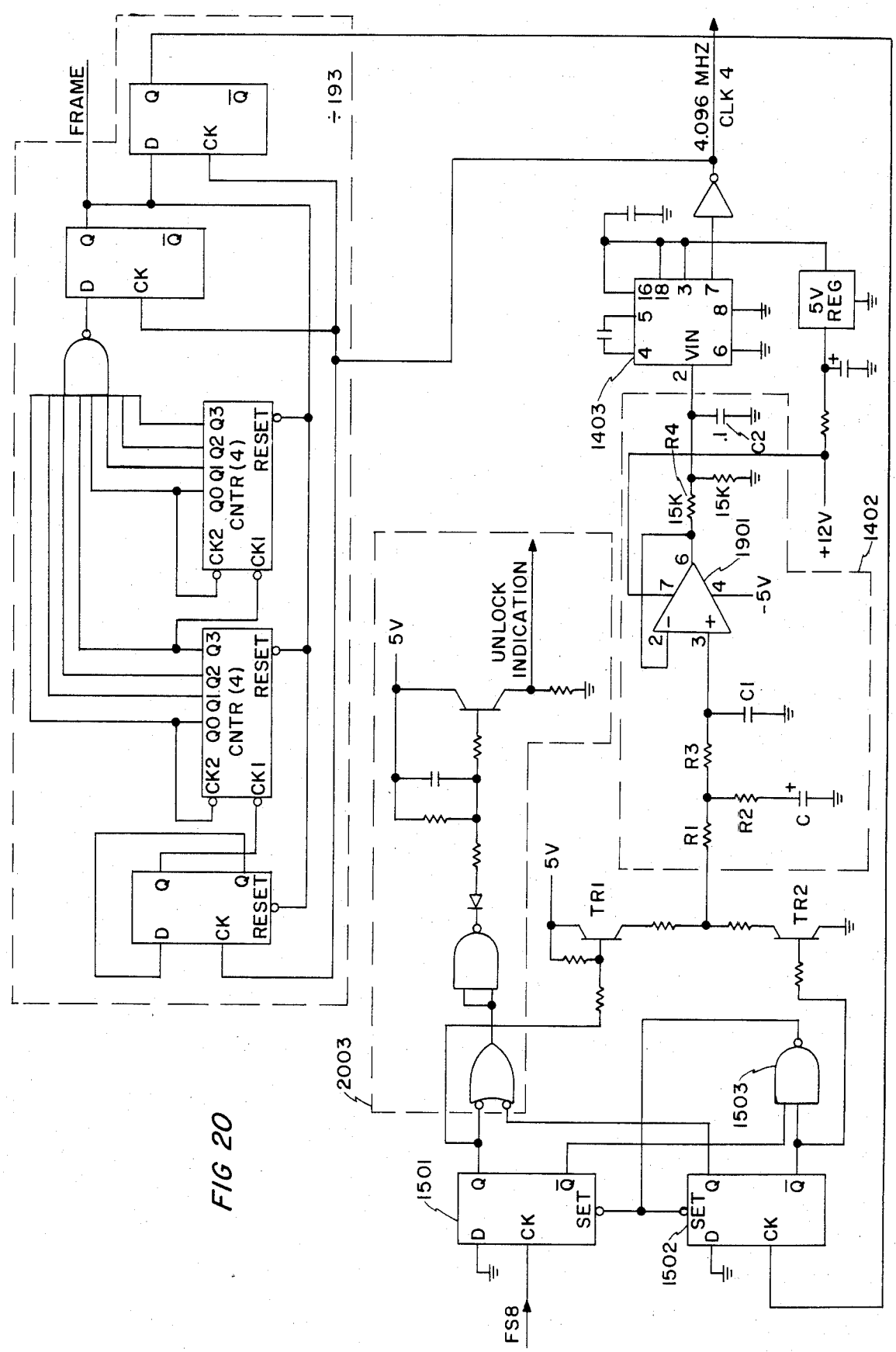
FIG. 20 is a schematic diagram partially in block form of the PLL 1207 of FIG. 12B.

Two low-pass sections were added to the basic loop filter shown in FIG. 19 in order to reduce the aberration caused by a PCM line failure. In addition, isolation is provided between the VCO and active loop filter circuitry at the VCO operating frequency of 4.096 mHz. Turning to FIG. 19A which illustrates the loop filter in simple form, the corner frequencies of the two low-pass filters R3, C1 and R4, C2 is more than an order of magnitude higher in frequency than the natural frequency of the PLL. Thus, the additional phase shift contributed by these filters is negligible and lowers the damping factor only slightly. A J-FET input op amp- 1901 is used to provide the low leakage required since the VCO has an input impedance under 100K ohms. FIG. 20 illustrates in detail the complete phase-locked loop circuit combining the circuits of FIGS. 15, 17 and 19A. An unlock indication circuit 2003 provides a signal indicating if the phase-locked loop fails to maintain a locking.

The choice of the VCO is often the most important part of the design of a phase-locked loop. However, in this application, the PLL characteristics that the VCO determine are not critical. This includes phase noise, voltage to frequency conversion linearity, temperature sensitivity, frequency range and spectral purity. Three different VCO's were investigated. All were IC designs available from multiple sources and all met the requirements necessary for this application. The MC4024 and 74LS124 are TTL multivibrator designs using an RC network to determine frequency. These parts have very similar performance with approximately 4 nanoseconds of phase jitter at the phase detector. This correlates with the MC4024 specification of 120 Hz RMS (typical) frequency noise deviation at 4.096 mHz. The MC1648 VCO is an ECL IC oscillator design requiring an external varactor and coil. Because of the higher Q elements, it has superior phase noise and spectral purity. At 4.096 mHz, the RMS frequency deviation is specified at less than 20 Hz. This corresponds to a phase jitter at the phase detector of less than 1 nanosecond. With the test equipment available, no phase jitter could be detected.

Turning back to FIG. 12, the output of the PLL 1207 is coupled to a one shot 1209 which acts as a failure detector. If the PLL 1207 fails to be reset within 350 nanosec., it will set flip-flop 1210 and will provide a failure indication to the PLL controller 1250. Flip-flop 1210 will automatically operate the selector 1214 to switch to the phase-locked loop in the other line switch module, e.g., 1b of FIG. 2. The PLL controller 1250 must however switch the PCM line clock, e.g., CLKA, to the PLL 1207 in the other module without missing clock pulses. The 500 nanosec. delay 1208 permits switching to the other PLL without missing clock pulses since the delay 1208 provides clock pulses for 500 nanosec. after the first PLL 1207 has failed. The selectors 1212 and 1213 are also controlled by flip-flop 1210 to switch the source for SIG and FRAME to the other line switch module.

The PLL controller 1250 includes a microcomputer 1251 and an interface. circuit 1252. The microcomputer 1251 in the illustrative embodiment is an INTEL 8049 micromputer. The interface comprises a protocol interface circuit (PIC) which will be described in greater detail in conjunction with the line group controller. The INTEL 8049 microcomputer is described in INTEL COMPONENT CATALOG 1979, INTEL CORPORATION, 1979, pp 8-27 to 8-30.

The system controller 5 selects which PCM line clock is to be initially selected as the master clock to which the line switch clock circuits are to be synchronized. The system controller 5 informs the line switch controllers 7 in the line switch of the initial selection. The line switch controllers 7 then direct the respective microcomputers 1251 to the initial selection. If one of the line module microcomputers 1215 detects a failure in the clock circuits, it arbitrarily switches to another line clock to be used as a master. The failure detecting microcomputer will send information back to the system controller 5 via line switch controller 7 identifying the newly selected PCM line clock. The system controller 5 will then transmit command information to the other module microcomputer 1251 via the respective line switch control 7 directing the other modules microcomputer to select the same PCM line clock as master. Thus, all modules within the line switch utilize the same PCM line clock to derive the internal line switch clocks.

5.0 LINE SWITCH CONTROLLER (FIGS. 9B, 9E to 9N, 10B 10C)

The line switch controller 7 communicates with the system controller 5 of FIG. 1 via the PCM lines PCMA, PCMB. The line switch controller 7 transmits and receives information over the common channeling signaling bits of the PCM lines PCMA, PCMB via the RX and TX rate converters. More specifically, turning to FIG. 9B, each time a common channel signaling bit appears on the PCM line, PCMA or PCMB, the associated clock lead FSA or FSB will provide a pulse. The clock pulse on the lead, e.g. FSA will cause the common channel signaling bit to be loaded into a buffer flip-flop 950A or 950B. The output of buffer flip-flop 950 or 950B is present to the line switch controller via lead CCRXA or CCRXB. Information from the line switch controller 7 is inserted into the common channel signaling bit portions on lines PCMA and PCMB under control of the clock leads FS8A, FS8B. Turning to FIG. 10B, common channel signaling information from the line switch controller 7 for PCM line PCMA is provided on lead CCTXA and for PCM line PCMB on lead CCTXB. Tri-state buffer gate 1086 is enabled by CLKA during the common channel signaling bit time and gates the data bit from line CCTXA into PCM line PCMA. Likewise, data from lead CCTXB is gated onto PCM line PCMB.

Figure 9E:
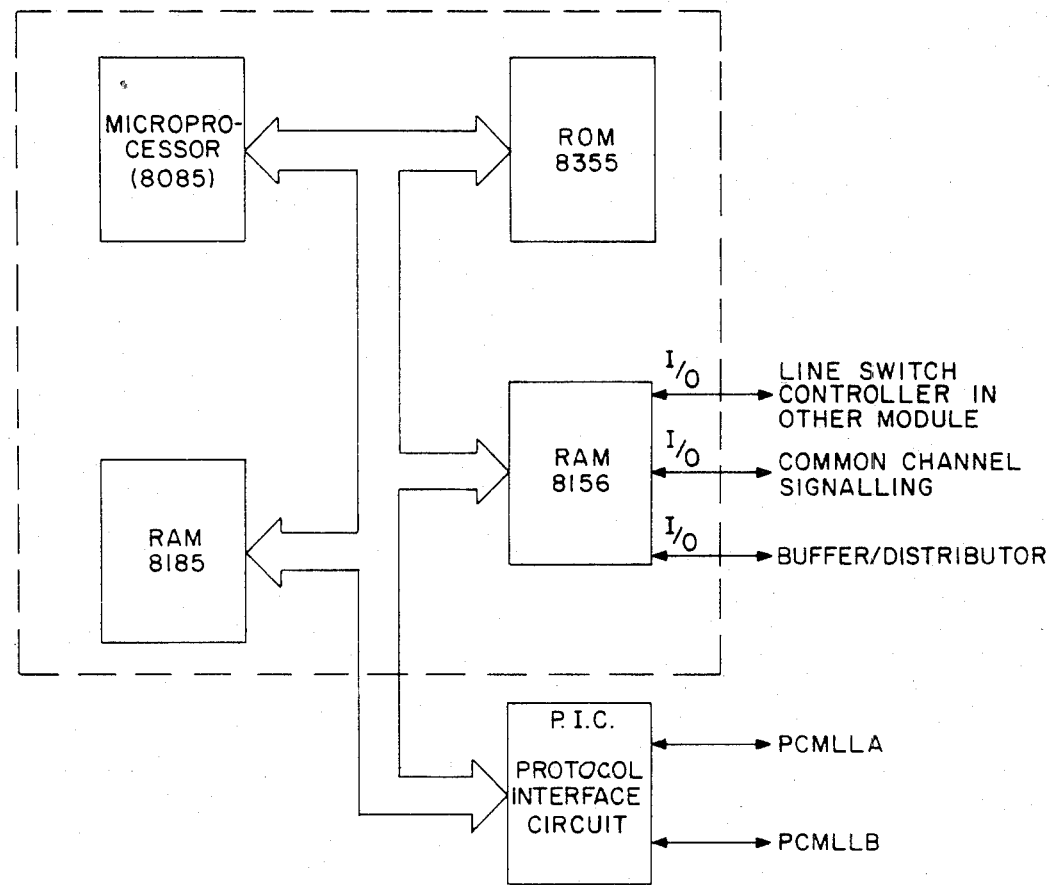
FIG. 9E illustrates in block diagram form the line switch controller of FIGS. 2 and 2A.

Turning now to FIG. 9E, the line switch controller is shown as comprising a Protocol interface circuit PIC and a microcomputer. The microcomputer utilized in the illustrative embodiment is the MCS-85 ™ system available from INTEL CORPORATION which is described in *INTEL COMPONENT DATA CATALOG 1976*, Intel Corporation, 1979, 9-79 to 9-139. More specifically, the microcomputer configuration may be that shown in FIG. 1 at page 9-78 of the aforementioned Intel reference. The 8085 microprocessor, the 8156 RAM with I/O ports and timer, the 8355 ROM and the 8185 RAM shown are all described in detail in the aforementioned INTEL reference.

The protocol interface circuit PIC serve as a control data interface between the parallel data bus of the microcomputer and the high speed, bit serial PCM bus PCM4. The line switch controller 7 operates as the master in a master slave relationship with all other circuits connected to the PCM buses PCM4, PCMLCA, PCMLCB. More specifically, only the line switch controller 7 may transmit control word commands over the PCM buses. A circuit will transmit a control word response on the PCM buses ony after receiving a command addressing that circuit. The convention established for the line switch control communication specifies that commands and responses must occur in pairs, only a line switch controller 7 can initiate a command, and the response to a command always occurs a fixed number of frames after the command.

Figure 9F:
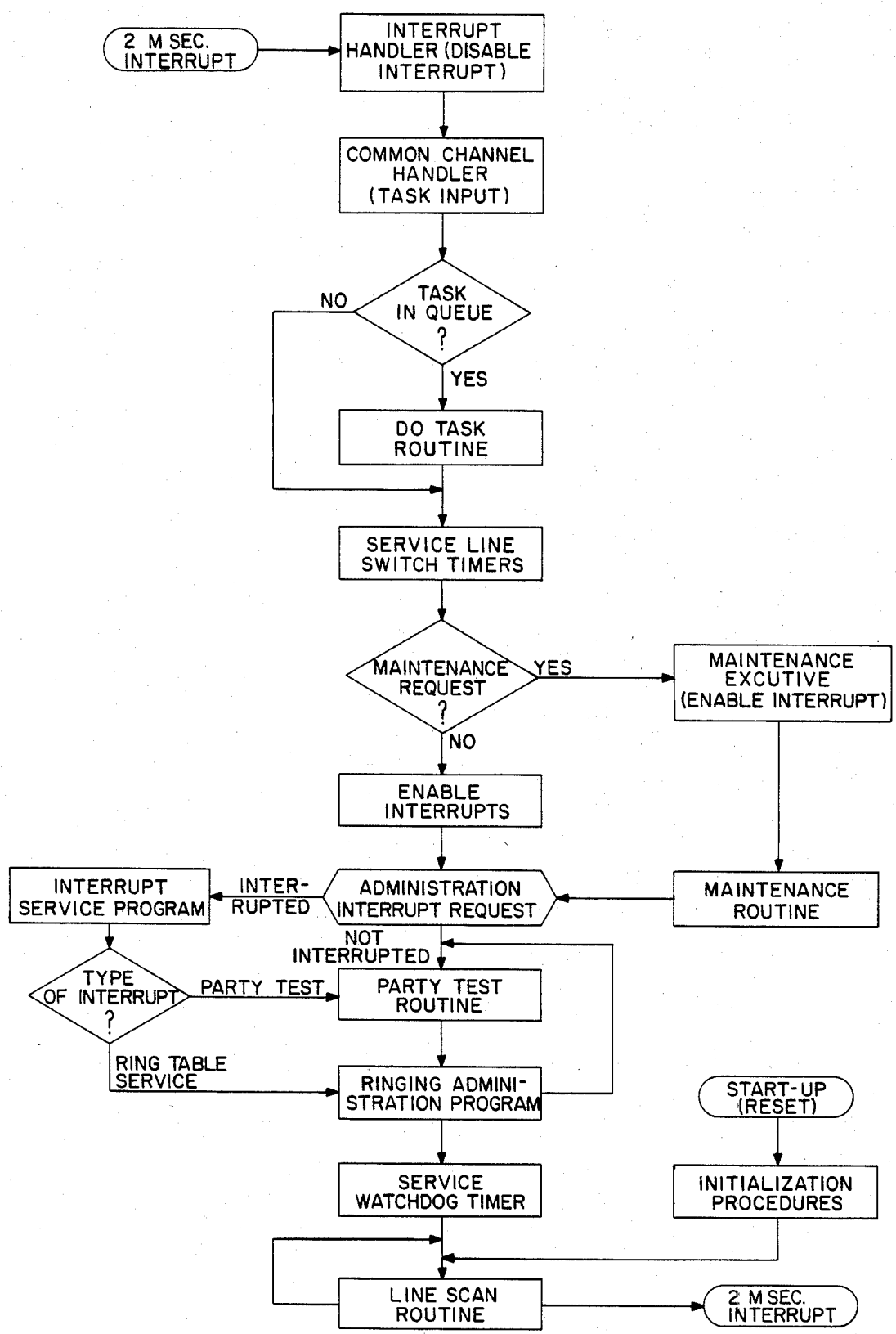

FIG. 9F is a flow chart of the general software architecture of the line switch controller 7. Commands from the system control 5 of FIG. 1 are transmitted over the PCM lines PCMA, PCMB arriving at a rate of one byte (8 bits) every 2 msec. The line switch controller includes a 2 Msec. interrupt timer and when a 2 msec. interrupt occurs, an interrupt handler program calls a comman channel data handler to process the received data byte. If the received data byte completes a command (each command may have 5 to 10 bytes), the previously received bytes for the command will be retrieved from a queue and the command will be executed. If the received byte does not complete a command, it will be stored in the queue. Typical of the tasks which the line switch controller 7 will be commanded to execute are: calling and called party channel assignments, initiating ringing, disconnecting ringing, call disconnect maintenance, test, alarm and administrative functions. FIGS. 9G to 9N illustrate in greater detail the flow charts of various programs identified in FIG. 9F.

Figure 9G:
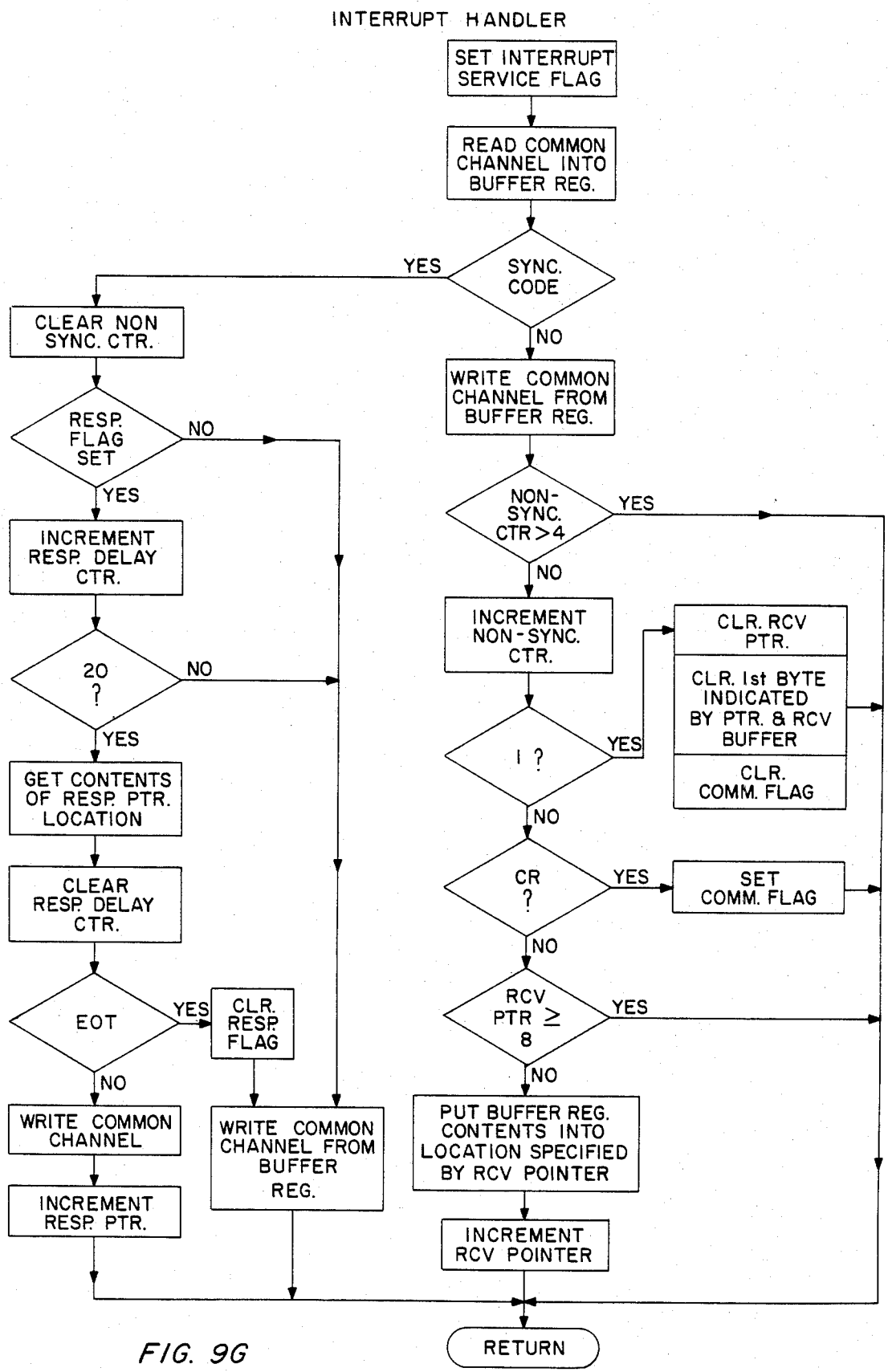
Figure 9H:
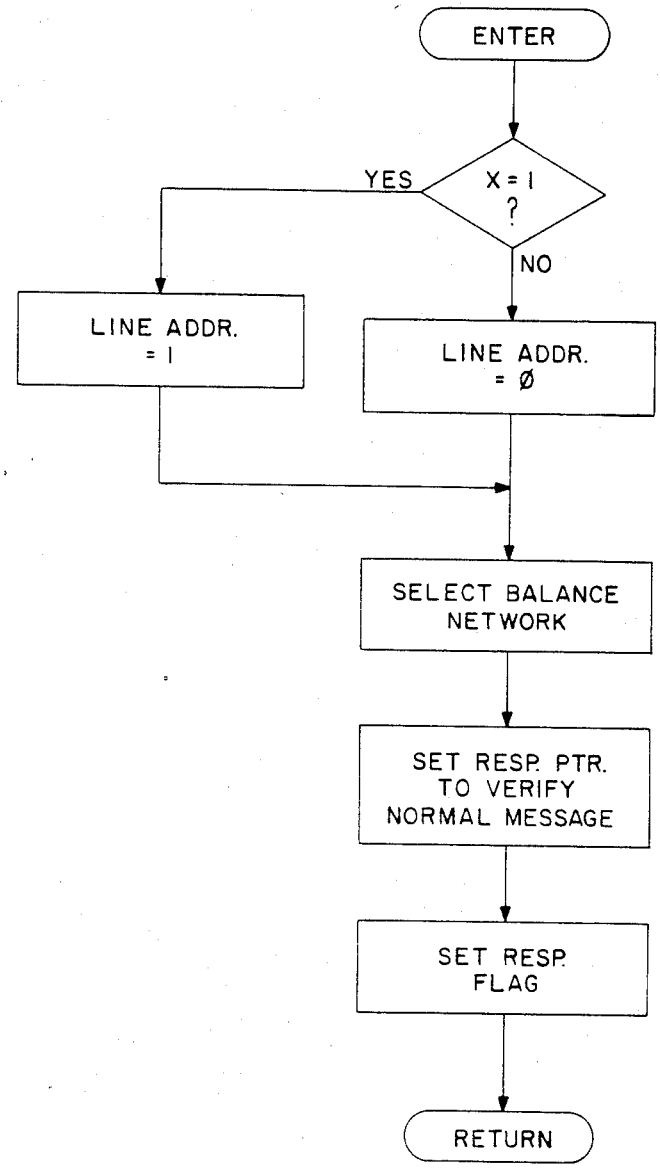
Figure 91:
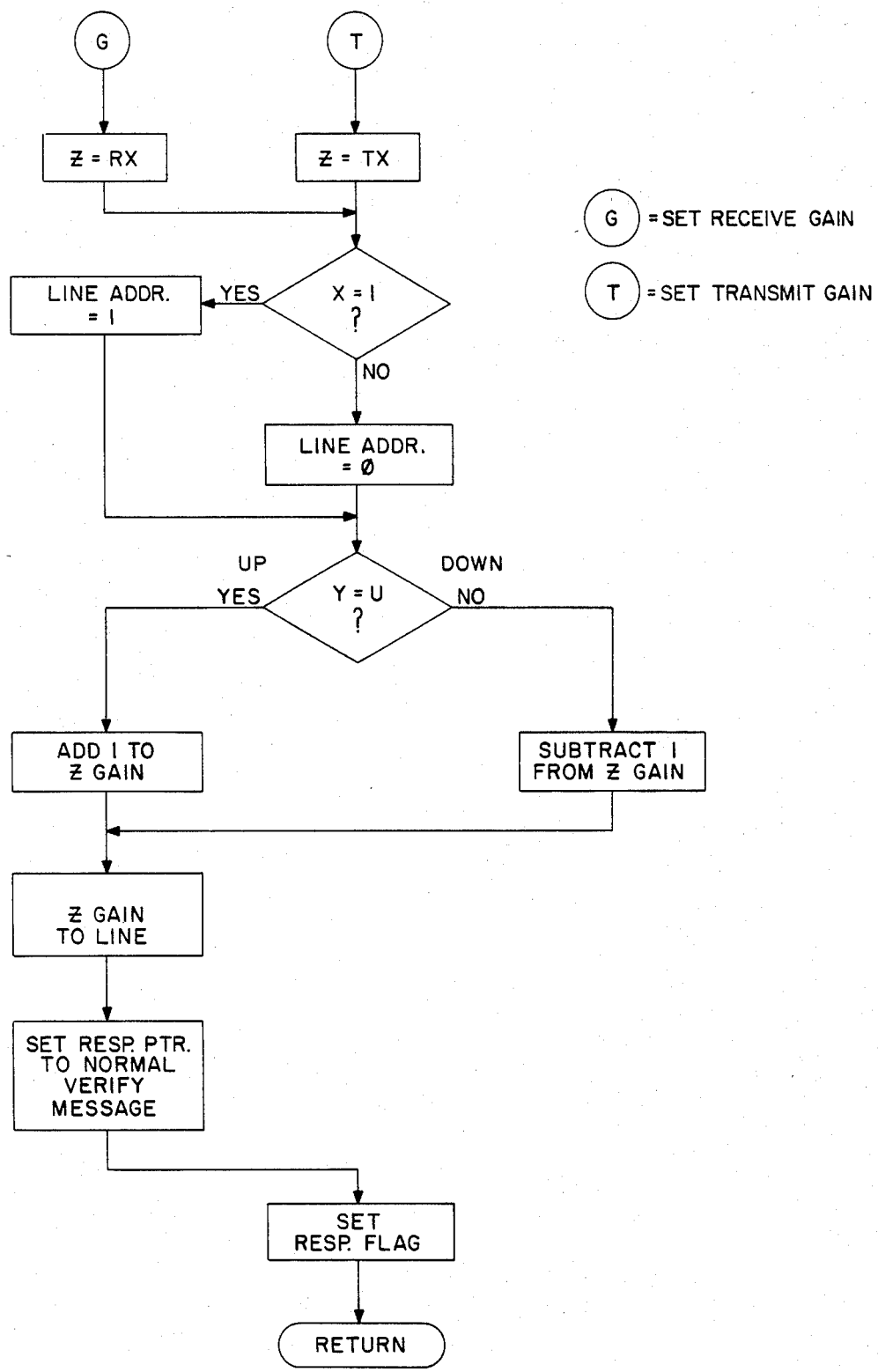
Figure 9J:
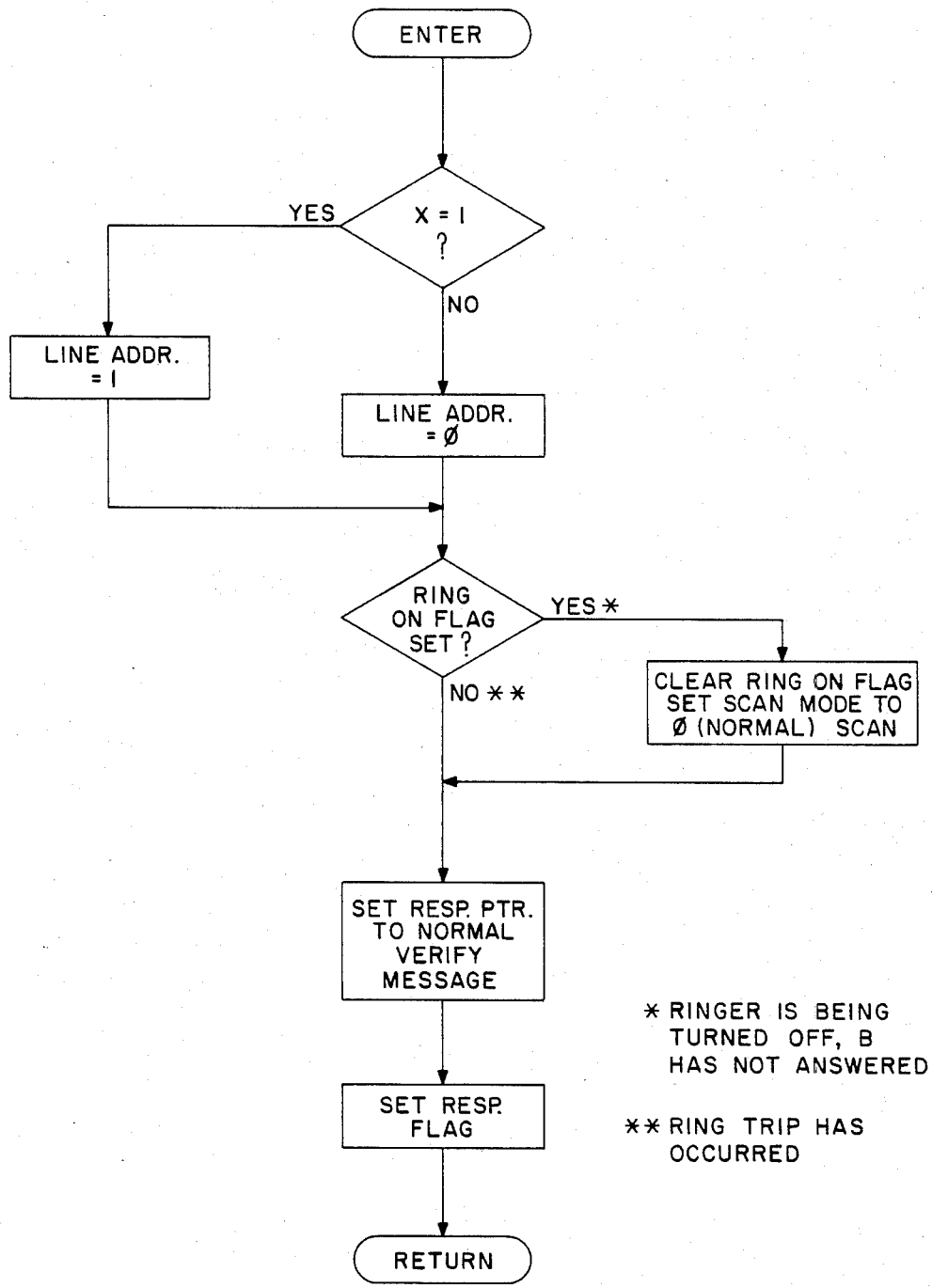
Figure 9K:
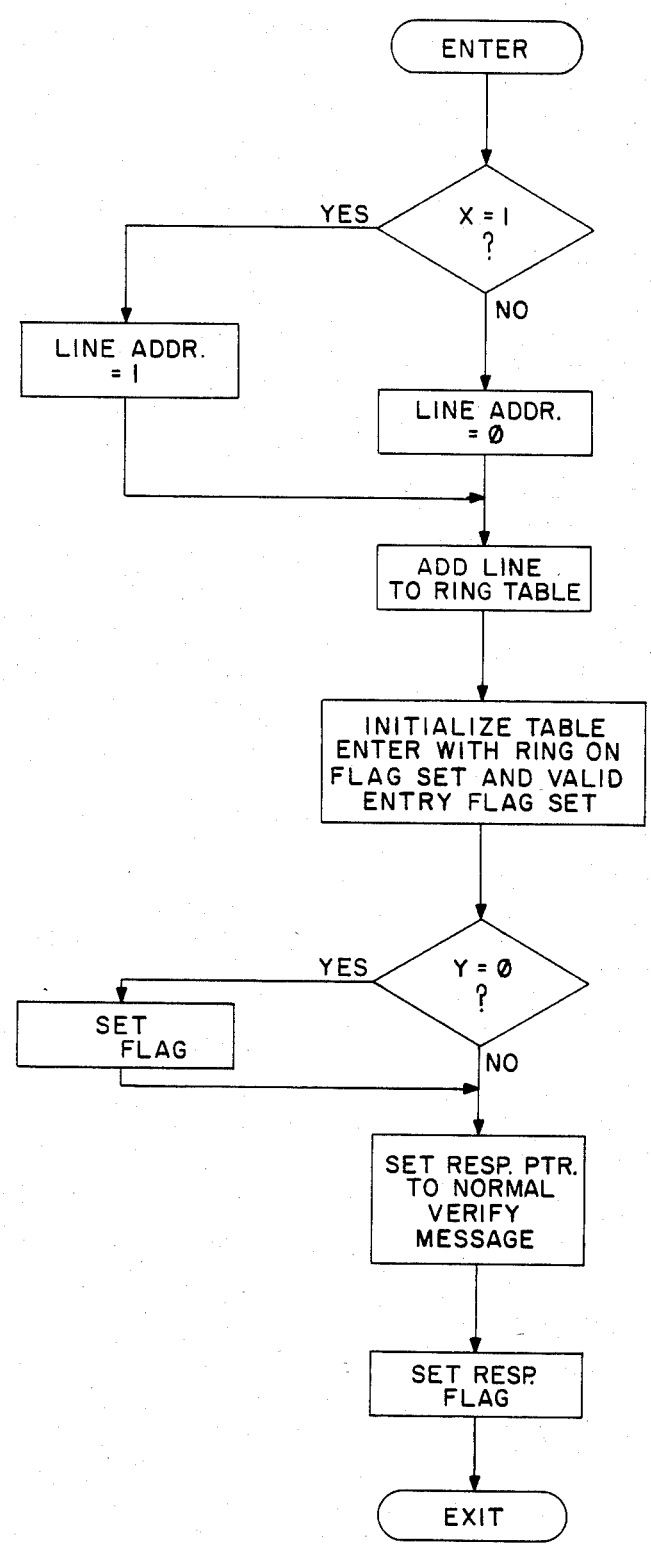
Figure 9L:
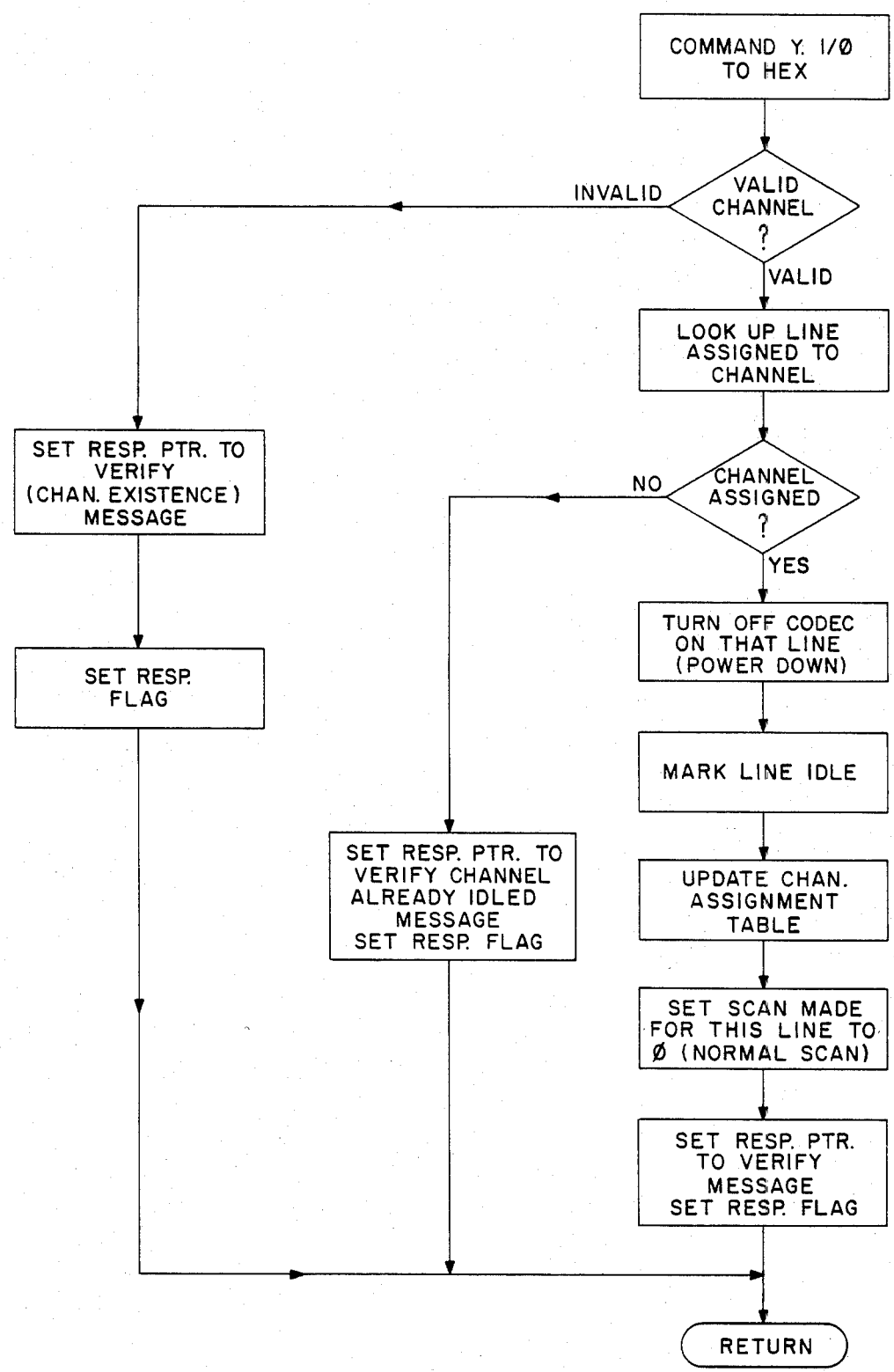

FIG. 9G illustrates the interrupt handler and common channel handle programs.

The following notes are appropriate to FIG. 9G.

EOT indicates end of test.

REV BUFF indicates receive buffer and is the first location of temporary storage for common channel commands.

RES PTR (response pointer) is set to the character in a command channel response or command.

RES Flag is set by the common channel routine when a response is to be sent.

RCU PTR is a receive pointer.

COMM FLAG indicates when a complete command has been received.

NON-SGAL CTR indicates when 5 consecutive non-signal codes have been received, this initializing resynchronization.

INT SERVFLAG indicates that a 2 millisec. interrupt has occurred.

RESP DLY CTR delays characters to 300 baud.

Figure 9M:
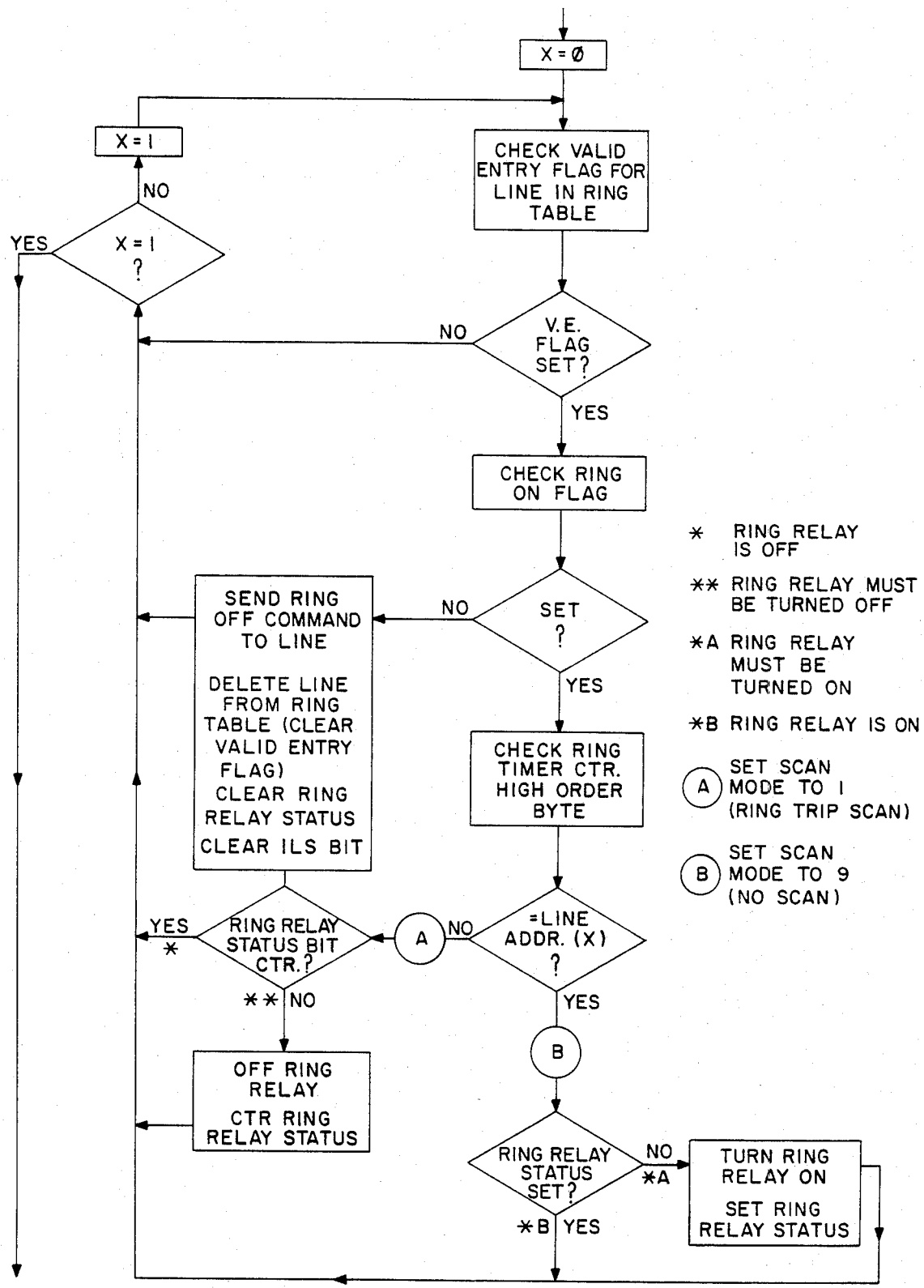
Figure 9N:
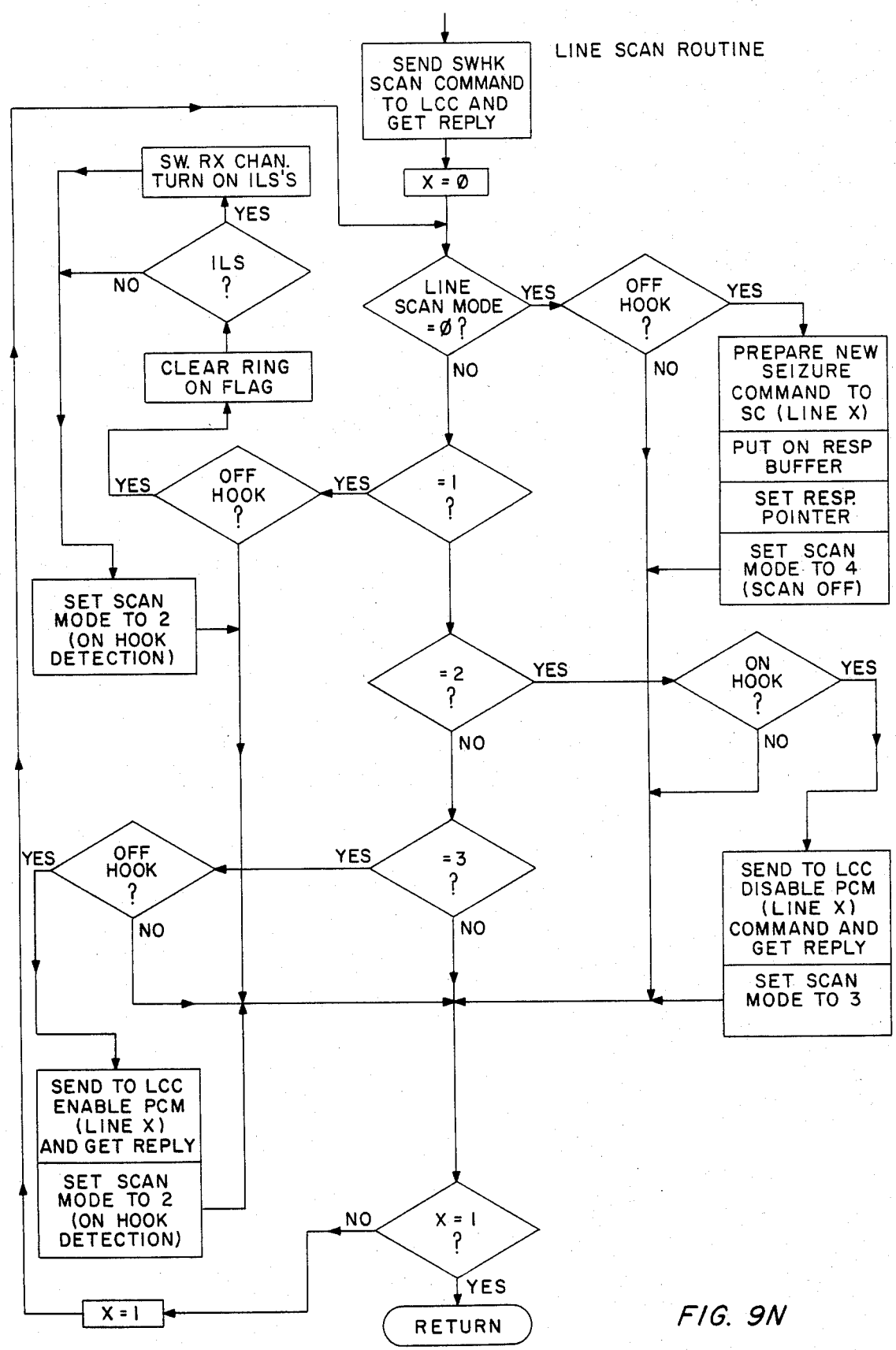
Figure 9A:
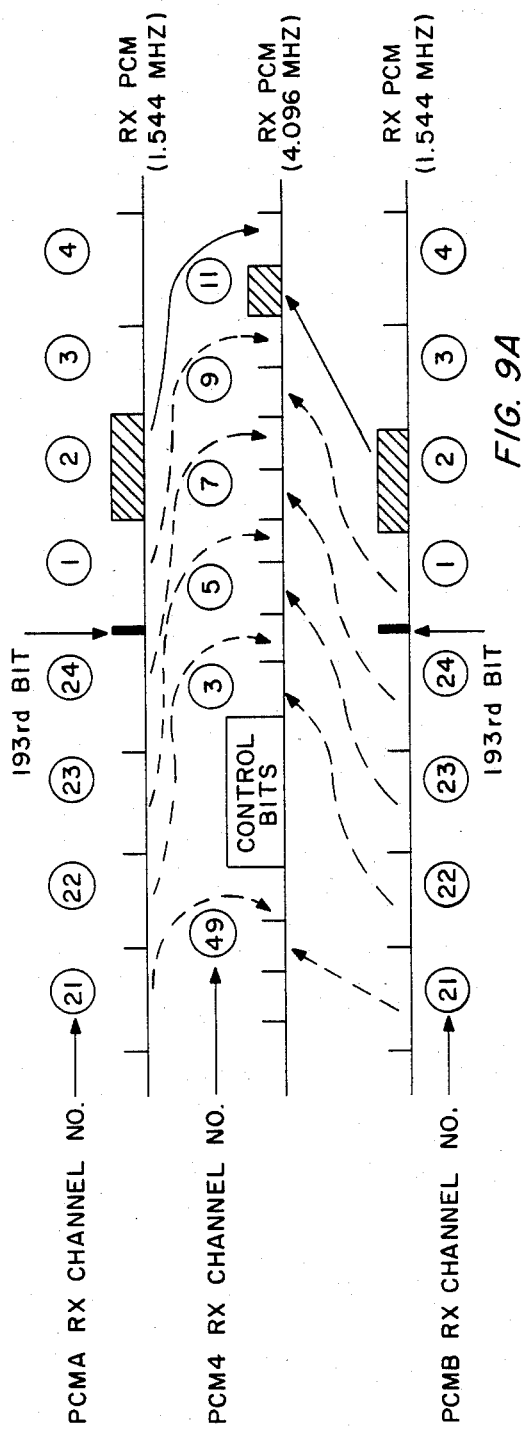
FIG. 9A illustrates the interleaving operation of the RX rate converter portion of interface logic 6 of FIG. 8.

FIGS. 9H to 9L are flow charts for various task routines, FIG. 9M is a flow chart of the ringing administration program; FIG. 9N is a flow chart of the line scan routine.

6.0 BUFFER AND DISTRIBUTOR 9 (FIGS. 21, 22, 23)

Figure 21:
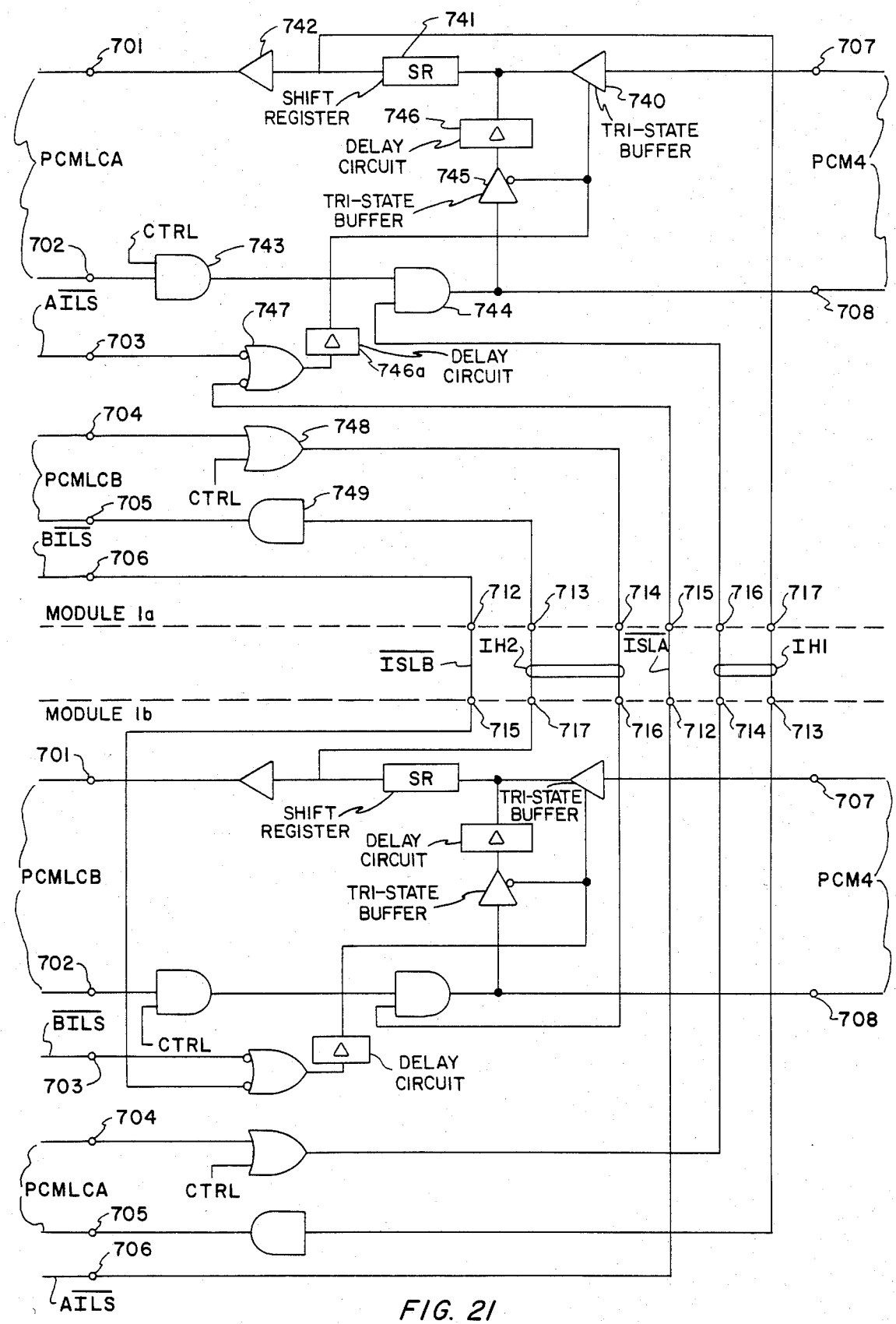
FIG. 21 illustrates in block diagram form one portion of the buffer and distributor 9 of FIGS. 2 and 2A.
Figure 22:
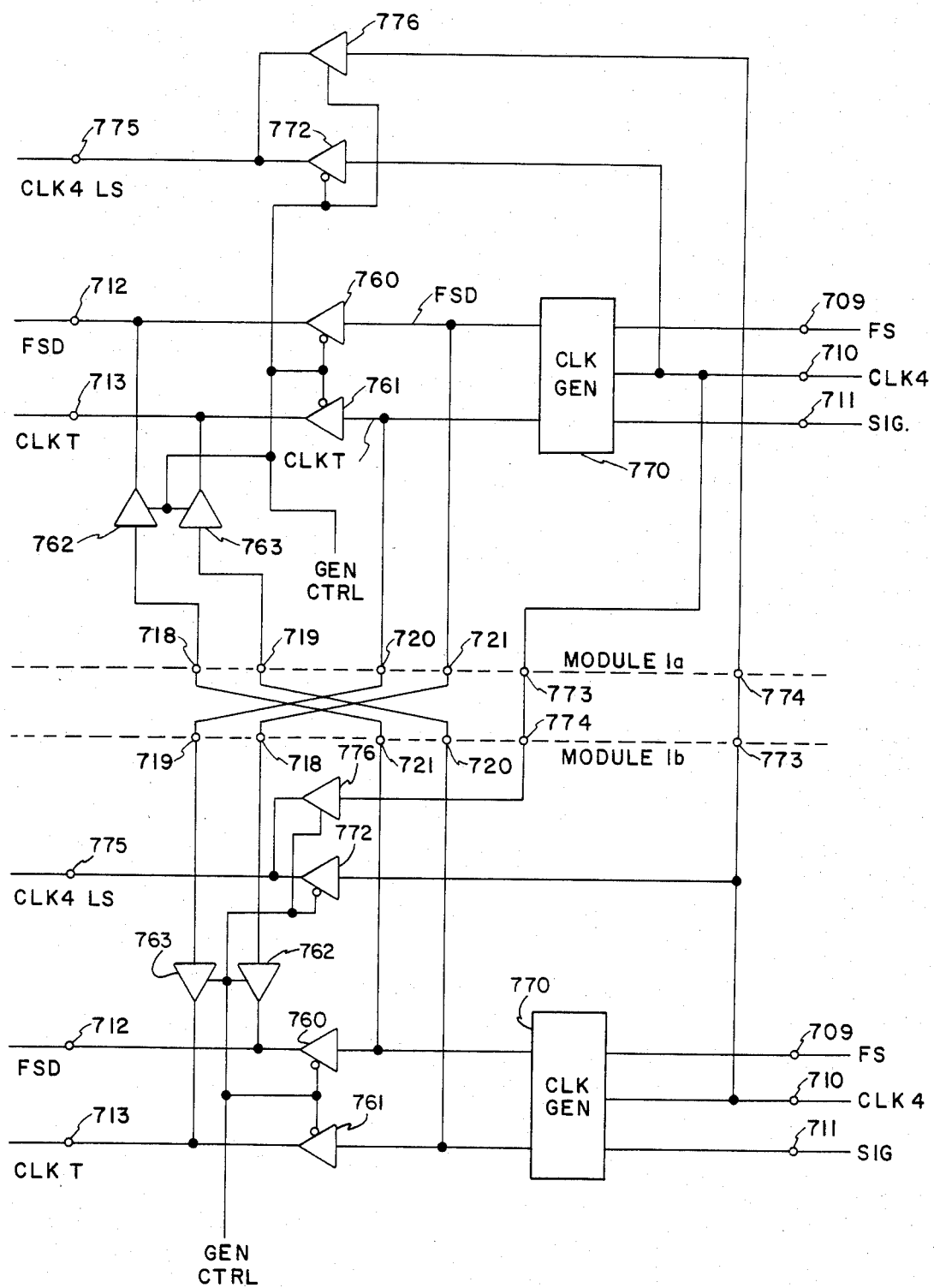
FIG. 22 illustrates in block diagram form another portion of the buffer and distributor 9 of FIGS. 2 and 2A.

FIGS. 21 and 22 illustrate the buffer and distributor circuits 9 of FIG. 2 in greater detail. For purposes of clarity, only one buffer and distributor 9 for each line switch module 1a, 1b is shown in FIGS. 21 and 22. If in accordance with the aforementioned security block concept each line switch module 1a, 1b includes more than one buffer and distributor 9, then one buffer and distributor 9 of each line switch module 1a, 1b will include both the circuitry of FIGS. 21 and 22 and the other buffer and distributor 9 of each line switch module 1a, 1b will include only the circuitry of FIG. 21. The circuitry of the buffer and distributor 9 for each of the line switch modules 1a, 1b shown in FIGS. 21 and 22 are identical and corresponding terminals of the buffer distributor circuits have identical designations. FIG. 21 illustrates the circuitry associated with the PCM buses PCM4, PCMLCA, PCMLCB and FIG. 22 illustrates the clock distribution circuit.

Figure 23:
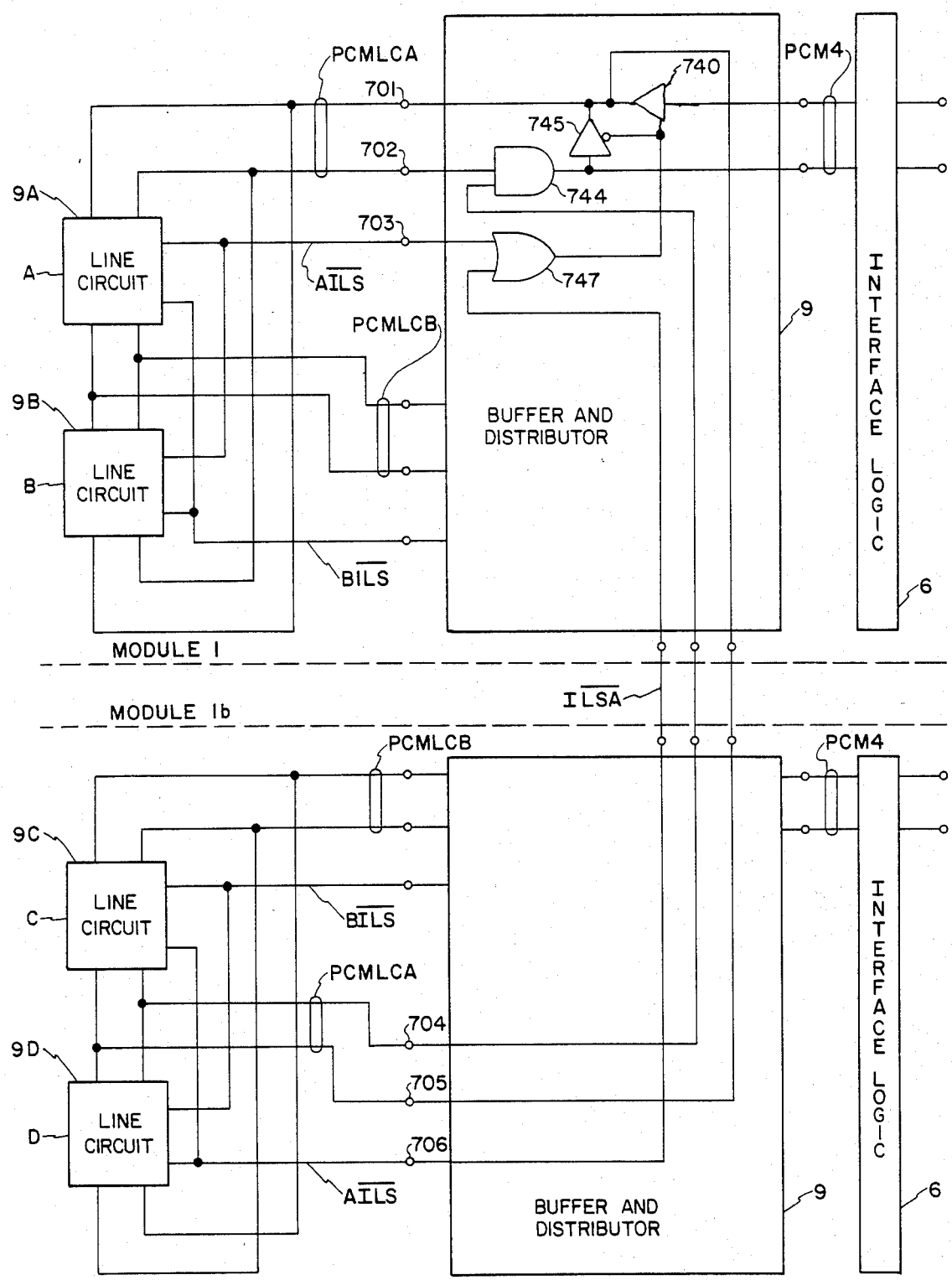
FIG. 23 is a block diagram illustrating the operation of the buffer and distributor 9 of FIGS. 2 and 2A.

6.1 BUFFER (FIGS. 21 and 23)

Line switch module 1a of FIG. 21 has terminals 707 and 708 connected to PCM bus PCM4, terminals 701 and 702 connected to PCM bus PCMLCA and terminals 704 and 705 connected to bus PCMLCB. Interposed between terminals 707 and terminal 701 are gate 740, shift register 741 and buffer gate 742. Interposed between terminals 702 and 708 are gates 743 and 744. A path is provided between the output of gate 744 to the lead between gate 740 and shift register 741 via gate 745 and delay circuit 746. Gates 740 and 745 are controlled by gate 747 through delay circuit 746a. Gate 747 has one input connected to terminal 703 and another input connected to terminal 715. Gates 740 and 745 are arranged such that gate 740 is normally closed and gate 745 is normally open, but when an appropriate signal state is present at terminals 703 or 715 gate 740 is open and gate 745 is closed. Together gates 740 and 745 operate as a crosspoint switch which is utilized for intra-line switch calls as described below.

Terminals 704 and 705 are respectively coupled to terminals 714 and 713 via gates 748 and 749. Terminal 706 is connected directly to terminal 712.

The two line switch modules 1a, 1b are interconnected via intra-line switch highways 1H1 and 1H2 and leads $\overline{\text{ILSB}}$ and $\overline{\text{ILSA}}$. It should be noted that the gates 743 and 748 include an additional input CTRL which may be individually controlled in the event of a fault to inhibit PCM transmission.

When the system controller 5 (shown in FIG. 1) determines that a subscriber connected to a line circuit has requested a connection to another subscriber connected to a second line circuit within the same line switch, the system controller 5 forwards commands to line switch controller 7 shown in FIG. 2 indicating that an intra-line switch connection is required. The line switch controller 7, in turn, provides control signals to the line circuits of the originating and terminating parties thereby loading status bits in the respective line circuits. The status bits in turn provide gating of control signals AILS, BILS to the crosspoint switches 740, 745 of FIG. 21 associated with the originating and terminating line circuits. The respective AILS and BILS signals are active only during the time period when the transmit channels occur, which the line switch controller 7 has assigned to the originating and terminating line circuits.

Turning now to FIG. 23, the operation of switches 740, 745 is described. FIG. 23 shows the two line switch modules 1a, 1b each connected to the corresponding interface logic 6. In line module 1a, only two line circuits 9A and 9B are shown and in line module 6 only two line circuits 9C and 9D are shown. It should be understood that only two line circuits are shown in each line switch module 1a, 1b for purposes of clarity.

Two intra-line switch call operations will now be described, with reference to FIG. 23. First, assume that the subscriber A connected to line circuit 9A has requested a connection to a subscriber B connected to line circuit 9B, i.e., to a subscriber connected to the same line module. The system controller 5 of FIG. 1 provides control signals to line switch controller 7 of line switch module 1a, that an intra-line switch call between line circuits 9A and 9B has been requested. Line circuit controller 7 transmits commands to the line circuit groups containing line circuits 9A and 9B, indicating that an intra-line switch call connection is to be established, and that bus PCMLCA is to be used. The transmit and receive channels for the two subscribers A and B are also assigned. When the transmit channel for subscriber A occurs, line circuit 9A provides an active signal on lead $\overline{\text{AILS}}$ which closes switch 745 and opens switch 740. The transmit lead of PCM bus PCMLCA connected to terminal 702 is thus connected to the receive lead of PCM bus PCMLCA connected to terminal 701. Thus, a PCM sample from subscriber A transmitted by line circuit 9A on the transmit portion of bus PCMLCA is "looped back" to the receive portion of bus PCMLCA. The receive channel assigned to subscriber B line circuit 9B is assigned such that it corresponds to the transmit channel of subscriber A of line circuit 9A. Therefore line circuit 9B receives the PCM sample transmitted by the line circuit 9A. Likewise, when the transmit channel for line circuit 9B occurs, line circuit 9B will apply an active signal to line AILS. Switch 740 will again open and switch 745 will again close for the duration of the transmit channel. Thus, the PCM sample transmitted by line circuit 9B on the transmit portion of PCM bus PCMLCA is "looped back" to receive portion of PCM bus PCMLCA. The receive channel assigned to line circuit 9A corresponds to the transmit channel assigned to line circuit 9B. Therefore, line circuit 9A will receive the PCM sample transmitted by line circuit 9B.

Second, assume that the subscriber A connected to line circuit 9A has requested a connection to a subscriber D connected to line circuit 9D, i.e., to a subscriber connected to a different line switch module within a line switch. The system control of FIG. 1 provides control signals to line switch controller 7 of FIG. 2 of the line switch module 1a that an intra-line switch call between line circuit 9A of line module 1a and line circuit 9D of line switch module has been requested and bus PCMLCA is to be used.

Line switch controller 7 of line switch module 1a assigns transmit and receive channels to line circuits 9A and 9D of FIG. 23. Again the assigned transmit channel of line circuit 9A will correspond to the receive channel of line circuit 9D and the assigned transmit channel of line circuit 9D will correspond to the receive channel of line circuit 9A. The crosspoint switches 740 and 745 are then operated in the same manner as described above, with the exception that line circuit 9D provides active signals to control the switches 740 and 745 instead of line circuit 9B.

Figure 24A:
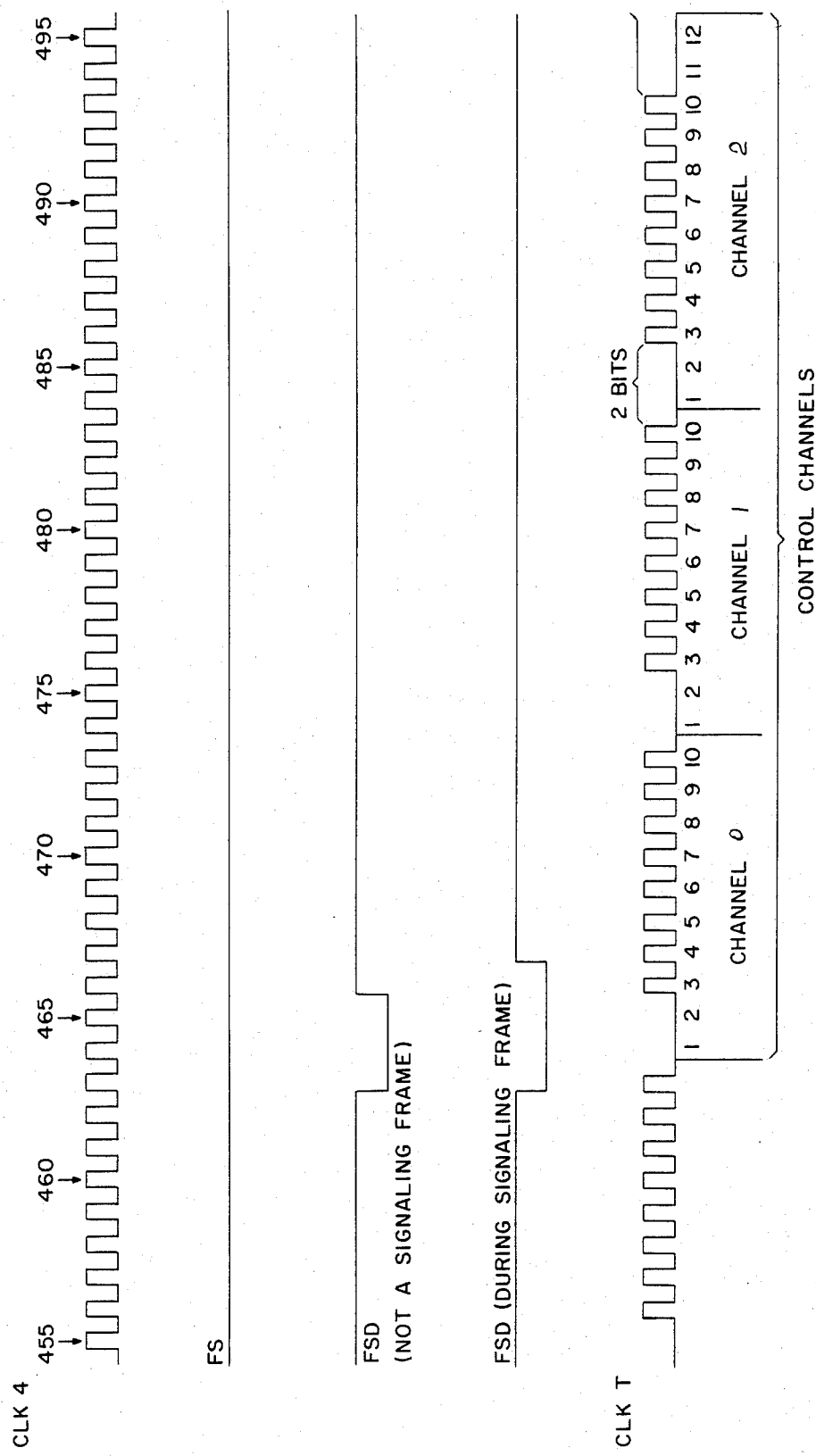

6.2 DISTRIBUTOR (FIGS. 22 and 24)

The clock distribution circuitry of the buffer and distributor circuits 9 for two line switch modules is shown in FIG. 22. Each buffer and distributor 9 has input terminals 709, 710, 711 connected to lines FS, CLK4, and SIG from a corresponding interface logic 6. A clock generator circuit 770 generates a CODEC clock signal CLKT and a frame clock signal FSD. The outputs FSD and CLKT are coupled to terminals 712 and 713 respectively via controlled switches 760 and 761 and are directly coupled to terminals 721 and 720. Input terminals 718 and 719 are coupled to terminals 712 and 713 respectively via controlled switches 762 and 763. Each of the switches 760, 761, 762, and 763 has a control input commony connected to lead GEN CTRL and operates such that when a signal having a first state is present on GEN CTRL, switches 760 and 761 are open and switches 762 and 763 are closed. When a signal having a second state is present on GEN CTRL switches 760 and 761 are closed and switches 762 and 763 are open. By means of the switches 760, 761, 762, 763, the FSD and CLKT signals for a line switch module may be supplied either by the clock generator 770 within the line switch module or by the clock generator in another line switch module. The GEN CTRL lead of a line switch module is connected to the line switch controller in the same line switch module.

Timing signal waveforms for the signals FS, CLK4, FSD and CLKT are shown in FIG. 24. A 9 stage counter within the clock generator 770 repetitively counts 512 4.096 mHz pulses before recycling.

The FS signal received from the interface logic 6 of FIG. 2 is a frame synchronization pulse which occurs every 125 microseconds. CLK4 is a 4.096 mHz clock signal from interface logic 6. SIG is likewise provided by interface logic 6 of FIG. 8 and indicates the occurrence of signaling frame, i.e., SIG is normally low and goes high the frame before a signaling frame. CLKT is CODEC clock which generally comprises bursts of eight pulses of a 4.096 mHz clock. The relationship of CLKT to the CODEC channels is shown. When a frame bit FSD occurs, the next 32 bits received over the PCM bus are control bits. More specifically, in a system with 10-bit channels, the next three channels are reserved for control data and channel three is extended by two bits. In a system with 8-bit channels, four channels are reserved for control.

FSD is a framing signal which will vary as shown depending on whether it occurs during a signaling frame or not.

Turning back to FIG. 22, and CLK4 lead coupled to terminal 710 is connected to output terminal 775 via switch gate 772 and is connected directly to output terminal 773. Input terminal 774 is coupled to output terminal 775 via switch gate 776. The terminal 774 is connected to terminal 773 of the other line module. The switch gates 772 and 776 operate in the same manner and under control of the same GEN CTRL signal as the aforementioned switch gates 760, 761, 762, 763 so that either CLK4 from line module 1a or 1b may be utilized as the source for 4.096 mHz clock signals on lead CLK4LS.

7.0 LINE CARD OR GROUP (FIG. 25)

Figure 25A:
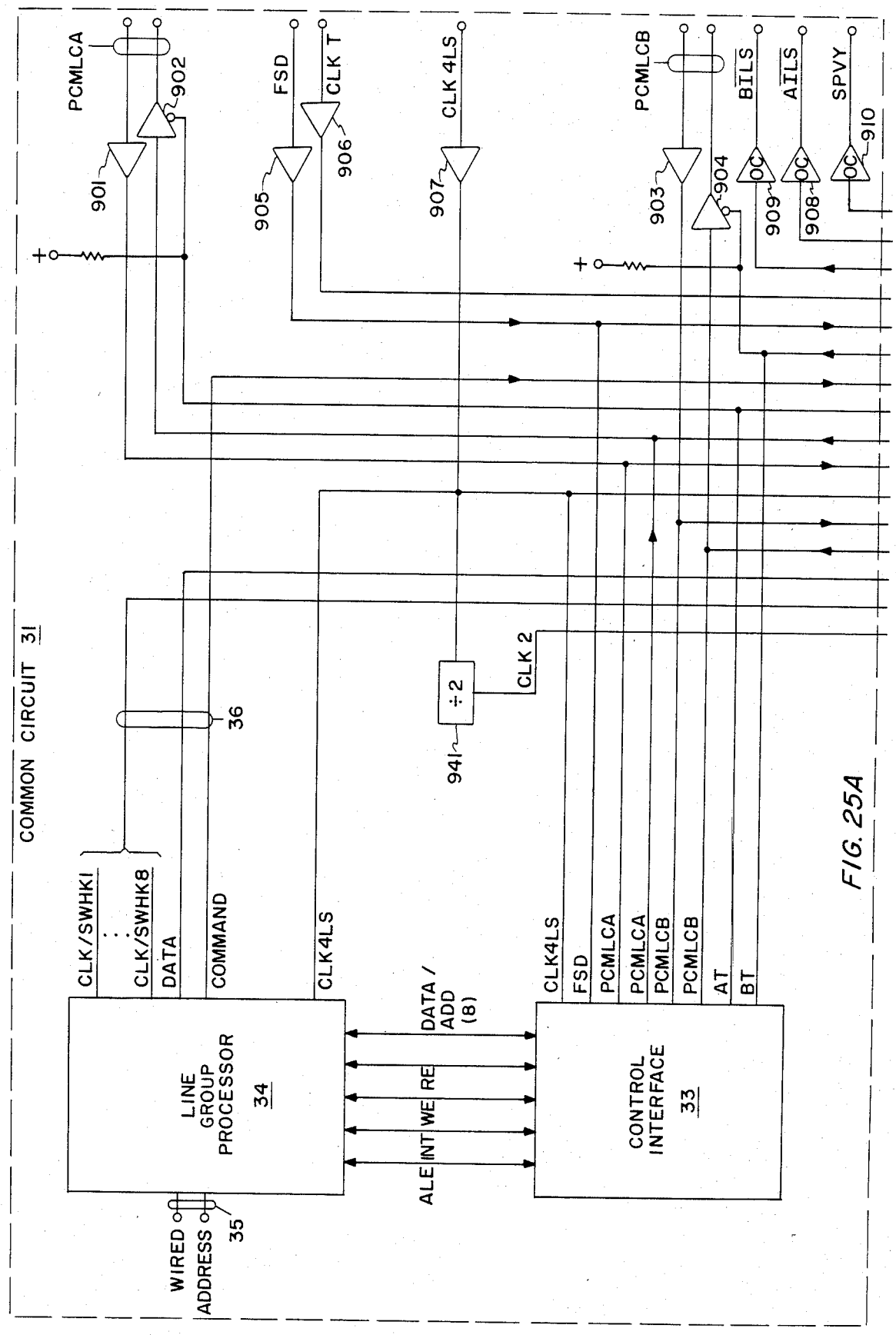
Figure 25B:
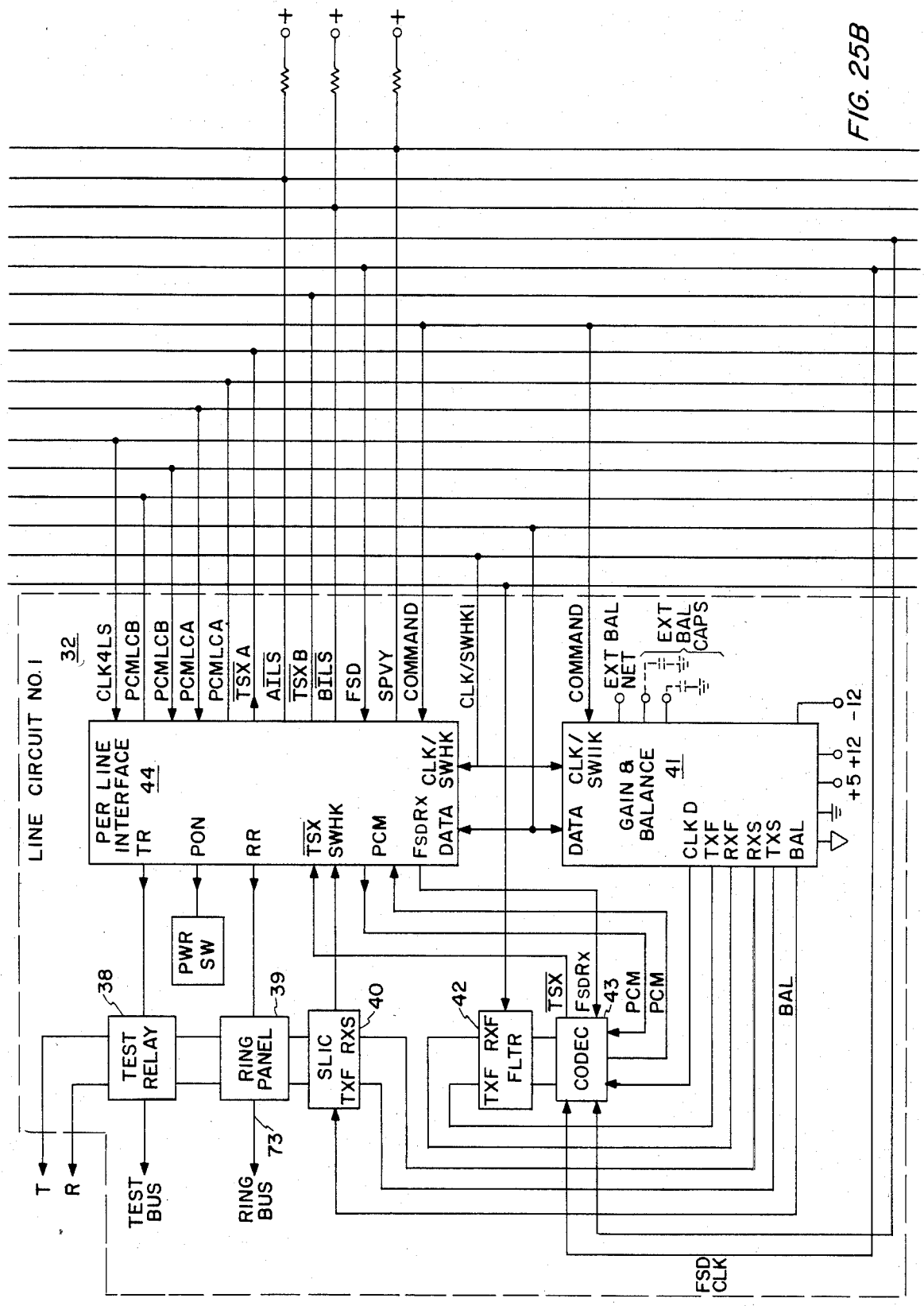

One of the line groups 11 of FIG. 2 is shown in detail in FIG. 25. Each line group includes a common circuit portion 31 and eight line circuits 32 in the illustrated embodiment. In other embodiments, the common circuit portion 31 may be on a separate circuit card and a line group may have more or less than eight line circuits. The common circuit portion includes a control interface 33 which is coupled to PCM bus PCMLCA via buffer 901 and switch gate 902, and to PCM bus PCMLCB via buffer 903 and switch gate 904. The control interface is also coupled to the FSD and CLKT leads via buffers 905 and 906, respectively. The interface 33 extracts and inserts control data bits which are transmitted and received over PCM buses PCMLCA and PCMLCB. Control data received over the buses are examined to determine if the address received matches the address of the line group. If the received address matches, an interrupt signal is sent via line INT to a line card processor 34 which may be a conventional microprocessor of a type well known in the art. It should be noted that the line group address, which the control interface 33 matches against is, in fact, supplied by the line group processor 34 and is strored by the control interface 33. The line group address is supplied to the processor 34 by leads 35 to provide a unique address to the line card.

Other control data are communicated between the processor 34 and the PCM buses PCMLCA, PCMLCB via the control interface 33, which acts as a data buffer. It should be noted that the control interface 33 is provided because the microprocessor 34 cannot operate at a high enough rate to handle 4.096 mbps serial rate on the PCM buses. In other applications, which do not utilize a high speed serial bus for control information, e.g., where control information is received in parallel, or at a slower rate, the control interface 33 may not be necessary. In other words, the microprocessor 34 may be directly coupled to the bus carrying the control information.

After the processor 34 determines that an operation is required within its associated line group, it will select the appropriate line circuit, as determined by portions of the control data received over PCM bus PCMLCA or PCMLCB.

The processor 34 is connected to the line circuits 32 via bus 36. Bus 36 includes ten separate leads, specifically, a separate clock lead CLK/SWHKn (n=1 to the number of circuits in a group) for each of the line circuits, a bidirectional data lead DATA, and an address latch enable lead COMMAND. Control and data information is transferred between the line group processor 34 and the per line control interfaces 44 over the common lead DATA. The information transfer is controlled by the COMMAND lead and the CLK/SWHKn leads.

Additional leads connected to the line group are CLK4LS, which is the 4.096 mHz clock signal, leads $\overline{AILS}$, $\overline{BILS}$, and SUPVY. The lead CLK4LS is distributed to the line circuits via a buffer gate 907. The per line control interface 44 of each of the eight line circuits 32 generates the signals $\overline{AILS}$, $\overline{BILS}$ and SUPVY. The $\overline{AILS}$ outputs of the line circuits are "wire-ored" to the input of buffer output gate 908. Likewise the $\overline{BILS}$ outputs are "wire-ored" to gate 909 and the SUPVY outputs are "wire-ored" to gate 910.

The 4.096 mHz clock ClK4LS is applied to a divide by two circuit 941 which provides a 2.048 mHz clock signal CLK2 for use by the line circuits.

7.1 LINE CIRCUIT (FIGS. 25, 26, 27)

Each line circuit 32 includes conventional line circuit transmission components: test and ring relays 38 and 39, a subscriber line interface circuit 40, a filter circuit 42 and a codec 43. The CODEC 43 is of a known type which is operable in a so called "microprocessor controlled mode" of operation, wherein the channel assigned by a line switch or system controller to the associated line circuit is stored by the CODEC and is used to determine when the CODEC will become active. The CODEC may be defined as "active" when the CODEC is transmitting or receiving over PCM buses. One such CODEC is commercially available from the INTEL Corporation and is identified as type number 2910A.

Each line circuit 32 further includes a per line control interface 44 which interfaces between the common circuit 31 and the line circuit transmission components. Control of portions of the per line control interface 44 is achieved by the processor 34 transmitting control words over bus 36. Each of these control words is 12 bits in length and arranged in format as shown in FIG. 26. Bit 0 determines whether the control operation is a read or write; bits 1-3 are address bits for the per line control interface 44; bit 4 is unused; bit 5 is set according to whether the line card is in a system using 8 bit or 10 bit PCM words on its buses; bits 6, 7 and 8 are used to control external components such as power control, device test relay, and ring relay; bit 9 enables the line circuit; bit 10 is used to signify intraline switch calls; and bit 11 selects which of the two PCM buses PCMLCA or PCMLCB will be utilized by the line circuit.

Figure 27A:
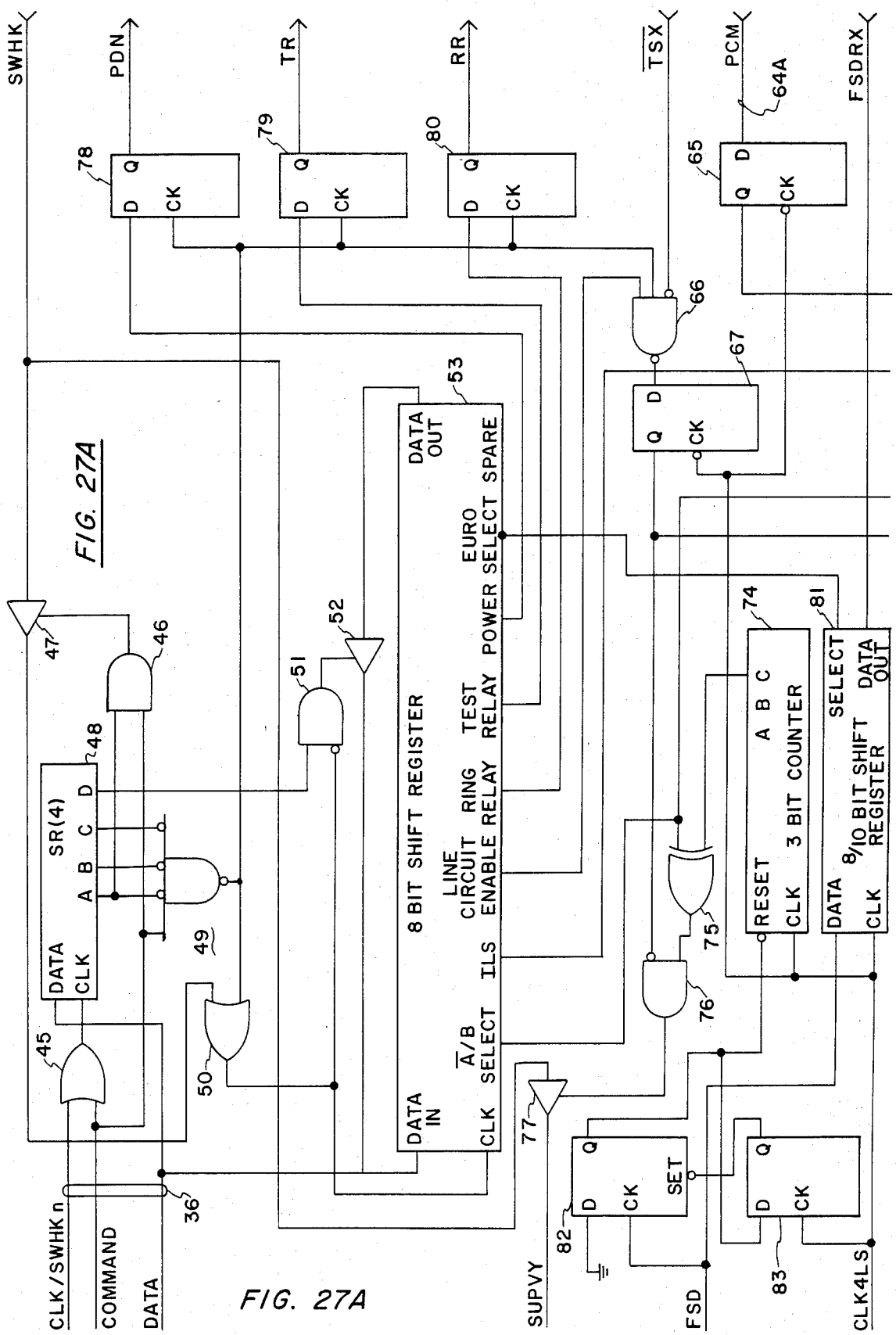

One of the per line interfaces 44 of FIG. 25 is shown in greater detail in FIG. 27. The CLK/SWHKn lead is a dual function lead. More specifically, one function of this lead is that of a normal clock lead to clock data into or out of the line interface circuits 44. The other function of the CLK/SWHKn lead is to return switch hook status to the line group microprocessor 34 of FIG. 25. The selection as to which of the above two functions is provided is determined by the state of the COMMAND lead and register 48. When the COMMAND lead is high, and when bit 0 of the control word indicates a read, then gate 46 enables tri-state buffer 47 thereby coupling the lead SWHKn, which is connected to the SLIC 40 of FIG. 25 and indicates current switch hook status, to the line card processor 34 of FIG. 25 via CLK/SWHKn lead. When the COMMAND head is low, gate 45 is enabled and control bits from the DATA lead of bus 36 are shifted into shift register 48. After the four control bits 0-3 are loaded in register 48, the COMMAND lead goes high disabling gate 45 thereby holding the control bits in register 48. Gates 49 and 50 form a decoder circuit to gate clock pulses from the CLK/SWHKn lead to shift register 53. Similarly, gates 51 and 52 determine whether data will be stored in or read from register 53. If data is to be stored in register 53, the next eight bits, i.e., bits 4-11 of the control word are shifted into the register 53 from the Data lead. The $\overline{A/B}$ select lead control gates 54, 55, 56, 58 to connect either bus PCMLCA, or PCMLCB to the coded PCM bus 64A, 64B. Flip-flop 65 provides buffer timing for the transmit PCM signal from bus 64A.

The $\overline{TSX}$ lead provides timing from the CODEC 43 of FIG. 25. Gate 66 controls gating of the $\overline{TSX}$ signal into buffer flip-flop 67. The Q output of flip-flop 67 is connected to gates 60 and 61 which are conrolled by the $\overline{AB}$ select bit to steer the $\overline{TSX}$ signal to leads $\overline{TSXA}$ or $\overline{TSXB}$. The Q output of flip-flop 67 is also coupled to gates 62 and 63 which are controlled by the $\overline{A/B}$ select bit and the ILS bit. The outputs of gates 62 and 63 are coupled respectively to leads $\overline{AILS}$ and $\overline{BILS}$.

In some applications it may be desirable to return switch hook information at a rate fast enough to detect dial pulsing without utilizing the $\overline{A/B}$ signaling bits of the PCM bus. To accomplish this, switch hook information from lead SWHK from the line circuit 32 is gated onto the supervisory lead SUPVY during one half of the channel time assigned to that circuit. The channel during which switch hook information is gated is determined by a signal on lead $\overline{TSX}$ from the CODEC 43 of FIG. 25.

A counter 74 divides each channel into two parts. Flip-flops 82, 83 provide synchronization for counter 74. The $\overline{A/B}$ select bit controls gate 75 to determine in which of the two parts of a channel the switch hook information is to be gated. Gates 76 and 77 gate the switch hook information from flip-flop 67 to supervisory lead SUPVY. The line circuit enable bit controls gating of the lead $\overline{TSX}$ at gate 66 for maintenance purposes, i.e., if it is determined that CODEC 43 of FIG. 25 is defective, the line circuit enable bit is utilized to prevent the CODEC 43 from interfering with the operation of the remainder of the system. The ring relay, test relay and power control flip-flops 80, 79, 78, respectively control the application of ringing signals from bus 73 of FIG. 14 control connections to a test bus and to apply power to the entire transmission circuit elements of FIG. 14. Register 81 delays the frame clock FSD from the buffer-distributor 9 of FIG. 22 by one channel time to provide a receive frame clock which is coupled to a CODEC 43 of FIG. 25 via lead FSDRX. The Euro Select bit, i.e., bit 5 of FIG. 26, determines whether the channel delay corresponds to 8 or 10 bits.

7.2 GAIN/BALANCE (FIGS. 25, 28, 29, 30, 31)

Turning back to FIG. 25, the gain/balance control circuit 31 provides software selection of transmit gain, receive gain and balance for the line circuit. Control of the gain/balance circuit 41 is achieved by the line card processor 34 transmitting control words over the serial data bus 36 in a manner similar to that described with respect to the per line controller interface circuit 44 hereinabove. The control words are illustrated in FIGS. 28 and 29. As shown in FIG. 28, a control word for the gain/balance operations comprises 28 bits arranged as follows: a read/write bit, three address bits, a clock control bit, three unused bits, four bits for line balance network selection and eight bits each for transmit and receive gain selection. As shown in FIG. 29, a control word for CODEC control comprises 12 bits which includes a read/write bit, three address bits, two mode bits and six channel assignment bits.

Figure 30A:
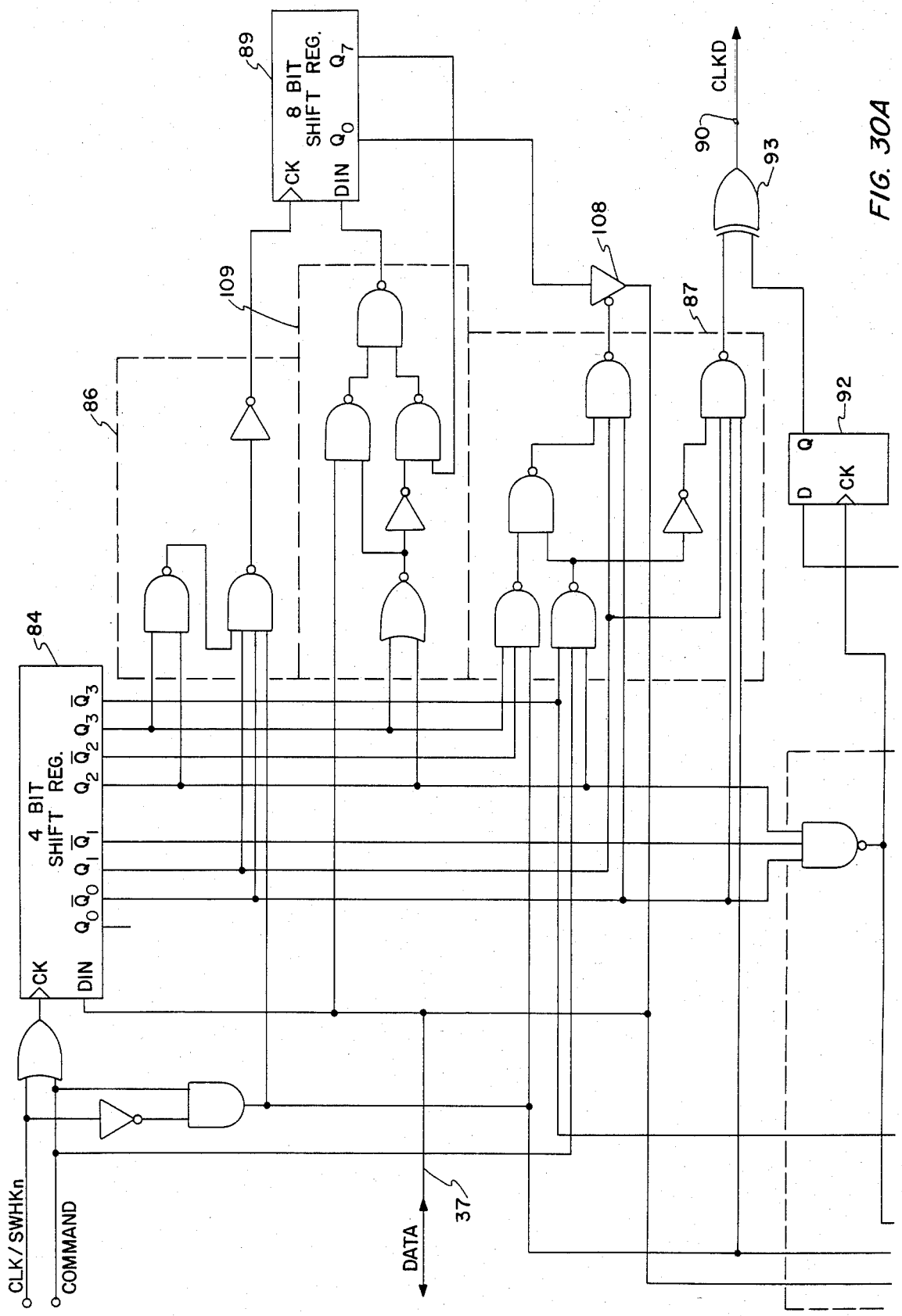

The gain/balance circuit 41 is shown in detail in FIG. 30. The first four bits of a control word are loaded into and stored by register 84 in the same manner as described for register 48 of FIG. 27. Address decoders 85, 86, 109 and 87 decode the contents of the register 84. Decoder 85 determines if the control word is to provide gain/balance settings to be stored in register 88. Decoder 86 permits loading of assigned channel information into a register 89. Decoder 87 controls the loading of channel assignment information from register 89 into the CODEC using data clock lead CLKD.

If the first four bits of the control word shown in FIG. 28 stored in register 84 as indicated above activate decoder 85, the next 24 bits are then stored in register 88. The clock control bit stored in bit Q23 of register 89 controls the state of flip-flop 92 which in turn is connected to EXCLUSIVE-OR gate 93 to determined whether the clock signal on lead CLKD is inverted or not. The four line balance network selection bits of shift register 88 control analog solid state switches 94 to selectively connect capacitors 95 and 96, network 97 and 98, to the SLIC circuit via the balance selection lead BAL. It should be noted that the capacitors 95 and 96 and resistor 98 may be replaced with other network components or with entire networks.

Gain control amplifiers 103 and 105 are connected such that they are interposed in the transmission path between the SLIC 40 and Filter 42 as shown in FIG. 25. More specifically, receive amplifier 103 has one input connected to lead RXF connected to the receive filter and an output lead RXS connected to the receive path of the SLIC. Amplifier 105 has one input connected to SLIC transmit lead TXS and an output connected to transmit filter lead TXF.

The eight receive gain control bits stored in register 88 control analog solid state switches 101 to selectively connect resistors 102 to one input of amplifier 103. Likewise the eight transmit gain control bits stored in register 88 control analog switches 104 to selectively connect resistors 106 to one input of amplifier 105.

It is desirable to maintain closely controlled gain steps, e.g., less than 0.1 db, over a wide range of environmental conditions. Typically, gain circuits comprise a resistive ladder similar to that formed by resistors 106, each leg of the ladder having an analog switch connected in series with a resistor. The ladder in turn forms a resistive divider with another resistor 107. The analog switches have a finite impedance which will vary from unit to unit and with environmental changes. Typically, analog solid state switches have impedances of nominally 50 to 150 ohms in the on-state. The variation of the on-state impedance would thus contribute a significant change to the ratio of the dividers previously used.

This problem is significantly reduced in the gain control circuits shown in FIG. 30. Specifically, an amplifier having an extremely high input impedance such as a FET differential input amplifier, e.g. 103 or 105, is connected in the divider network. The resistance values may then be made relatively high, for example, in the order of tens of thousands of ohms, and accordingly, the impedance variations in analog switches, which are on the order of a hundred ohms, will have a negligible effect on the gain through the circuit.

The gates 91 are controlled by the read/write bit of the control word to determine whether a portion of a conrol word is to be stored in register 88, or whether the contents of register 88 are to be read via the data bus 37.

A CODEC control word has two distinct addresses. One address (hereinafter first address) will result in either the register 89 being loaded or read by the line card processor 34, and the other address (hereinafter second address) will cause the contents of register 89 to be loaded into a CODEC 43. If the control word contains the first address and the read/write bit indicates a write operation, the mode and channel assignment portion of the control work is loaded into register 89 via decoder 86. If the control word contains the first address and the read/write bit indicated a read operation, the contents of register 89 are supplied to data bus 37 via gate 108, which is controlled by portion of the decoder 87. When the register 89 is read, the gates 109 will feed each bit, as read, back into the register such that after a read of the register 89, the contents of register 89 are unchanged.

If the control word contains the second address, the contents of register 89 are supplied to the CODEC over data bus 37 via gate 108. Gate 108 is controlled by portions of the decoder 87. Other portions of decoder 87, when enabled, supply clock pulses to a CODEC via gate 93 and line 90 to clock the data from bus 37 into the CODEC. The gates 109 will again operate to loop the data bits loaded into the CODEC from register 89 back into register 89.

As noted hereinabove the control words transmitted between the line groups and the line switch controller 7 of FIG. 2 over the buses PCMLCA and PCMLCB as shown in FIGS. 2 and 6 comprise 32 bits. FIG. 31 illustrates the format of these control words. Each control word transmitted from the line switch controller 7 of FIG. 2 comprises four eight bit bytes, indicated as Bytes 1-4. Byte 1 may include one parity bit which is calculated over the entire word, and includes seven address bits. Byte 2 includes five function bits which control the function that line card processor 34 is to perform, and three bits to designate which one of the eight line circuits on a line card is to be affected. Bytes 3 and 4 contain control data as required for the function specified by the function bits. After a control word is transmitted to the line card by the line switch controller 7, the processor 34 will respond by returning the same control word back to the line switch controller 7 if the control word indicates a write operation. If the control word indicates a read operation, the line card processor 34 will return bytes 1 and 2 as originally transmitted from the line switch controller 7 and will include respose data in Bytes 3 and 4.

7.3 PROTOCOL INTERFACE CIRCUIT/CONTROL INTERFACE 33 (FIGS. 25, 32)

Figures 32, 32A:
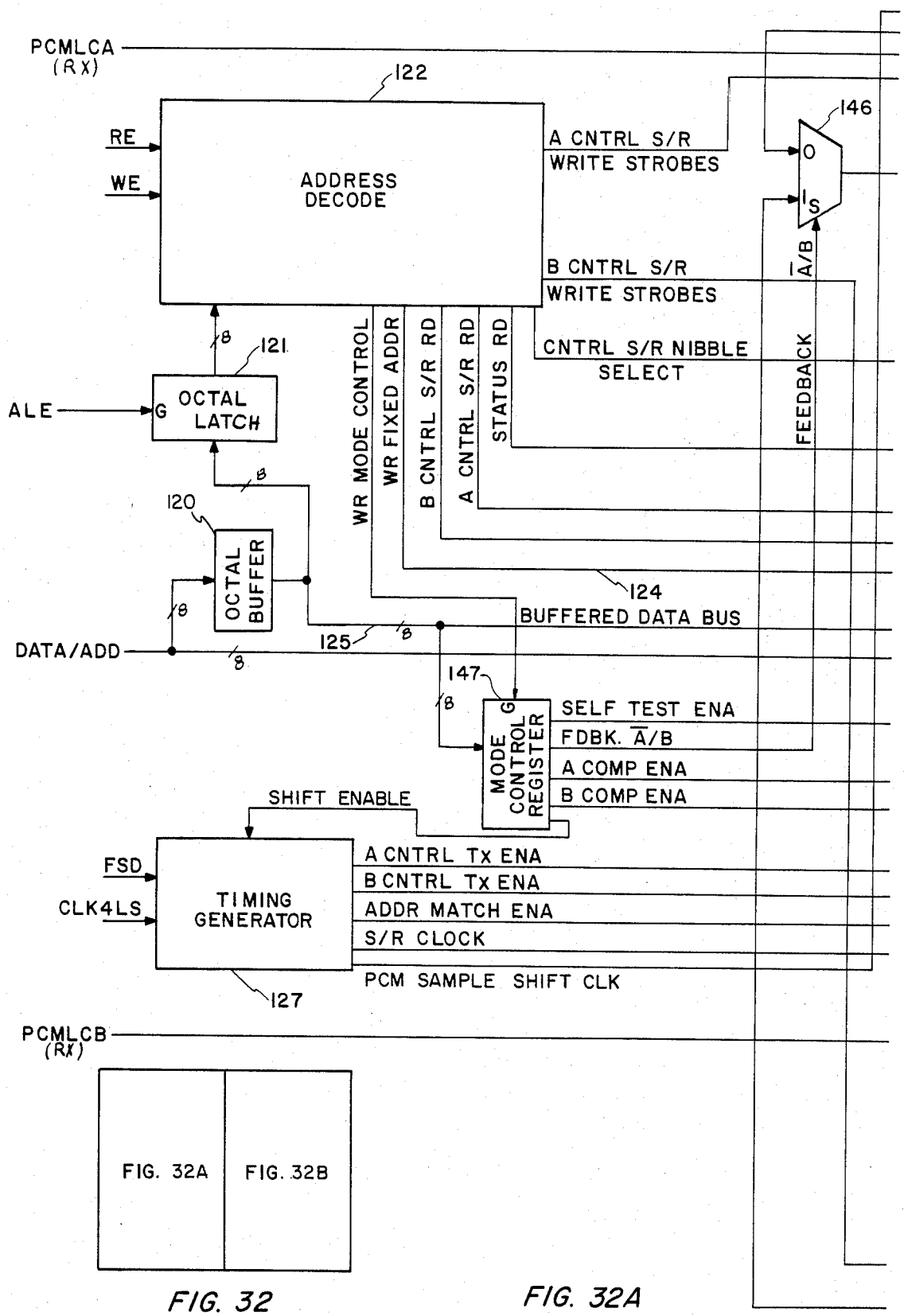
FIGS. 32A and 32B when arranged as shown in FIG. 32 illustrate in block diagram form the control interface 33 of FIG. 25A.
Figure 32B:
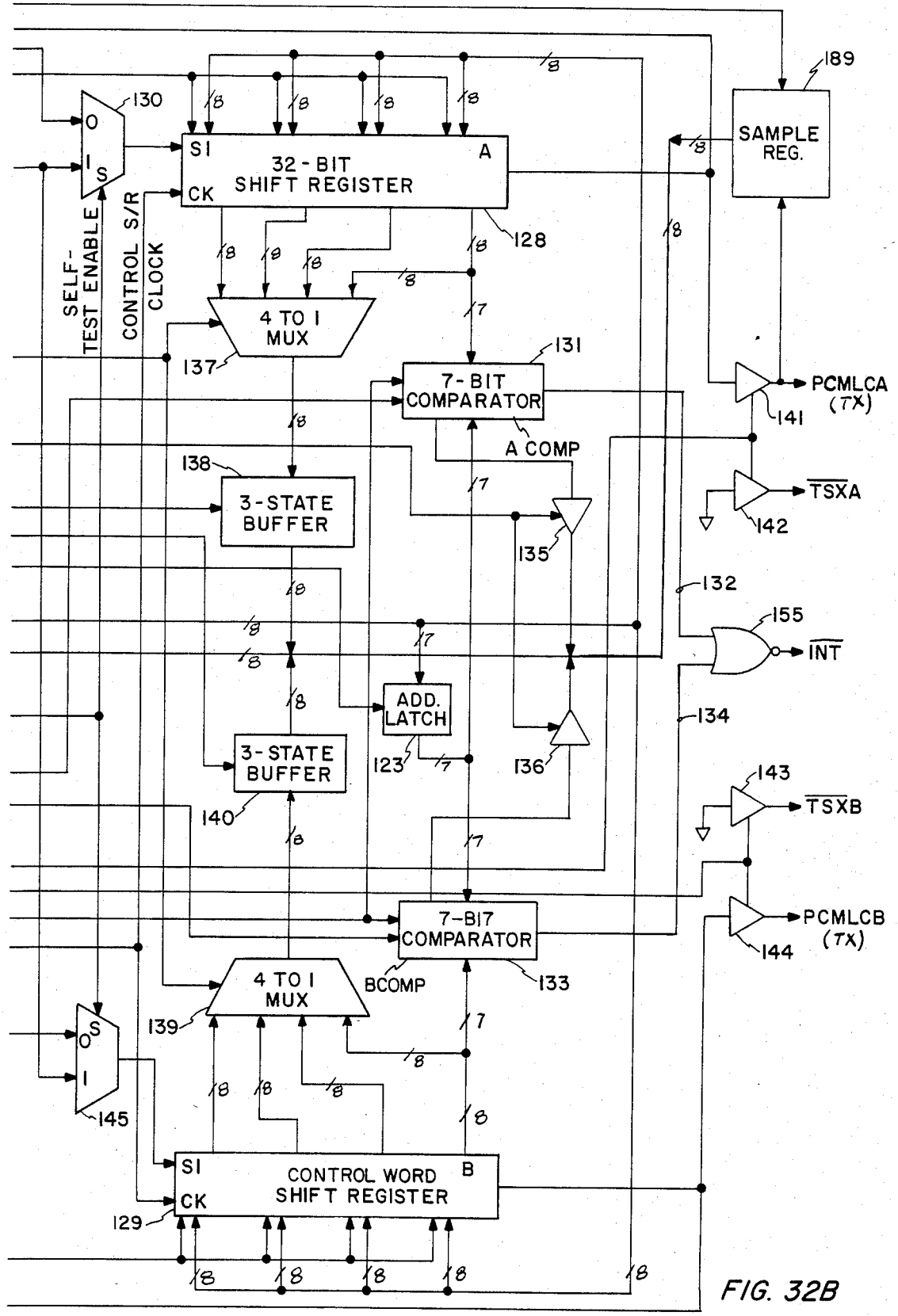

The control interface 33 of FIG. 25 comprises the protocol interface circuit PIC and as shown in detail block diagram form in FIG. 32 is connected to buses PCMLCA and PCMLCB. For purposes of clarity, single lines are used to represent multi-line buses and the number of lines in a bus is indicated at various points along the bus.

Initially, the line group processor 34 of FIG. 25 reads the line card address from leads 35 as shown in FIG. 25 and loads this address into the control interface latch 123 of FIG. 32 in the following manner. The processor 34 transmits the address to the latch 123 over the DATA/ADD lines to the control interface 33. This internal register address is buffered by buffer circuit 120 and is presented to the input of register 121. The line card processor 34 concurrently transmits a signal over the ALE lead which causes the internal register address to be stored in register 121. The internal register address decoder 122 decodes the address to apply an enable signal WR FIXED ADDR on lead 124. The line card processor 34 then transmits a data word which contains the line card wired address. The data word is applied to the input of register 123 via bus 125 and is gated therein via lead 124 by address decoder 122 upon receipt of a strobe signal from the processor on write enable lead WE. The register 123 then contains the wired address of the line card.

A timing generator circuit 127 receives the FSD and CLK4LS clock signals from the buffer distributor 9 of FIG. 21 and generates various timing signals for controlling the operation of the control interface 33. The FSD signal is used to control the timing of a clock signal on lead S/R clock. The clock signal on S/R clock controls the storing or transmitting of control words between bus PCMLCA and register 128 and between bus PCMLCB and register 129. Initially, a control word is received on one of the two buses e.g., PCMLCA. As the control word appears on bus PCMLCA in serial form it is gated via selector circuit 130 to shift register 128 using S/R clock. Registers 128 and 129 are 32 bit registers. After the proper number of clock pulses have been provided by S/R clock, a strobe signal is applied to the ADDR MATCH ENA lead thereby enabling a comparator 131 which compares the address portion of the control word in register 128 with the line group address stored in latch 123 and generates a signal on lead 132 if the addresses are the same. Similarly control word received on bus PCMLCB are stored in register 129 via selector 145 and the address portion thereof is compared to the line circuit address by comparator 133 which generates a signal on lead 134 if those addresses are the same. Gate 155 logically "or's" lead 132 and 134 and will provide a signal to the line group microprocessor 34 of FIG. 25 on its interrupt lead INT if an address match occurs for either bus PCMLCA or PCMLCB.

After the line group processor 34 is interrupted it will then obtain the control word by first transmitting an addres over the DATA/ADD bus. The address is stored in latch 121 and decoded by decorder 122 which, in turn activates the STATUS RD line. The STATUS RD line enables gates 135 and 136 which provide indications on the DATA/ADD bus as to which of the two comparators 131 or 133 detected the line card address.

The line group processor 34 will then, via a series of commands, obtain 24 bits of the control word from the appropriate one of the registers 128 or 129. If the control is obtained from register 128, then multiplexer 137 and buffer 138 are utilized. Similarly if the control word is to be obtained from register 129 then multiplexer 139 and buffer 140 are utilized.

Response data from the line group processor 34 may be returned to the line switch controller 7 via buses PCMLCA or PCMLCB.

Response data from the line group processor 34 is stored in a preselected one of the registers 128, 129 by a series of commands from the processor 34 which controls the gating of data through buffer 120 via bus 125 from register 128 or 129. The response data is witten into register 128 or 129 as eight bit parallel bytes. The response data is transmitted from the registers 128, 129 over the buses PCMLCA, PCMLCB respectively by the S/R clock signals in the following manner.

After the last byte of data is stored in the selected register 128, 129, the timing generator 127 will generate an enable signal at a predetermined time over leads A CONTRL or B CONTRL respectively. The outputs of gates 141 and 144 are connected to buses PCMLCA and PCMLCB respectively. The outputs of gates 142 and 143 are "wire-ored" with the leads $\overline{TSXA}$ and $\overline{TSXB}$ respectively from the line circuits. The S/R clock is used to shift the response data onto PCMLCA or PCMLCB. More specifically, the S/R clock provides pulses at a 4.096 mHz rate, with 42 pulses being supplied in a burst during one frame. The first 32 clock pulses of the 42 pulse burst are used to clock the response data from the registers 128 or 129 onto bus PCMLCA or PCMLCB.

The last 32 clock pulses of the 42 pulse burst are used to clock the control data from the bus PCMLCA or PCMLCB into the register 128 or 129. During the time when the middle 22 pulses are provided, control data is being written into registers 128 or 129 while simultaneously response data is being read from the register 128 or 129. This arrangement is provided because system timing constraints require a 10 bit skew between the receive PCM data bus and the transmit PCM data bus.

Selector 146 is provided for maintenance purposes. The register 147 is also provided for maintenance purposes and permits the processor 34 to disable either or both of the comparators 131, 133 and to control selectors 130, 145 and 146.

7.4 SELF TEST (FIGS. 32, 33, 34, 35)

One feature of the control interface 33 is that it includes a self-test mode of operation in which the serial output of one of the shift registers 128 or 129 is selected as the serial input data source for both of the registers 128 and 129. Selectors 145, 146 and 130 provide feedback paths for the registers 128, 129 during the self-test mode. In this test mode, the shift registers 128 and 29 are loaded with test data by the microprocessor and allowed to shift for several frames. Proper operation of the shifting function of the registers 128, 129 and the address decoder circuit 122 can thus be verified without affecting the PCM buses PCMLCA, PCMLCB.

A self-test program routine is executed during power-on initialization of the line switch. This self-test routine exercises the circuitry of the control interface 33 and produces a go/no-go result.

The test initialized the control interface by loading a code in the mode control register 147 which provides a signal on the SELF TEST ENA line to operate selector 130 and a signal on the FDBK A/B line operates selector 146 such that a feedback path for register 128 is enabled. A signal is provided to the timing generator 127 which responds to preventing transmission over the buses PCMLCA, PCMLCB, and by inhibiting the shifting of the registers 128, 129. The A comparator 131 and B comparator 133 are enabled.

Next, A register 128 is loaded with the following test data (in hexadecimal): byte 1=63, byte 2=C1, byte 3=F8, byte 4=∅F. The address latch 123 is loaded with F8, i.e., the same as byte 3 on register 128. After the A register and address latch 123 have been loaded, the A and B registers 128 and 129 are allowed to shift for eight PCM frames. FIG. 33 illustrates the contents of the A and B registers 128, 129 at the start of the self-test and after each frame of shifting. Note that the A and B registers 128 and 129 are clocked 42 times each frame as explained above. The A and B control registers are 32 bits long. Therefore, the test data in the A register 128 will be in effect rotated left (left being defined as toward the most significant bit position) a total of 10 (42 modulo 32) places after each 42 pulse clock burst. After eight frames of shifting the test data in the A and B registers 128 and 129 will have been rotated 16 (42×8 modulo 32) places left of the position of the test data at the start of the test. Since the address latch 123 contains F8 and the A and B address comparators 131 and 133 are enabled an address match should occur with both comparators only during the eighth frame of shifting. If both comparators 131 and 133 do not indicate a match condition during the eighth frame, a failure has occurred. If both comparators do indicate a match, the contents of both the A and B registers 120, 129 are compared with the following expected data: byte 1=F8, byte 2=0F, byte 3=63 and byte 4=C1. Any mismatch of the data in the A and B registers 128 and 129 with the expected data indicates a failure.

FIGS. 34 and 35 are a program listing in MCS-48 assembly language code implementing the self-test operation for a line group controller.

7.5 AUTOMATIC GAIN SETTING (FIGS. 25, 30, 32, 36, 37 A-C)

The control interface 33 of FIG. 32 includes a voice channel data sampling register 189 which permits the microprocessor to monitor channel data appearing on one of the PCM buses PCMLCA. This channel sampling feature allows the line group processor to measure and thus provide automatic gain setting of the line circuits. Register 189 is an 8 bit shift register that is serially loaded every frame with data appearing on a predetermined channel of bus PCMLCA. The PCM SAMPLE SHIFT clock from timing generator 127 clocks the serial data from PCMLCA into the register 189. Between the 8-pulse clock bursts, data in register 189 can be read by the microprocessor sending an appropriate command to the control interface. Note that for clarity, the connection from the address decoder 122 to the register 189 has not been shown.

The above described variable gain circuit of FIG. 30 permits adjustment of the gain of the amplifiers 103 and 105 to a predetermined value without costly hand selection of parts. The analog switches 101, 104 respectively control portions of a resistance divider 102, 106 to change the gain of amplifiers 103, 105, respectively.

In the embodiment shown, the predetermined value for amplifier 103 is set such that the overall loss in the receive path of the line circuit is −0.25 dB (decibel). The predetermined value for amplifier 105 is set such that the overall gain in the transmit path of the line circuit is 0 dB. The accuracy of these settings is made to within ±0.1 dB. The incremental difference between adjacent steps of PCM representations representing the peak required signal levels (of around 0 dBm (decibel relative to a milliwatt test tone)) is approximately 0.4 dB for mu-law encoding. As shown below, it is possible to use the PCM representations to measure analog signals peaks with an accuracy greater than that of the PCM steps.

The frequency for a reference signal used in measuring the gain of the transmission circuit is chosen as 1.024 kHz sampling rate. By chosing the frequency of the reference signal in this manner, the reference signal will be sampled at or near its peak amplitude a predictable number of times over a predetermined number of cycles.

For a 1.024 kHz signal sampled at an 8 kHz rate, 16 cycles are required before the PCM representations are repeated. During a 16 cycle period, 125 PCM representations are generated.

From mu-law tables it can be determined that the maximum linear level of a signal that can be encoded is 8159 linear units and, by definition, corresponds to the peak of a signal having an rms (root means square) level of +3.17 dBm. The peak value of the 0 dBm reference signal can be calculated by reducing 8159 by 3.17 dB. In this manner, the peak value of 0 dBm signal is determined to be 5664.1785 linear units. From mu-law tables it can be determined that 5664.1785 linear units lies between level 118 which represents 5599 linear units and level 119 which represents 5855 linear units. It can be calculated that levels 118 and 119 are approximately 0.4 dB apart.

If 125 successive PCM samples are monitored and at least one sample corresponds to level 119 or a higher level, the signal represented by that group of 125 samples is greater than 0 dBm by more than 0.278 dB.

If all samples in a group of 125 successive PCM samples are less than level 118 then the signal represented is less than 0 dBm by more than 0.1 dB. For a 0 dBm signal, the number of samples N out of 125 successive PCM sample that are at level 118 either positive and negative polarity is determined as follows:

The reference signal may be represented as A sin ωt. If decision level 118 is represented by A′ then $$A' = A \sin\left(\frac{\pi}{2} - Q\right) \quad (1)$$

Where (π/2)-Q represents the angular displacement from zero degree where the reference signal reaches level 118.

Solving equation (1) for Q yields $$Q = \frac{\pi}{2} - \sin^{-1}\frac{A'}{A} \quad (2)$$

The probability that any one PCM sample in a group of 125 successive samples will be above level 118 is $$P = \frac{4Q}{2\pi} = \frac{2Q}{\pi} \quad (3)$$

Substituting equation 2 in equation 3 yields $$P = \frac{2}{\pi}\left(\frac{\pi}{2} - \sin^{-1}\frac{A'}{A}\right) = 1 - \frac{2}{\pi}\sin^{-1}\frac{A'}{A} \quad (4)$$

The number of PCM samples in a group of 125 successive samples which will be at level 118 for a 0 dBm signal is $$N = 125\, P \quad (5)$$

For a 0 dBm signal
A = 5664
A' = 5599
and N may be calculated as 12.08.

Equations 1-5 may be used to determine the signal levels corresponding to the number of occurrences N of level 118 samples in a successive group of 125 PCM samples yielding the results shown in the table below:

TABLE

| N | A(dBm) | N | A(dBm) | N | A(dBm) |
|---|--------|---|--------|---|--------|
| 1 | −.0998 | 9 | −.0447 | 16 | +.0762 |
| 2 | −.0978 | 10 | −.032 | 17 | +.0992 |
| 3 | −.0944 | 11 | −.0173 | 18 | +.1236 |
| 4 | −.0896 | 12 | −.0014 | 19 | +.1494 |
| 5 | −.0834 | 13 | +.0159 | 20 | +.1767 |
| 6 | −.0758 | 14 | +.0346 | 21 | +.2055 |
| 7 | −.0669 | 15 | +.0547 | 22 | +.2357 |
| 8 | −.0565 | | | | |

In the illustrative embodiment, if 9 to 16 level 118 samples occur during 125 successive PCM samples, it is assumed that the samples represent a signal of 0 dBm. From the above table it is seen that this sample range represents 0 dBm over a range of −0.0447 dBm to +0.0762 dBm.

Advantageous use of the variable gain circuitry is made to permit automatic adjustment of the gain setting. Each line circuit shown in FIG. 25 is connected via a test relay 38 to a test bus. The test bus is multiplied to all the test relays of a line group and may also be multiplied to all line groups in a line switch module. Alternatively, the serial test buses may be utilized within a line switch module, each test bus being multipled to one or more line groups. To set the TX gain of a line circuit, i.e., the gain of amplifier 105, the line switch controller will connect an analog milliwatt generator to the proper test bus.

Figure 36:
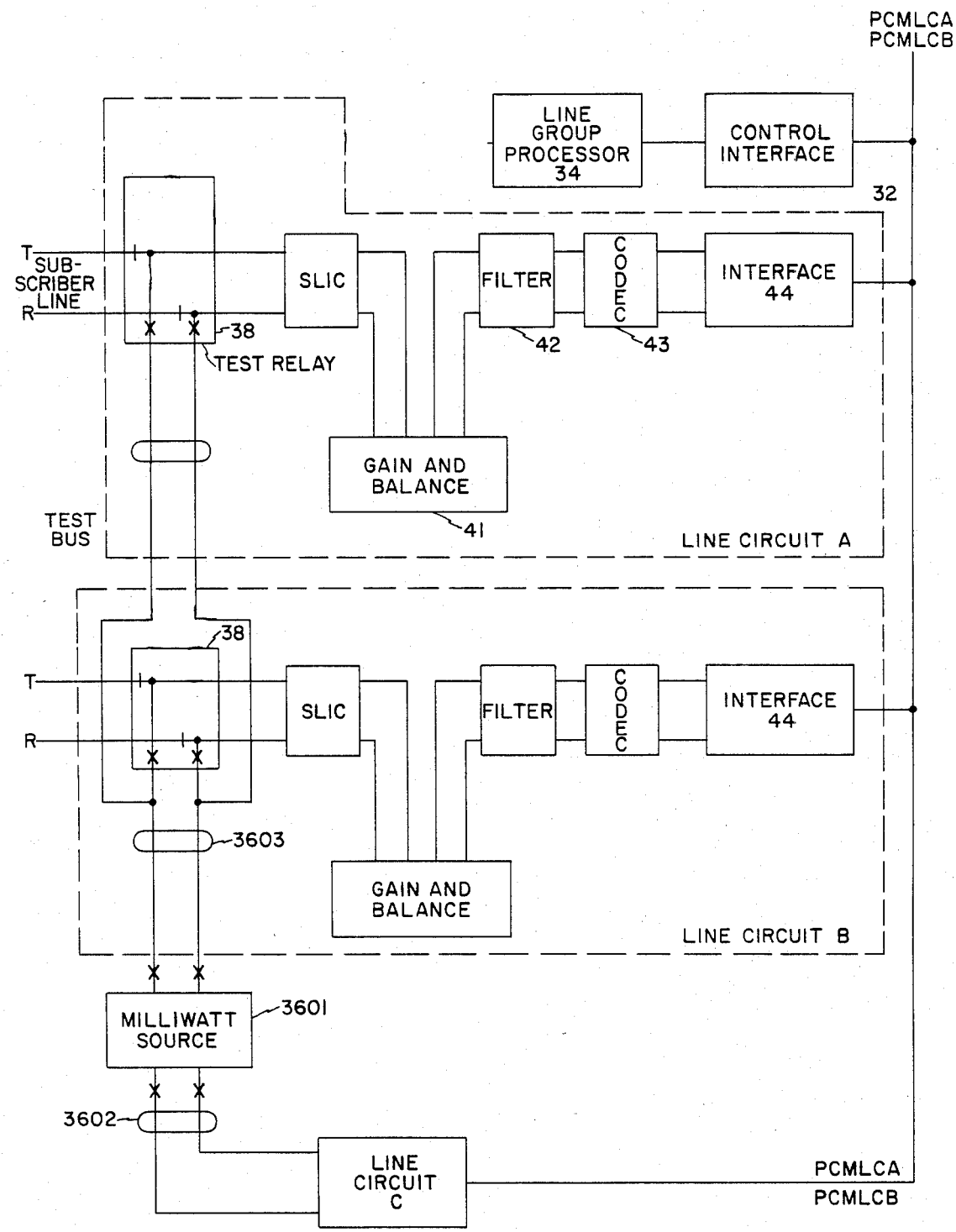
FIG. 36 illustrates in block diagram form an automatic gain setting feature in accordance with the principles of the present invention.

FIG. 36 illustrates the arrangement for setting the transmit gain in a line circuit, the line switch controller 7 will connect a milliwatt generator 3601 to the proper test bus. The line group processor 34 of the line circuit which is to have its transmit gain set will then actuate the test relay 38 of the line circuit. By means of the sample register 189 of the control interface 33 shown in FIG. 32, the line group processor will monitor the PCM output of the line circuit. The line group processor will then incrementally change the gain of the transmit amplifier 105 in FIG. 30 and balance circuit 41 by selectively actuating the analog switches 104 shown in FIG. 30. After each incremental change in the gain, the line group controller will monitor the PCM data. The iterative process will continue until the monitored PCM signals represent a signal of 0 dbm±0.1 dB. The line group processor 34 will then release the test relay 38 and signal the line switch controller 7 that the transmit gain has been set. The line switch controller 7 can then direct a line group processor 34 to set the transmit gain of other line circuits. To set the receive gain, i.e., that of amplifier 103 in FIG. 30, the line switch controller will cause a digital signal representing a signal 0.25 dB greater than 1 milliwatt to be applied on a PCM channel that can be used for testing. One way in which this may be done is for the line switch controller 7 to connect the milliwatt source 3601 providing a 0.25 dB signal to a test bus 3602 and direct the line group processor 34 to connect a line circuit, e.g., line C, which has had its transmit gain adjusted to the desired level connected to the test bus 3602. The line circuit C will then provide PCM signals representative of the milliwatt source on a predetermined channel of the PCM bus PCMLCA or PCMLCB. If it is assumed that line circuit A is to have its receive gain set, then line group processor 34 will actuate test relay 38 connecting the output of line circuit A to the test bus 3603. Another line circuit B which has previously had its transmit gain set will be connected to the same test bus 3603 by actuating its test relay 38. Thus, the analog output of line circuit A will be connected to the analog input of line circuit B. The line circuit B will be directed by the line group processor 34 to receive the PCM channel which is carrying the digital PCM tone signal from line circuit C.

The PCM output of the line circuit A will be monitored by its line group processor 34 again utilizing the sample register 189 of the control interface 33.

The line group processor will incrementally change the gain of the receive amplifier in line circuit A until the output is again 0 dBm±0.1 dB. Thus the transmit gain of any circuit can be set to 0±1 db and the receive gain of any circuit can be set to 0.25 dB±0.1 dB.

Figure 37A:
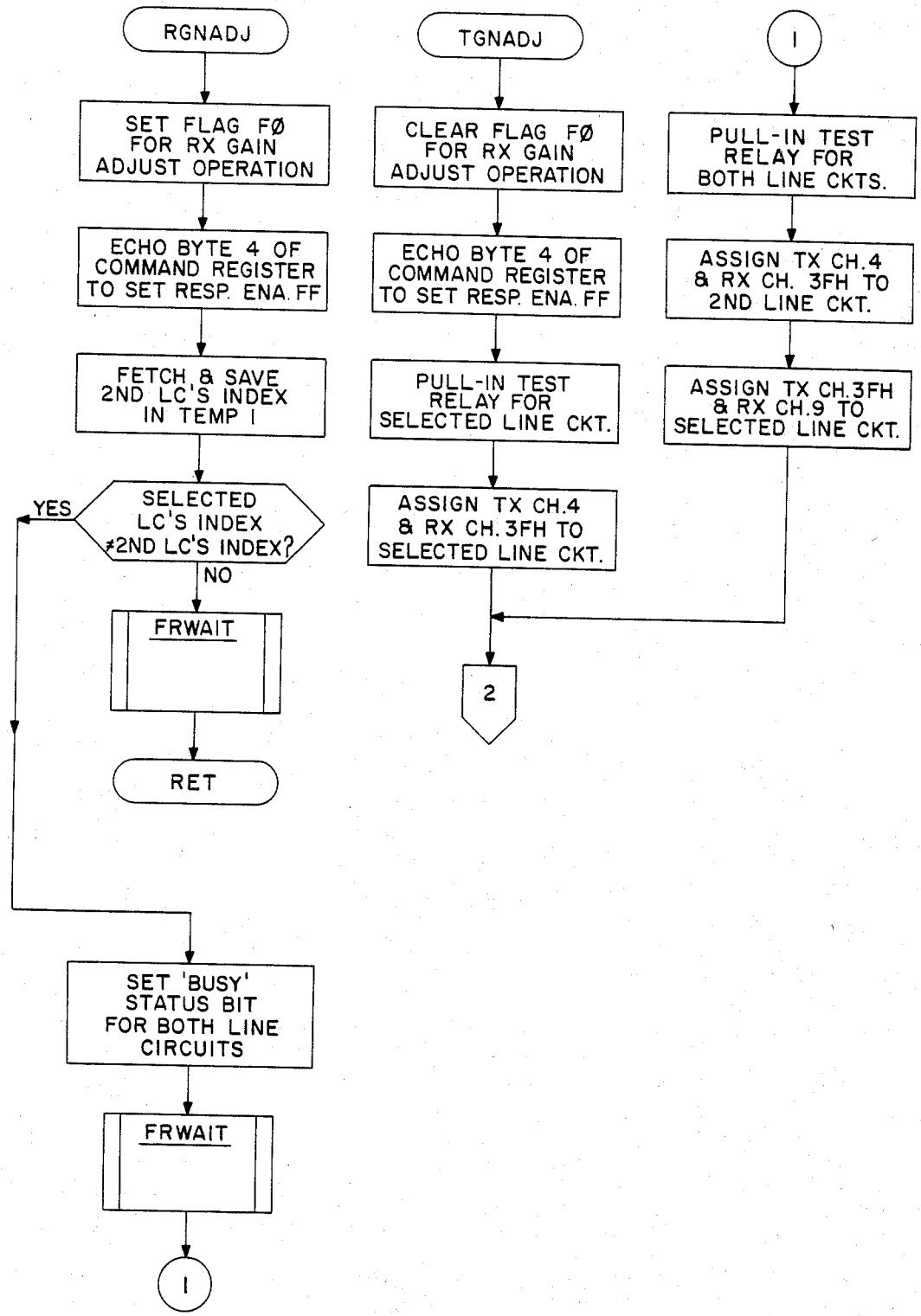
FIGS. 37A, 37B and 37C are flow charts of programs for automatic gain setting according to FIG. 36.
Figure 37B:
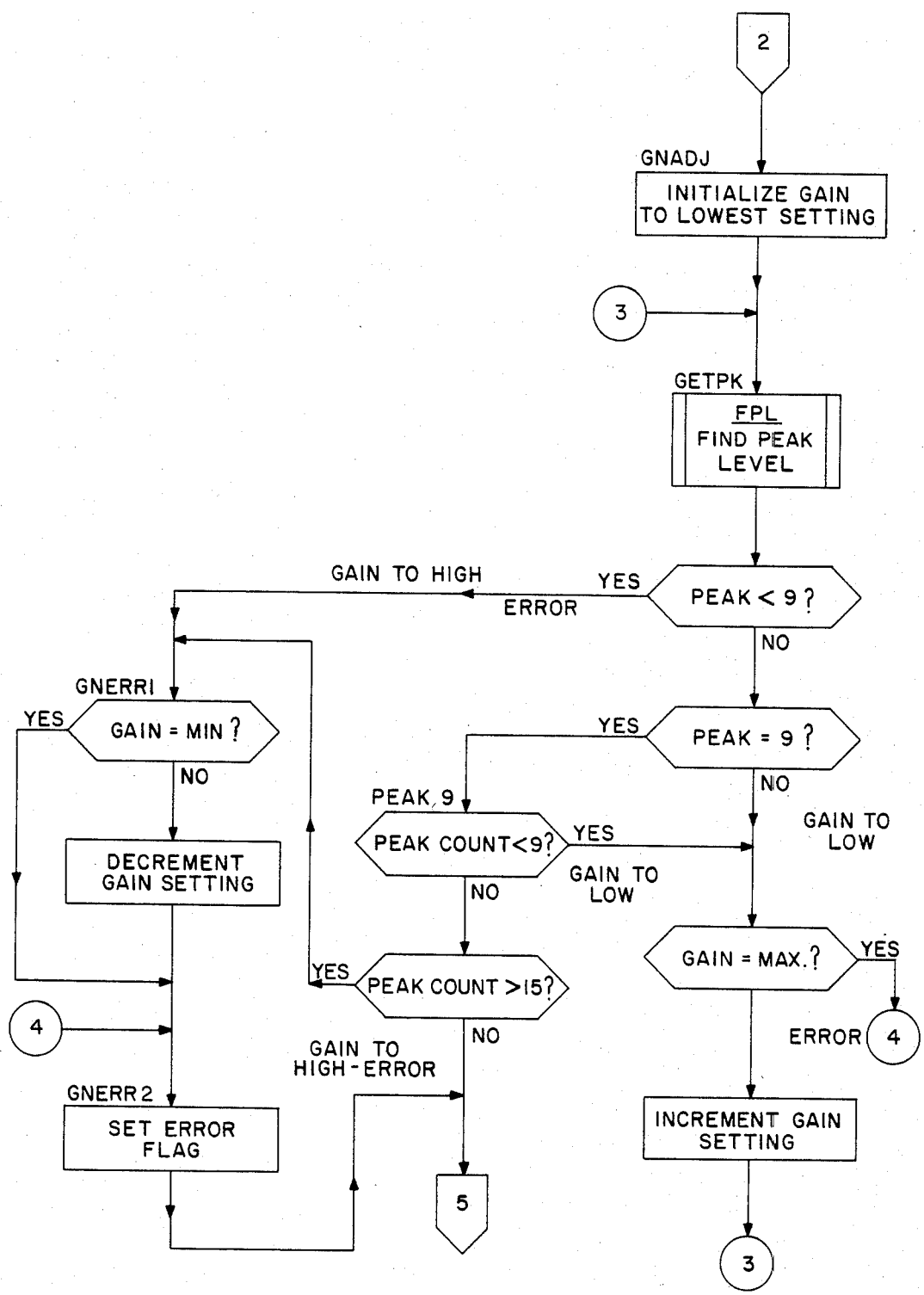
Figure 37C:
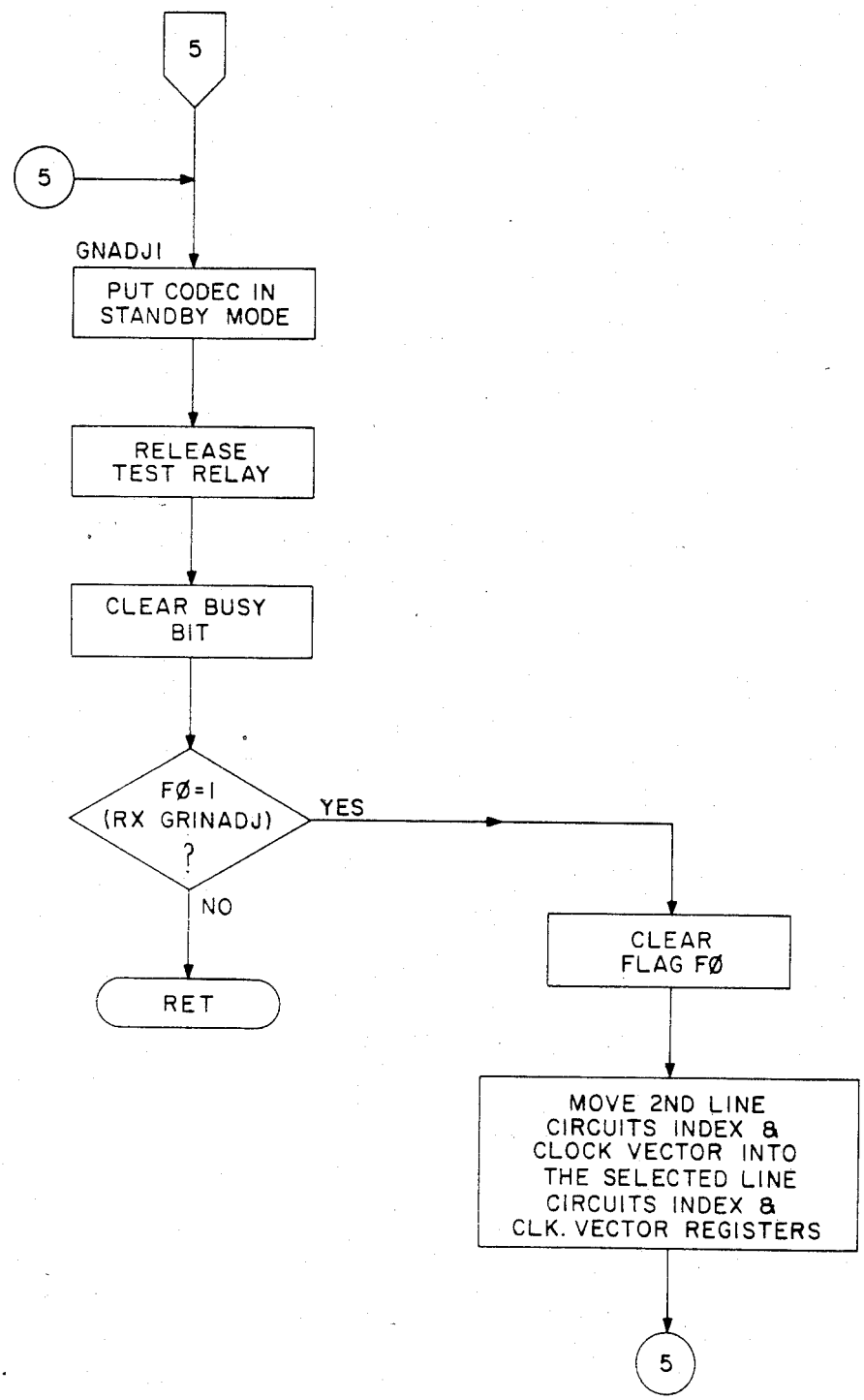

FIGS. 37 A, B and C illustrated in flow chart form the program for setting the transmit and receive gain.

8.0 OTHER LINE CARD ARRANGEMENTS (FIGS. 25, 38, 39 and 40)

Figure 38:
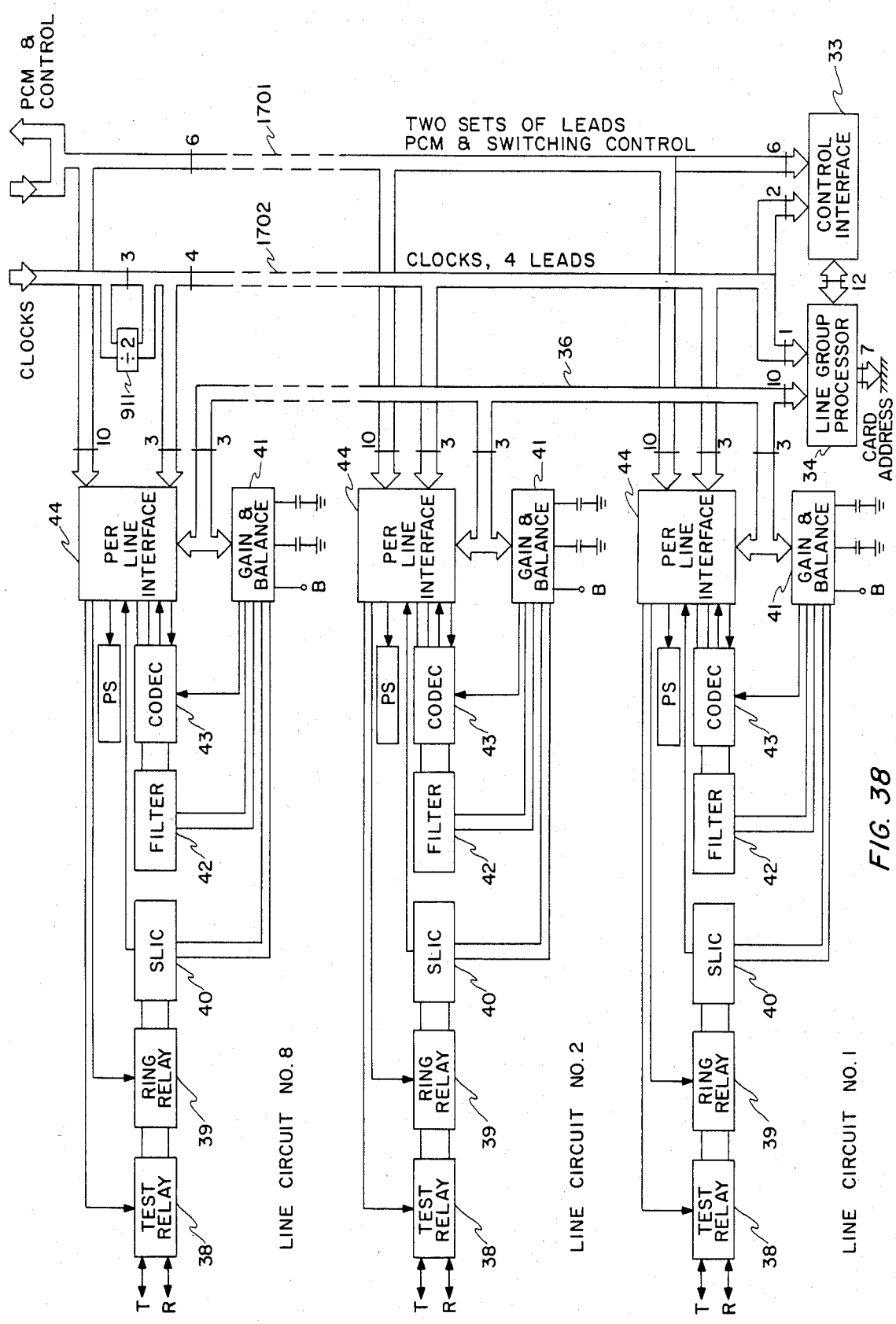
FIG. 38 is a general block diagram of the detailed drawing of FIG. 14.

The detailed drawing of FIG. 25 may be redrawn in general block diagram form with various leads grouped into buses as shown in FIG. 38. Bus 1701 includes PCMLCA, PCMLCB, $\overline{AILS}$, and $\overline{BILS}$. Bus 1702 includes CLK4LS, FSD, CLKT and CLK2.

The line card control interface 33 as described hereinabove interfaces between the line group processor 34 and the PCM buses PCMLCA and PCMLCB for the interchange of control information over the PCM buses.

Figure 39:
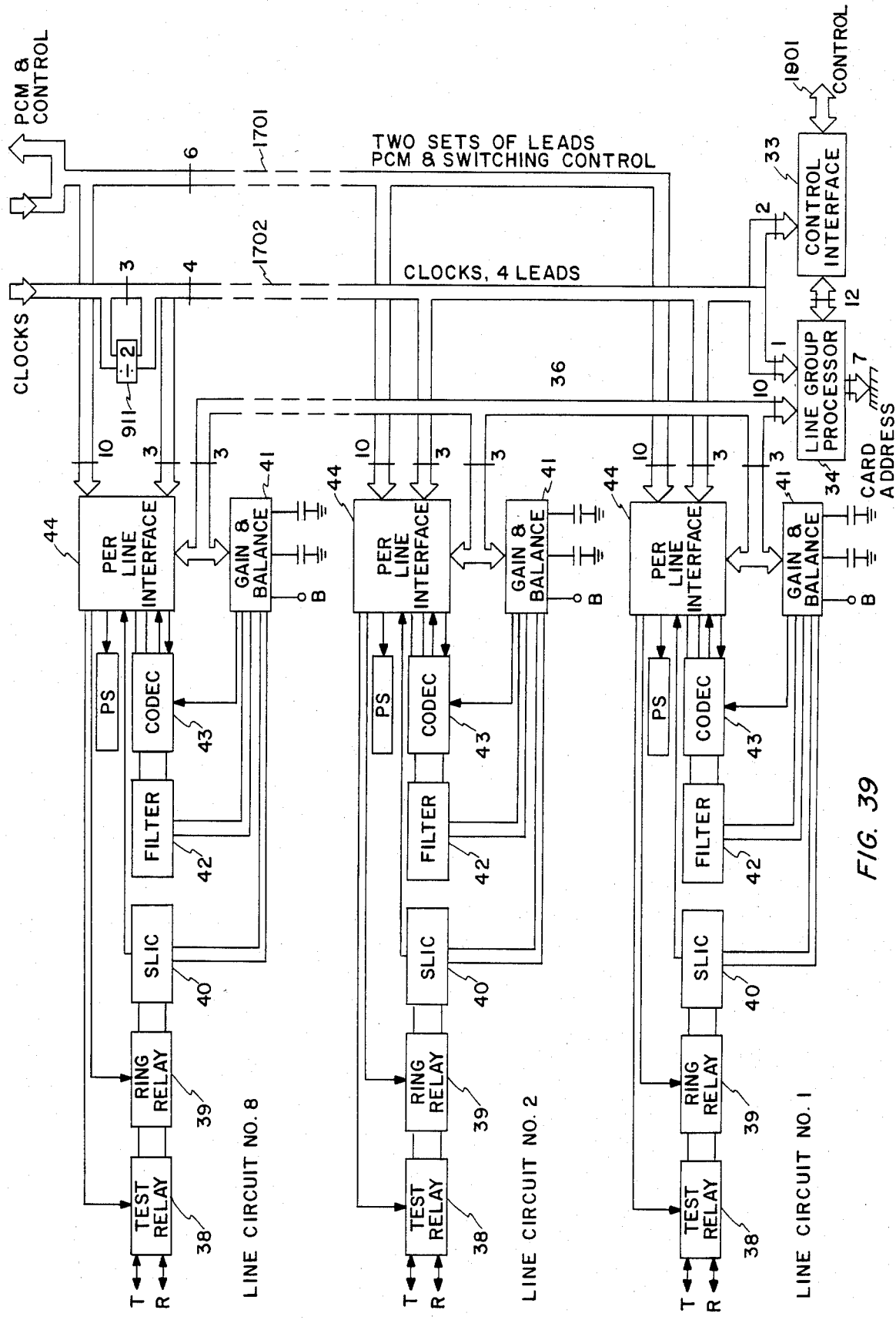
FIG. 39 is a general block diagram of another embodiment of FIG. 14.

In another embodiment of the invention shown in FIG. 39, a separate control bus 1801 is provided and the line group control interface 33 is not connected to the PCM bus 1701. In this arrangement, control information may be exchanged between the line card control interface 33 and a line switch control 7 in the system control 5 over a control bus 1801.

Figure 40:
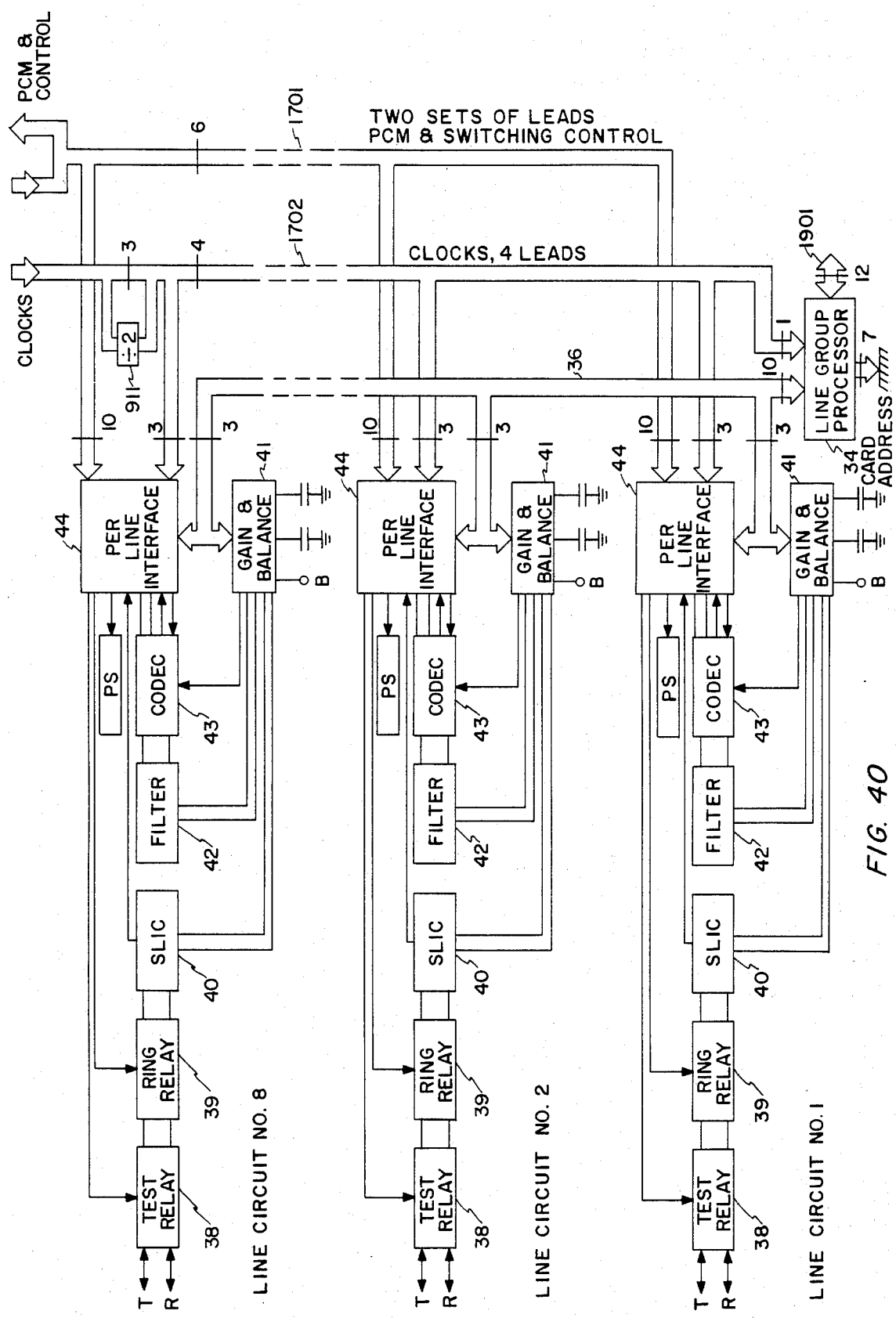
FIG. 40 is a general block diagram of a third embodiment of FIG. 14.

In yet another embodiment of the invention shown in FIG. 40, the line group processor 34 may directly communicate via bus 1901 with the line switch control 7 or the system control 5.

Figure 41:
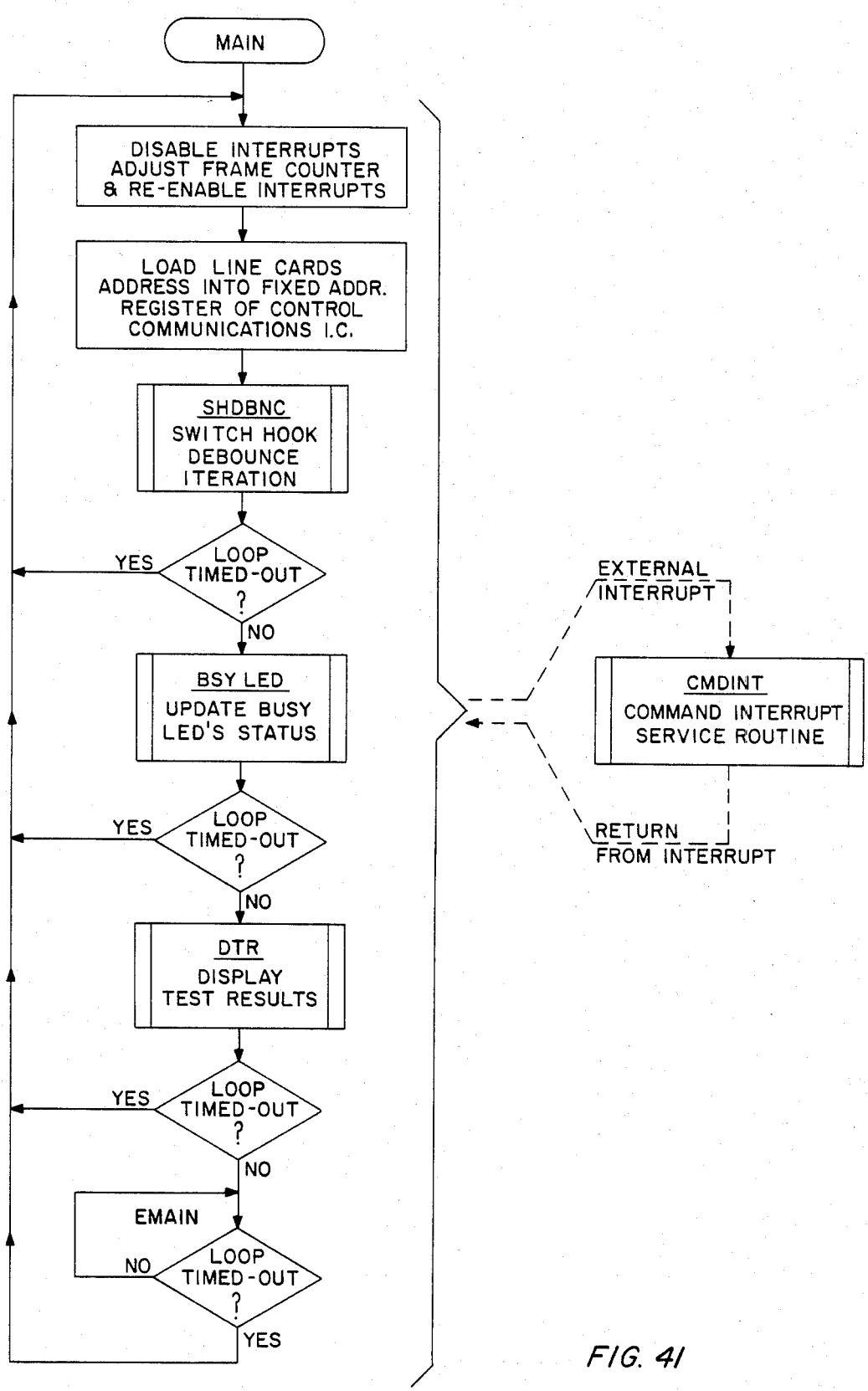
FIG. 41 is a flow chart of the software architecture of the line switch controller 7.
Figures 42, 42A:
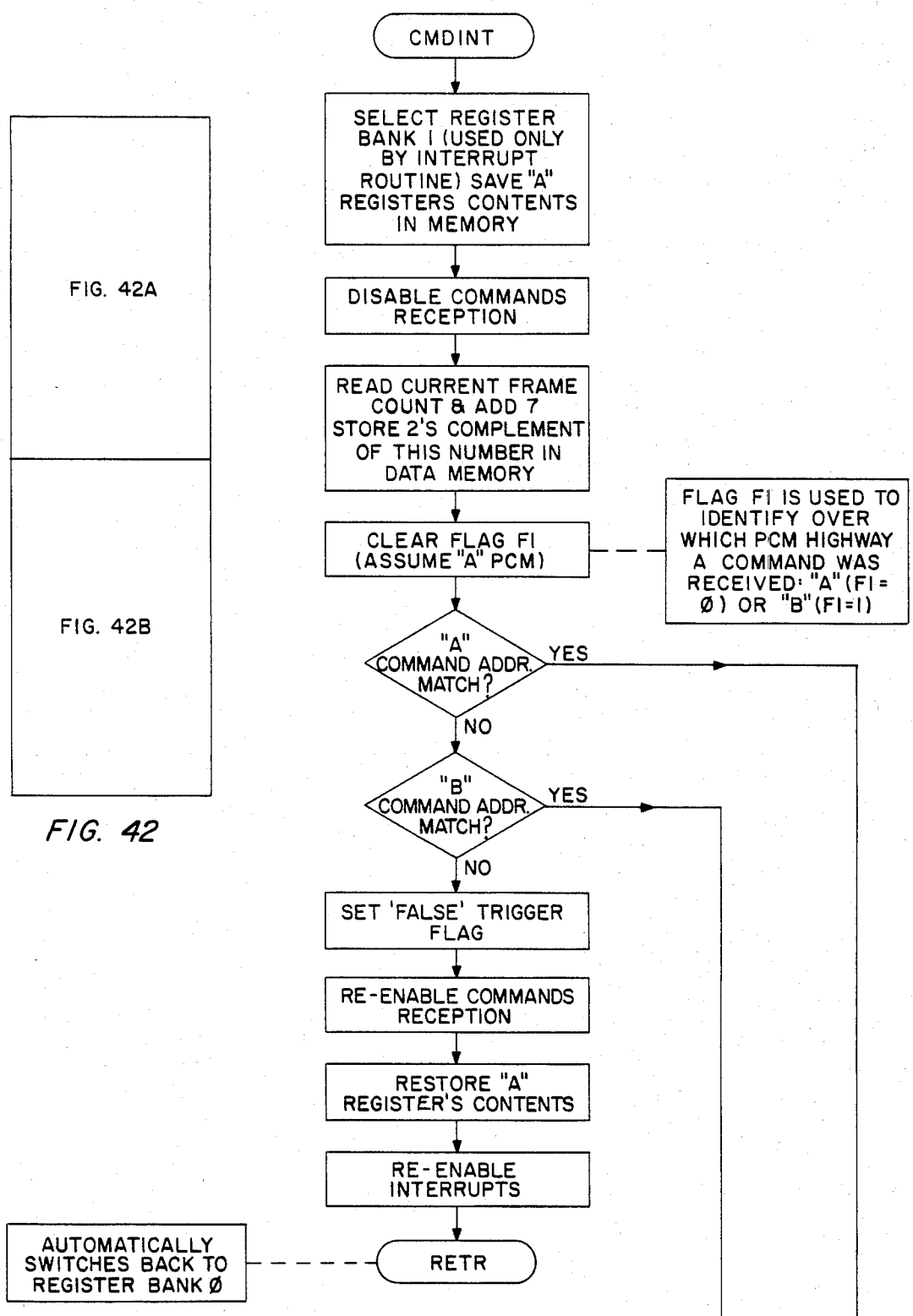
FIGS. 42A and 42B when arranged as shown in FIG. 42 and FIGS. 42A and 42B when arranged as shown in FIG. 43 are flow charts of programs for the line group processor 34.
Figure 42B:
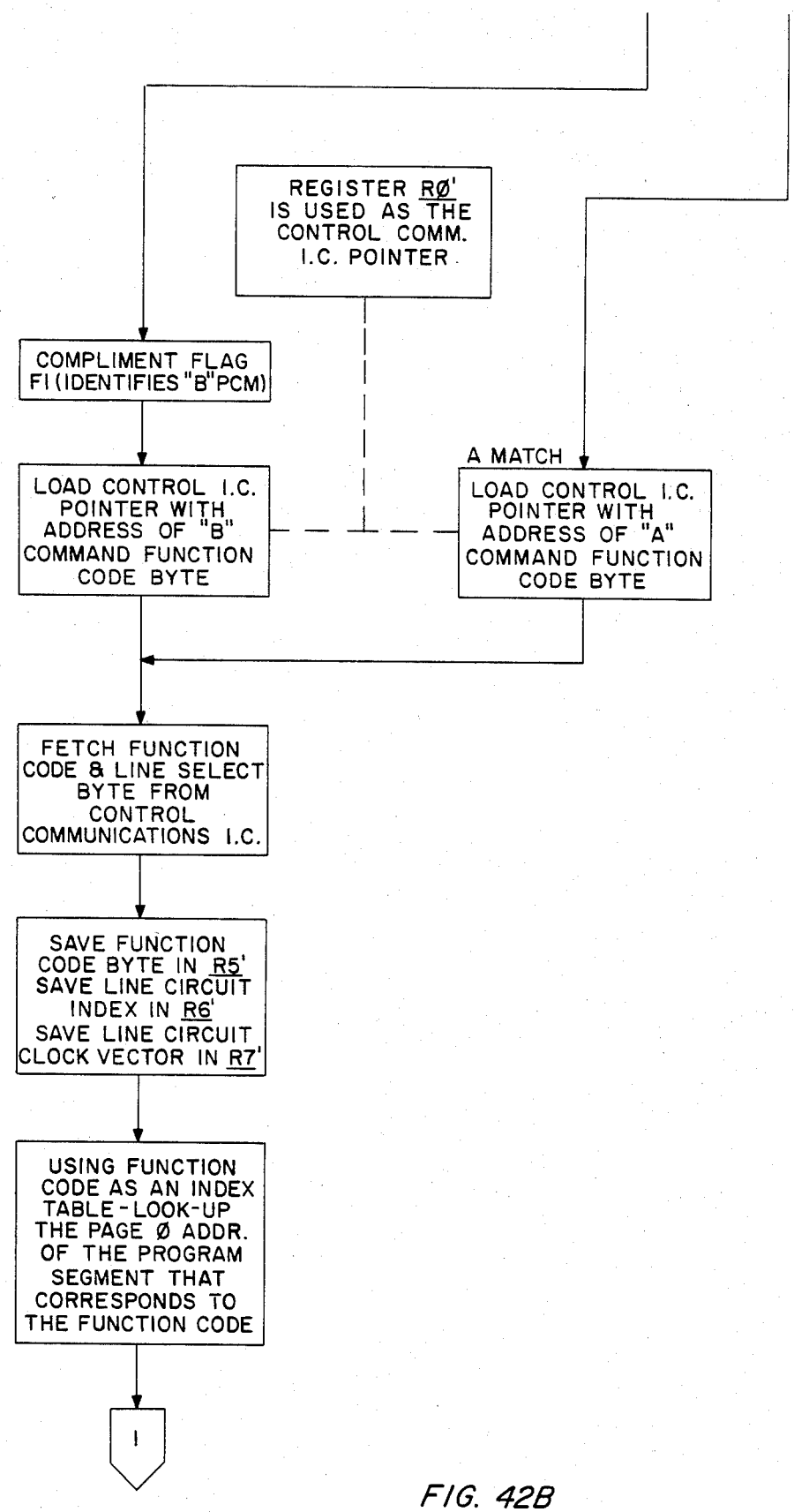
Figures 43, 43B:
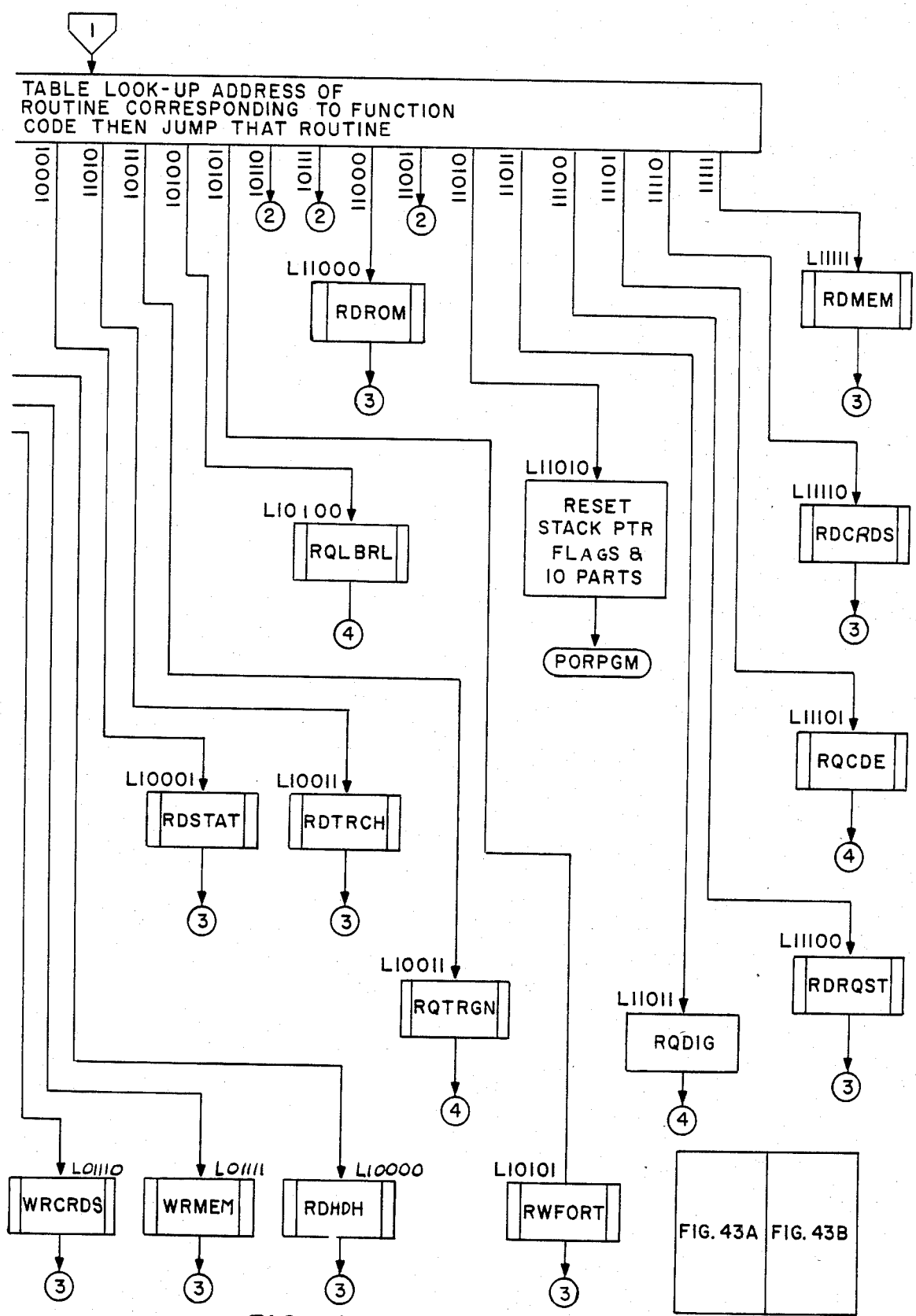
Figure 43A:
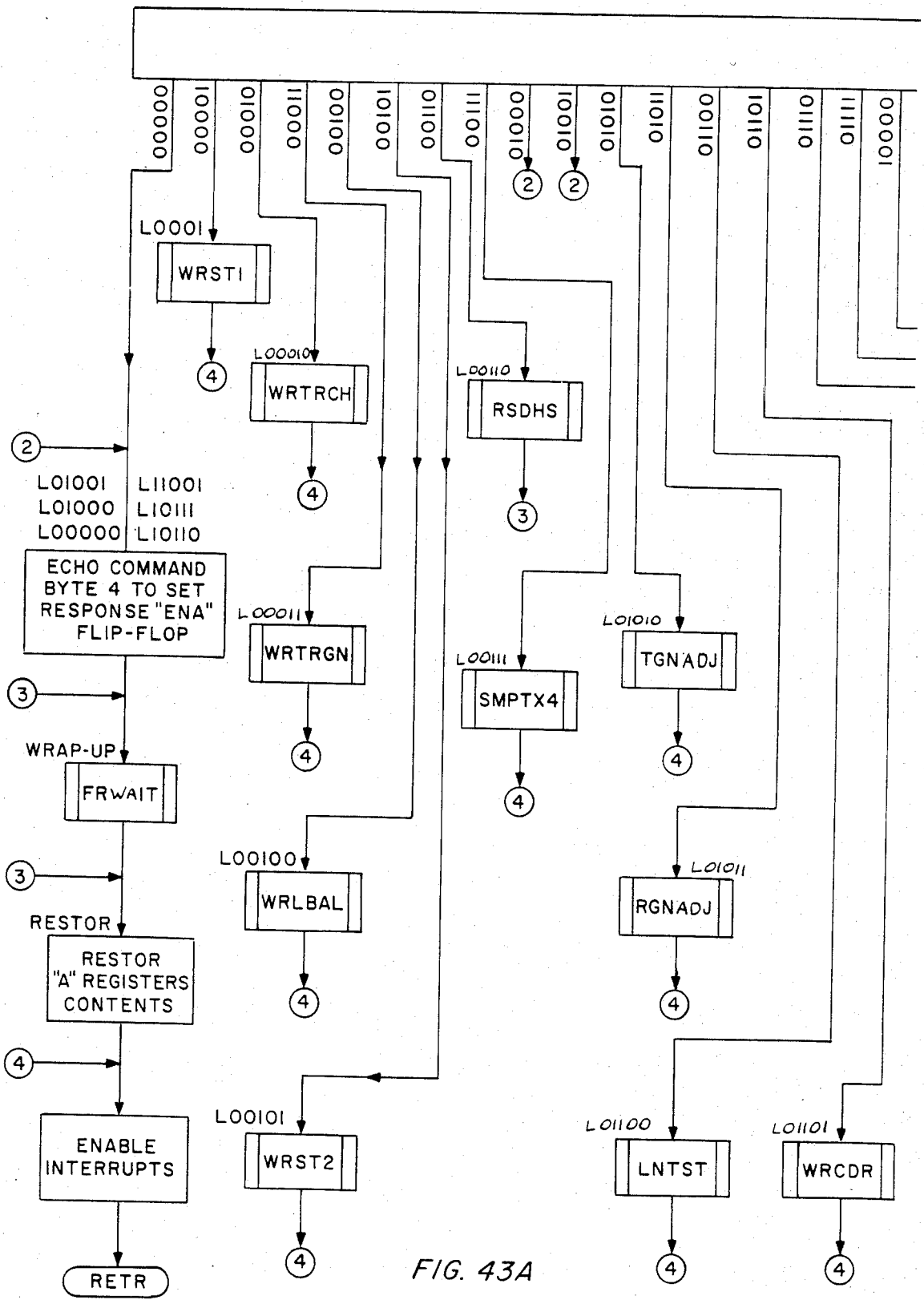

9.0 LINE GROUP PROCESSOR 34 (FIGS. 41, 42 and 43)

The line group processor 34 in the illustrative embodiment comprises an INTEL 8049 microprocessor which is described in the aforementioned INTEL reference at pages 8-31 to 8-35. FIG. 41 illustrates in flow chart form the main program loop of the software utilized in the illustrative embodiment. FIG. 42 illustrates the interrupt service routine of FIG. 41 in greater detail. FIG. 43 illustrates in flow chart form the table look-up addresses of various routines called by the command interrupt service routine. Program listings for the line group processor program are shown in the attached appendix.

CALL SET-UP (FIGS. 1, 2, 25)

When a subscriber line (A) goes off-hook, the line switch controller 7 of FIG. 2 transmits a common channel command to the system control 5 of FIG. 1 informing the system control 5 of a new sequence. The system control 5 responds by transmitting a common channel command to the line switch controller 7 assigning a PCM channel A and providing dial tone.

The line switch controller 7 transmits a channel assignment command (32 bit control word) to a line group processor 34 of FIG. 25. The line group processor 34 activates power to the line circuit for A, assigns transmit and receive channels at the CODEC for A, and updates the status of line circuit. The system control 5 will then monitor dial pulses from A.

When the system control 5 determines the called line (B), the system control 5 will transmit a common channel command to the line switch controller 7 of the line switch to which B is terminated. The line switch controller 7 will request the busy/idle status of B from the line group processor 34 associated with the group of lines including B. The line group processor 34 responds by transmitting B's busy/idle status to the line switch controller 7. If B is idle, the line switch controller 7 transmits the channel assignment to the line group processor 34. The line group processor 34 then enables power to B's line circuit, assigns the transmit and receive channels to B's CODEC, and updates the line circuit status.

9.1 RINGING AND CALL CONNECT (FIGS. 1, 2 and 25)

The system control 5 sends a common channel command to the second line switch controller 7 to connect ringing to B, and turns on a ring-back tone generator to provide ring-back tone to A. If A and B are both terminated at the same line switch, the system control 5 may also indicate an intra-line switch call. The second line switch controller 7 sends ring commands to a ring circuit B of FIG. 2 and to the line group processor 34 for B. The line group processor 34 begins a ringing routine.

When B answers, the system control 5 sends a stop ringing command to the line switch controller 7. The line switch controller 7 in turn sends ring terminate commands to the ring circuit 13 and line group processor 34. The line group processor 34 terminates the ring routine.

If the call is an intra-line switch call, the receive channels for A and B are switched upon commands from the line switch controller 7 to the line group processors 34.

9.2 CALL DISCONNECT (FIGS. 1, 2 and 25)

When A and B go on-hook, the system control 5 sends a common channel command to one of the line switch controllers 7 to release the line. The line switch controller in turn sends a disconnect command to the line group processor 34. The line group processor 34 removes power from the line circuit and updates the line circuit status. This procedure is repeated for the other party.

While we have described above the principles of our invention in connection with specific apparatus, it is to be clearly understood that this description is made only by way of example and not as a limitation to the scope of our invention as set forth in the objects thereof and in the accompanying claims.

What is claimed is:

1. A telephone switching system comprising:
   a system controller;
   a switching network;
   a first PCM line connected to said switching network;
   a first plurality of subscriber lines;
   a first line switch connected to said first PCM line and to said first plurality of subscriber lines, said first line switch comprising:
   a first processing means for receiving commands from said system controller and for generating responses to said system controller;
   a first group of line circuits connected to a first group of said first plurality of subscriber lines, said first group of line circuits having a second processing means for receiving commands from said first processing means and for controlling said first group of line circuits; and
   bus means for exchanging PCM information between said first PCM line and said first group of line circuits and for exchanging control information between said first and second processing means, said PCM information and said control information being time multiplexed.

2. A telephone switching system in accordance with claim 1 comprising:
   a second PCM line connected to said switching network and said line switch, said first and second PCM lines each carrying PCM information at a first data rate;
   said bus means comprising a bidirectional bus for carrying PCM information at a second data rate, said second data rate being a multiple of said first data rate, and rate conversion means for receiving PCM information from said first and second PCM lines at said first rate and multiplexing said information onto said bus at said second rate and for receiving PCM information at said second rate from said bus and for demultiplexing said information from said bus onto said first and second PCM lines at said first rate.

3. A telephone switching system in accordance with claim 1 or 2 comprising:
   a third PCM line connected to said switching network;
   a second plurality of subscriber lines;
   a second line switch connected to said third PCM line and to said second plurality of subscriber lines;
   said second line switch comprising:
   a first processing means for receiving commands from said system controller and for generating responses to said system controller;
   a second group of line circuits connected to a first group of said second plurality of subscriber lines, said second group of line circuits having a second processing means for receiving commands from said first processing means and for controlling said second group of line circuits;
   bus means for exchanging PCM information between said third PCM line and said second group of line circuits and for exchanging control information between said first and second processing means, said PCM and said control information being time multiplexed; and
   second bus means extending between said bus means of said first line circuit and said bus means of said second line circuit.

4. A telephone switching system in accordance with claim 3, wherein said second bus means extends to said first group of line circuits, whereby said second processing means of said first line switch receives commands from said first processing means of said second line switch;

said first bus means extends to said second group of line circuits, whereby said second processing means of said second line switch receives commands from said first processing means of said first line switch.

5. A telephone switching system in accordance with claim 4, wherein said third PCM line carries PCM information at said first data rate; and said bus means of said second line switch comprises a bidirectional bus for carrying PCM information at said second data rate, and rate conversion means connected between said third PCM line and said bidirectional bus of said second line switch for converting between said first and second data rates.

6. A line switch for use in a telephone switching system, said telephone switching system comprising:

a switching network; a plurality of PCM lines connected to said switching network; a system controller, and a plurality of subscriber lines, said line switch comprising:

a plurality of switch modules each comprising:

a plurality of groups of line circuits, each of said groups of line circuits being connected to a group of subscriber lines;

each group of line circuits including a line group control means for controlling operation of said group of line circuits;

switch module control means for controlling the operation of all said line group control means in response to control information generated external to said line switch;

first PCM bus means for transmission of PCM information extending to all of said groups of line circuits;

means coupling said first PCM bus means to one or more of said plurality of PCM lines; and first control bus means extending between said switch module control means and said line group control mean of all of said plurality of groups of line circuits, said switch module control means controlling said line group control means of all of said plurality of line groups over said first control bus means.

7. A line switch in accordance with claim 6, wherein each switch module comprises a time division multiplexed bus, said first PCM bus means comprises time division multiplexed PCM voice channels on said bus and said first control bus means comprises a control data channel on said bus.

8. A line switch in accordance with claim 6 or 7 comprising:

second PCM bus means extending between said first PCM bus means of each of said plurality of switch modules; and second control bus means extending between said control bus means of each of said plurality of switch modules whereby said switch module control means of one switch module can control said line group control means of another switch module.

9. A line switch in accordance with claim 6 or 7, wherein said control information is generated by said system controller.

10. A line switch in accordance with claim 9, wherein said PCM lines are adapted to include a channel for carrying said control information.

11. A line switch for use in a telephone switching system comprising a switching network;

a plurality of PCM lines operating at a first data rate connected to said switching network, each of said PCM lines carrying first frame organized PCM voice information, each first frame comprising a first number of PCM channels;

a system controller; and a plurality of subscriber lines;

said line switch comprising:

a first switch module, said first switch module comprising first PCM bus means operating at a second data rate for carrying PCM information and control information organized in second frames, each second frame comprising a control channel and a second number of PCM channels;

said second rate being a multiple of said first rate and said second number being greater than said first number;

first rate conversion means coupled to said PCM bus means and at least a first one of said plurality of PCM lines for converting between said first and second data rates;

a first plurality of line circuits each connected to one of said plurality of subscriber lines and to said first PCM bus means, said first plurality of line circuits being arranged in groups;

a plurality of first line group control means connected to said first PCM bus means for controlling said first plurality of line circuits, each one of said first line group control means controlling a different group of said first plurality of line circuits; and a first switch module control means for directing the operation of said plurality of first line group control means in response to first control information generated by said system controller.

12. A line switch in accordance with claim 11 comprising:

a second switch module, said second switch module comprising:

a second plurality of line circuits each connected to one of said plurality of subscriber lines, said second plurality of line circuit being arranged in groups, a second plurality of line group control means for controlling said second plurality of line circuits, each one of said second line group control means controlling a different group of said second plurality of line circuits, said first PCM bus means being extended to each of said second plurality of line circuits and to each of said second line group control means, whereby said first switch module control means directs the operation of said second plurality of line group control means.

13. A line switch in accordance with claim 12, wherein said second switch module comprises a second PCM bus means operating at said second data rate for carrying PCM information and control information organized in said second frames;

second rate conversion means coupled to said second PCM bus means and at least a second one of said plurality of PCM lines for converting between said first and second data rates; and a second switch module control means for directing the operation of said plurality of second line group control means in response to said first control information.

14. A line switch in accordance with claim 12, wherein said second PCM bus means is extended to each of said first plurality of line circuits and to each of said first line group control means directs the operation of said first plurality of line group control means.

15. A line switch in accordance with claim 12 comprising a third switch module, said third switch module comprising:
a third plurality of line circuits each connected on one of said plurality of subscriber lines, said third plurality of line circuits being arranged in groups;
a third plurality of line group control means for controlling said third plurality of line circuits, each one of said third line group control means controlling a different group of said third plurality of line circuits, a second PCM bus means operating at said second data rate for carrying PCM information and control information organized in said second frames; second rate conversion means coupled to said second PCM bus means and at least a second one of said plurality of PCM lines for converting between said first and second data rates; and
second switch module control means for directing the operation of said plurality of second line group control means in response to said first control information.

16. A line switch in accordance with claim 12, wherein said second PCM bus means is extended to each of said second plurality of line circuits and to each of said second line group control means, whereby said second switch module control means directs the operation of said second plurality of line group control means.

17. A line switch in accordance with claim 16, wherein said second PCM bus means is extended to each of said first plurality of line circuits and to each of said first line groups control means, whereby said second switch module control means directs the operation of said first line group control means.

18. A line switch in accordance with claim 16, wherein said first PCM bus means is extended to each of said third plurality of line circuits and to each of said third line group control means, whereby said first switch module control means directs the operation of said third line group control means.

19. A line switch in accordance with claim 17, wherein said first PCM bus means is extended to each of said third plurality of line circuits and to each of said third line group control means, whereby said first switch module control means directs the operation of said third line group control means.

20. A line switch in accordance with claim 11, 12, 13, 14, 15, 16, 17, 18 or 19, wherein said first rate conversion means is coupled to at least a third one of said plurality of PCM lines, said first rate conversion means including means for multiplexing PCM information from said first one and said third one of PCM lines onto said first PCM bus and for demultiplexing PCM information from said first PCM bus onto said first one and said third one of PCM lines.

21. A line switch in accordance with claim 20, wherein said second rate conversion means is coupled to at least a fourth one of said plurality of PCM lines, said second rate conversion means including means for multiplexing PCM information from said second one and said fourth one of said plurality of PCM lines onto said second PCM bus and for demultiplexing PCM information from said second PCM bus on said second one and said third one of said PCM lines.

22. A line switch in accordance with claims 11, 12, 13, 14, 15, 16, 17, 18 or 19, wherein said first control information is time multiplexed on said plurality of PCM lines.

23. A line switch in accordance with claim 22, wherein said first control information is carried in common channel signaling channel on said plurality of PCM lines.

24. A switch unit for use with a telephone switching system comprising:
a switching network;
a plurality of PCM lines operating at a first data rate and connected to said switching network,
each of said PCM lines carrying PCM information organized in a first frame format of "n" PCM channels;
a system controller; and
a plurality of subscriber lines; a line switch comprising:
a first switch module comprising:
a PCM bus means operating at a second data rate, a multiple of said first data rate, for carrying time multiplexed PCM information and control information, said PCM bus means carrying PCM information organized in a second frame format of "m" PCM channels and a control channel, m being equal to at least 2n;
a first rate converter connectable to first and second ones of said plurality of PCM lines for converting PCM information between said first and second rates; and
a plurality of first groups of line circuits, each of said line circuits being connected to one of said plurality of subscriber lines; each said groups of line circuits being connected to said first PCM bus means; each said group of line circuits having associated therewith a line group control means for controlling the operation of said each said group of line circuits, each said line group control means being coupled to said first PCM bus means; and
first switch module control means for directing the operation of each of said line group control means via said control channels.

25. A line switch unit in accordance with claim 24, wherein alternate ones of said PCM channels of said PCM bus carrying PCM information between said plurality of first groups of line circuits and said first one of said plurality of PCM lines.

26. A line switch unit in accordance with claim 25, wherein intermediate ones of said channels of said PCM bus carry PCM information between said plurality of first groups of line circuits and said second one of said plurality of PCM lines.

27. A line switch unit in accordance with claim 26, wherein said first rate converter includes means for exchanging PCM information between said alternate ones of said PCM channels and said first one of said plurality of PCM lines and for exchanging PCM information between said intermediate ones of said PCM channels and said second one of said plurality of PCM lines.

28. A line switch unit in accordance with claims 24, 25, 26 or 27, wherein each said PCM channel of said PCM lines comprises "x" bits of PCM information, x being a predetermined number, and each said PCM channel of said first PCM bus means comprises "x" bits of PCM information and at least one additional bit for carrying other information.

29. A line switch unit in accordance with claims 24, 25, 26 or 27, wherein said first PCM bus means includes a common PCM bus portion and first and second PCM buses coupled to said common PCM bus portion said first PCM bus being coupled to certain ones of said plurality of first groups of line circuits and said line group control means associated with said certain ones of said plurality of first groups of line circuits, and said second PCM bus being coupled to other ones of said plurality of first groups of line circuits and said line group control means associated with said other ones of said plurality of first groups of line circuits.

* * * * *